United States Patent [19]

Blank et al.

[11] Patent Number: 5,506,785

[45] Date of Patent: Apr. 9, 1996

[54] METHOD AND APPARATUS FOR GENERATING HOLLOW AND NON-HOLLOW SOLID REPRESENTATIONS OF VOLUMETRIC DATA

[75] Inventors: William C. Blank; Rodney D. Jacobson, both of Lebanon, N.H.

[73] Assignee: Dover Systems Corporation, Lebanon, N.H.

[21] Appl. No.: 16,705

[22] Filed: Feb. 11, 1993

[51] Int. Cl.⁶ ........................................... G06F 15/62
[52] U.S. Cl. ..................... 364/468; 395/119; 395/124
[58] Field of Search .................................. 364/468, 578, 364/474.24; 395/89, 93–95, 119–123, 124, 127; 340/723, 728, 747

[56] References Cited

U.S. PATENT DOCUMENTS

| | | |
|---|---|---|
| 4,436,684 | 3/1984 | White . |
| 4,782,502 | 11/1988 | Schulz . |
| 4,841,975 | 6/1989 | Woolson . |
| 4,888,583 | 12/1989 | Ligocki et al. ........................ 340/723 |
| 4,961,154 | 10/1990 | Pomerantz et al. .................... 364/522 |
| 5,007,936 | 4/1991 | Woolson . |
| 5,038,302 | 8/1991 | Kaufman .............................. 364/522 |
| 5,086,401 | 2/1992 | Glassman et al. . |
| 5,101,475 | 3/1992 | Kaufman et al. ...................... 395/124 |
| 5,113,490 | 5/1992 | Winget ................................. 395/119 |

OTHER PUBLICATIONS

Fuchs, H., Kedem, Z. M. and Uselton, S. P., "Optimal Surface Reconstruction From Planar Contours", Communications of the ACM, Oct. 1977, vol. 20, No. 10, pp. 693–702.

Glenn, Jr., William V. et al., "Multiplanar Display Computerized Body Tomogrpahy applications in the Lumbar Spine", Spein, vol. 4, No. 4, Jul./Aug. 1979.

Wells, Michael K., "1979 Advances in Bioengineering", The Winter Annual Meeting of the American Society of Mechanical Engineers, pp. 87–89.

Altschuler, Bruce R. and Herman, Gabor T., "Head and Neck 3–D Mapping Derived From Computed Tomographic Serial Scans", pp. 81–85, Proceedings, Sixth Conference on Computer Applications in Radiology computer/aided analysis of radiological images, Jun. 18–21, 1979.

Alberti, C., "Three–Dimensional CT and Structure Models", British Journal of Radiology, v. 53 (1980), pp. 261–262.

Artzy, E., et al., "Boundary Detection in 3–Dimensions with . . . ", Medical Image Processing Group, Technical Report No. MIPG9, State University of New York at Buffalo, Nov., 1978.

Artzy, E., et al., "A System For Three–Dimensional Dynamic Display of Organs From Computed Tomograms", 1979 IEEE, pp. 285–290.

Artzy, Ehud, "Display of Three–Dimensional Information In . . .", Computer Graphics and Image Processing 9, 196–198 (1979).

"Department of Defense Tri–Service Precision Machine –Tool Program", Quarterly Report, Feb.–Apr. 1978, Jun. 1, (List continued on next page.)

Primary Examiner—Roy N. Envall, Jr.
Assistant Examiner—Thomas E. Brown
Attorney, Agent, or Firm—Wolf, Greenfield & Sacks

[57] ABSTRACT

The invention is directed toward a method and apparatus for generating hollow and non-hollow solid representations of an object represented in terms of volumetric data. The volumetric data represents the object in terms of a plurality of voxels, each voxel having a plurality of voxel faces that interconnect to enclose a voxel volume that represents a portion of the object volume or a portion of the volume of a background substance. A surface representation is generated that represents the object with a plurality of surface voxel faces defining a surface that encloses the voxels whose volumes represent the object volume. An array of control points is formed from the surface representation, each control point corresponding to a surface voxel face. A NURB based solid representation of the object is generated from the array of control points. The NURB based solid representation can be used to drive a CAD/CAM system to generate a replica of the object or can be used for various other purposes.

4 Claims, 53 Drawing Sheets

OTHER PUBLICATIONS

1978.

Douglas S. S., Green, W. L., "A Machine tool Control System for Turning Nonaxisymmetric Surfaces", Distribution Category UC-38, Sep. 28, 1979.

Gerngross, H., et al., "Moglichkeiten Geometrischer Rontgenuntersuchung des Beckens fur den Halbseitigen Beckenersatz", Z. Orthrop. 118 (1980) 331-336 (An English language translation is also enclosed, entitled Possibilities of Geometric X-Ray Examination of Pelvis for Replacing Half of the Pelvis by an Artificial Pelvis.

Herman, Gabor T., et al., "Three-Dimensional Display of . . . ", Computer Graphics and Image Processing 9, 1-21 (1979).

Herman, Gabor T., "Representation of 3-D Surfaces by a Large . . . ", Medical Image Processing Group, Technical Report No. MIPG26, State University of New York at Buffalo, Mar., 1979.

Mazziotta, John C. et al., "Thread (Three-dimensional Reconstruction And Display) With Biomedical . . . ", Georgetown University Medical Center, National Computer Conference, 1976, pp. 241-250.

McLain, D. H., "Interpolations Methods For Erroneous Data", pp. 86-103.

McShan, D. L. et al, "A Computerized Three Dimensional Treatment Planning System . . . ", British Journal of Radiology, vol. 52, pp. 478-481, 1979.

Real, B., "Technical Change and Economic Policy", Science and Technology in the New Economic and Social Context.

Reinstein, L. E., et al, "A Computer-Assisted Three-Dimensional", Scientce Accessories, Storrs, Conn., Apr. 1978, pp.259-264.

Sommer III, H. J., et al., "Regressive Osteometric Scaling . . . ", Department of Mechanical and Industrial Engineering, pp. 87-89.

Sunguroff, A., et al., "Computer Generated Images for Medical Applications", Computer Graphics, vol. 12, No. 3, 196-202, Aug. 1978.

Sutton, G. P., et al., "Precision Machine-Tool Program", Quarterly Report, May-Jul. 1978, Sep. 6, 1978.

Tatcher, M., et al., "An Analog Patient Model Derived From Computed Tomograms for Three-Dimensional . . . ", Technical Notes, (Jul. 1980), pp. 236-238.

Burri, L. et al, Total "Internal" Hemipelvectomy, 1979, Archives of Orthopaedic and Traumatic Surgery, 219-226.

Glen, W. V., et al, Multiplanar Display . . . In The Lumbar Spine, Jul./Aug. 1979, SPIE, vol. 4, No. 4, 282-352.

Glenn, Jr., W. V. et al, Image Generation . . . for CT Scan Data, 1975, Memorial Award Paper, 403-416.

Herman, G. T. et al, Display of . . . Computed Tomography, 1977, Journal of Computer Assisted Tomography, 155-160.

Hierholzer, E., The Display-Stereocomparator . . . , 1978, SPIE, vol. 166, 31-38.

Hoffman, E. A. et al, Investigation of the Intrathoracic . . . , Biodynamics Research Unit, Mayo Medical School, (no date) 151-161.

Huang, H. K. et al, Automated Cross-Sectional Geometry . . . , 21-25 Oct., 1978, 31st ACEMB (Atlanta Georgia), 208-209.

Liu, H. K., Two-And Three-Dimensional Boundary Detection, 1977, Computer Graphics and Image Processing 6, 123-134.

Nerubay, J. et al, Technique of Building . . . Using Computer Tomography, 1982, Alan R. Liss, Inc., N.Y.C., 147-152.

Rhodes, M. L. et al, Anatomic Model and Prostheses Manufacturing Using CT Images, 1985, MPDI Medical Science Center, 110-150.

Rhodes, M. L. et al, Computer Aided Prosthetic Implant . . . , 1982, IEEE, 585-588.

Rhodes, M. L. et al, Three Dimensional Structure Isolation . . . , 1978, IEEE 78 CH 1331-8C, 584-591.

Tonner, H. D. et al, Ein Neues Verfahren Zur . . . Den Beckenteilersatz, 1979, Fortschr. Med. 97, Nr. 16, 781-783.

Udupa, Jayaram K., Ph.D., Herman, Gabor T., Ph.D., 3D Imaging in Medicine, 1991, CRC Press, Inc., 69-88.

Wells, M. K., Ed., Regressive Osteometric Scaling Applications To Mirror Symmetry . . . , 1979, Amer. Society of Mech. Engr., 87-89.

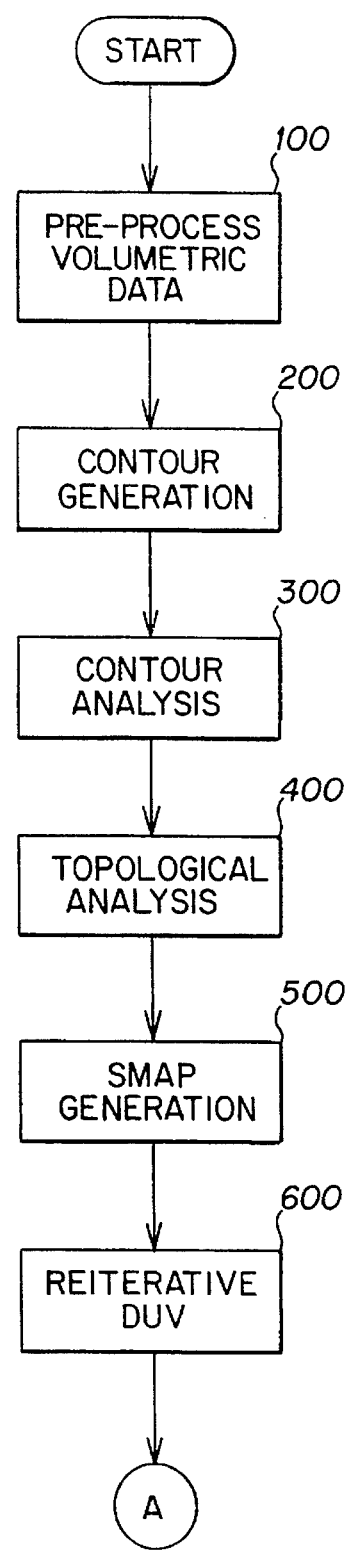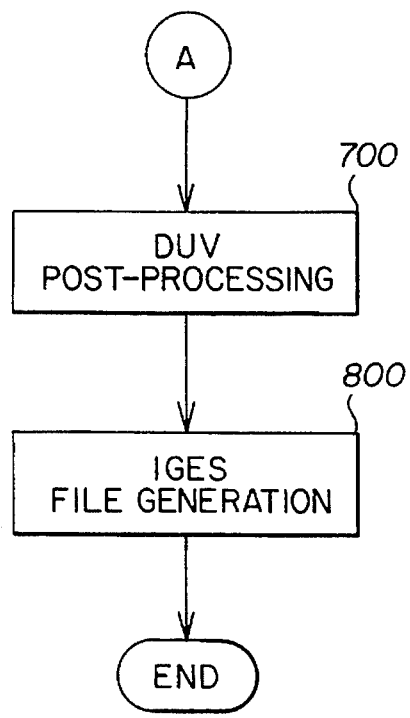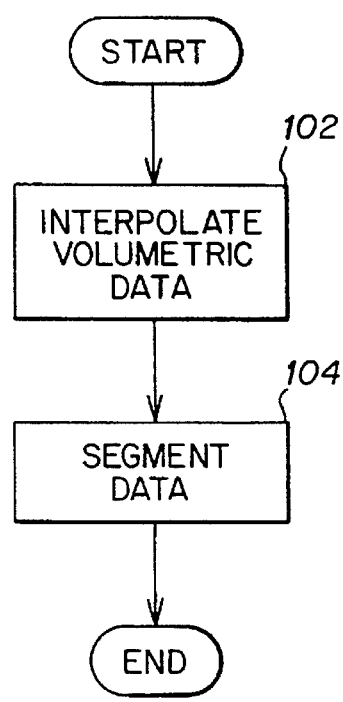
FIG. 2
FIG. 3
FIG. 4

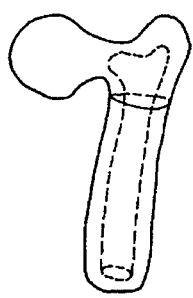
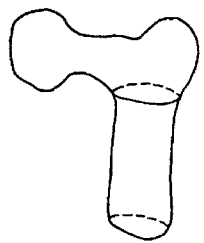
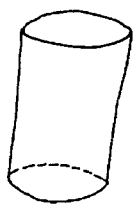
FIG. 22(a)  FIG. 22(b)  FIG. 22(c)
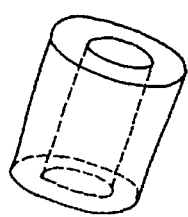
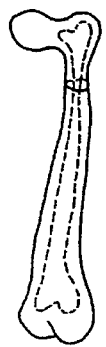
FIG. 22(d)  FIG. 22(e)  FIG. 22(f)

SLICE 5

| 0 | 0 | 1 | 1 |
|---|---|---|---|
| 0 | 0 | 1 | 1 |
| 0 | 0 | 1 | 1 |
| 0 | 0 | 1 | 1 |
| 0 | 0 | 1 | 1 |
| 0 | 0 | 1 | 1 |
| 0 | 1 | 1 | 1 |
| 0 | 1 | 0 | 0 |
| 0 | 1 | 0 | 0 |
| 0 | 0 | 0 | 0 |

*FIG. 23(a)*

SLICE 6

| 0 | 0 | 1 | 1 |
|---|---|---|---|
| 0 | 0 | 1 | 1 |
| 0 | 0 | 1 | 1 |
| 0 | 0 | 1 | 1 |
| 0 | 0 | 1 | 1 |
| 0 | 0 | 1 | 1 |
| 0 | 0 | 0 | 1 |
| 0 | 0 | 0 | 1 |
| 0 | 1 | 1 | 1 |
| 0 | 0 | 0 | 0 |

*FIG. 23(b)*

SLICE 5 & 6

| | | | |
|---|---|---|---|
| 0 | 0 | 1 | 1 |
| 0 | 0 | 1 | 1 |
| 0 | 0 | 1 | 1 |
| 0 | 0 | 1 | 1 |
| 0 | 0 | 1 | 1 |
| 0 | 0 | 1 | 1 |
| 0 | 0 | 0 | 1 |
| 0 | 0 | 0 | 0 |
| 0 | 1 | 0 | 0 |
| 0 | 0 | 0 | 0 |

```
/* SURFACE VOXEL -- THE BASIC BUILDING BLOCK */
STRUCT SURF_VOX{
    INT X;              /* THE X LOCATION OF THE PARENT VOXEL */
    INT Y;              /* THE Y LOCATION OF THE PARENT VOXEL */
    INT Z;              /* THE Z LOCATION (SLICE NUMBER) OF THE PARENT VOXEL */
    INT ORIENTATION;    /* THE ORIENTATION OF THE FACE */

STRUCT SURF_VOX *(ADJ[4]);  /* ADJACENT SURFACE_VOXELS */

/* THE FOLLOWING VALUES ARE USED DURING THE REITERATIVE DUV PROCESSING
       OF THE SMAP */
    INT TYPE;       /* CORNER, EDGE, OR INNER */
    INT QUADRANT;   /* IF IT IS AN INNER QUADRANT */
    INT VALUE;      /* WORK SPACE */
};
```

FIG. 25

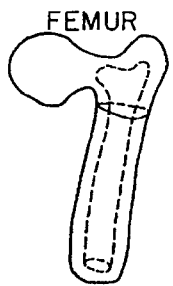

FEMUR

1 XY RING OUTER SURFACE (RR)
1 TOPOLOGICALLY DUV'D OUTER SURFACE (FR)
1 XY RING INNER SURFACE (RR)
1 PLANARLY DUV'D INNER SURFACE (FR)
1 TRIMMED SURFACE AT THE BOTTOM
THE SOLID IS THE COMPOSITION OF THE FIVE SURFACES

FIG. 38(a)

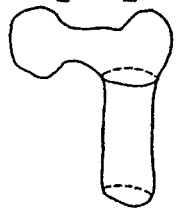

FEMUR_NON_HOLLOW

1 XY RING OUTER SURFACE (RR)
1 TOPOLOGICALLY DUV'D OPEN OUTER SURFACE (FR)
1 TRIMMED SURFACE AT THE BOTTOM
THE SOLID IS THE COMPOSITION OF THE THREE SURFACES

FIG. 38(b)

FEMUR_NON_HOLLOW_SHAFT

1 XY RING OUTER SURFACE (RR)
2 TRIMMED SURFACES AT THE TOP AND BOTTOM
THE SOLID IS THE COMPOSITION OF THE THREE SURFACES

FIG. 38(c)

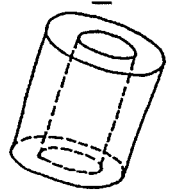

FEMUR_SHAFT

1 XY RING OUTER SURFACE (RR)
1 XY RING INNER SURFACE (RR)
2 TRIMMED SURFACES AT THE TOP AND BOTTOM
THE SOLID IS THE COMPOSITION OF THE FOUR SURFACES

FIG. 38(d)

FEMUR_NON_HOLLOW_ENTIRE

1 TOPOLOGICALLY DUV'D OPEN OUTER SURFACE (TOP) (FR)
1 OPEN OUTER SURFACE (BOTTOM) (RF)
THE SOLID IS THE COMPOSITION OF THE TWO SURFACES

FIG. 38(e)

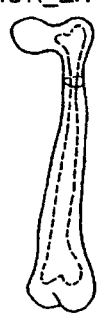

FEMUR_ENTIRE

1 TOPOLOGICALLY DUV'D OPEN OUTER SURFACE (TOP) (FR)
1 OPEN OUTER SURFACE (BOTTOM) (RF)
1 PLANARLY DUV'D OPEN INNER SURFACE (TOP) (FR)
1 OPEN BOTTOM SURFACE (BOTTOM) (RF)
THE SOLID IS THE COMPOSITION OF THE FOUR SURFACES

FIG. 38(f)

1. THE TOP OF FEMORAL HEAD
2. THE TOP OF THE GREATER TROCHANTER
3. THE BOTTOM OF THE FEMORAL LIP
4. THE OPPOSITE SIDE OF THE BOTTOM OF THE FEMORAL LIP
5. THE "FRONT POINT" OF THE KNOB
6. THE OPPOSITE SIDE OF THE "FRONT POINT" OF THE KNOB

HILLTOP METHOD

① FEMUR ENTIRE: BOTTOM INNER & OUTER SURFACES
② FEMUR NON-HOLLOW ENTIRE: BOTTOM SURFACE
③ SOLID WITH ENCLOSED HOLLOW: TOP INNER & OUTER SURFACES AND A TRUE HOLE
④ NON-HOLLOW WITH TRUE HOLE: TOP OUTER SURFACE
⑤ HOLLOW Y TOP: ALL SURFACES
⑥ HOLLOW Y BOTTOM: ALL SURFACES

*FIG. 46(a)*

GAUNTLET METHOD

① SOLID WITH ENCLOSED HOLLOW: BOTTOM INNER & OUTER SURFACES AND A TRUE HOLE
② NON-HOLLOW WITH TRUE HOLE: BOTTOM OUTER SURFACE
③ ALL OTHER SURFACES

*FIG. 46(b)*

SOLID W/ MULTIPLE HOLLOWS

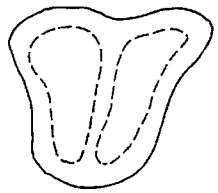

1 OUTER SURFACE (FF)
2 INNER SURFACES (FF)
THE SOLID IS THE COMPOSITION OF THE THREE SURFACES

FIG. 54(a)

HOLLOW SOLID W/IN A HOLLOW SOLID

1 OUTER SURFACE (FF) ⎫ OUTER SOLID IS THE COMPO-
1 INNER SURFACE (FF) ⎬ SITION OF THE TWO
⎭ SURFACES
1 ENCLOSED OUTER SURFACE (FF) ⎫ ENCLOSED
1 ENCLOSED INNER SURFACE (FF) ⎬ SOLID IS THE
⎪ COMPOSITION
⎪ OF THE TWO
⎭ SURFACES

FIG. 54(b)

SOLID W/ MULTIPLE TRUE HOLES

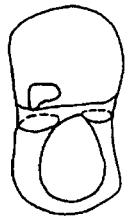

3 OPEN OUTER SURFACES (FR), (RR), AND (RF)
THE SOLID IS THE COMPOSITION OF THE THREE SURFACES

FIG. 54(c)

XY TRIMMED SOLID TYPES

1 OPEN OUTER SURFACE (RR)
1 OPEN INNER SURFACE (RR)
TRIMMED PLANAR SURFACES ARE FORMED ON BOTH SIDES
THE SOLID IS THE COMPOSITION OF THE FOUR SURFACES

FIG. 54(d)

X SOLID TYPES

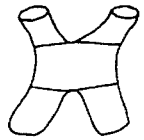

5 OUTER SURFACES (RR)
2 TRIMMED SURFACES AT THE TOP
2 TRIMMED SURFACES AT THE BOTTOM
THE SOLID IS THE COMPOSITION OF THE NINE SURFACES

FIG. 54(e)

HOLLOW "X" SOLID

5 OUTER SURFACES (RR)
4 TRIMMED SURFACES
2 INNER SURFACES (FR)
1 INNER SURFACE (RF)
THE SOLID IS THE COMPOSITION OF THE NINE SURFACES

*FIG. 54(f)*

VERTEBRAL SOLID TYPES

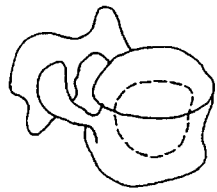

SPECIAL PROCESSING

*FIG. 54(g)*

NON-HOLLOW "Y" SOLID

3 OUTER SURFACES (RR)
2 TOP AND 1 BOTTOM TRIMMED SURFACE
THE SOLID IS THE COMPOSITION OF THE SIX SURFACES

*FIG. 54(h)*

2 OUTER SURFACES (RR)
1 OUTER SURFACE (RF)
2 TOP TRIMMED SURFACES
THE SOLID IS THE COMPOSITION OF THE FIVE SURFACES

*FIG. 54(i)*

2 OUTER SURFACES (FR)
1 OUTER SURFACE (RF)
2 INNER SURFACES (FR)
1 INNER SURFACE (RF)
THE SOLID IS THE COMPOSITION OF THE SIX SURFACES

*FIG. 54(j)*

METHOD AND APPARATUS FOR GENERATING HOLLOW AND NON-HOLLOW SOLID REPRESENTATIONS OF VOLUMETRIC DATA

FIELD OF THE INVENTION

This invention relates to a method for generating solid representations of hollow and non-hollow objects from volumetric data representing the object, such volumetric data being supplied by a probing source such as a computerized axial tomography (CAT) scanner. The solid representations can be used in a number of ways, such as for controlling a computer aided design/manufacturing (CAD/CAM) system to generate physical models of the solids.

BACKGROUND OF THE INVENTION

A number of apparatus are known for producing volumetric data representations of an object. An example of such an apparatus is a CAT scanner which generates representations of an object by subjecting the object to radiant energy (specifically X-rays) across a cross-sectional slice of the object and by detecting the radiant energy transmitted through that slice of the object. The detected radiant energy varies depending upon the characteristics of the substances that make up the object in the area of the slice. Therefore, by analyzing the detected radiant energy, a two-dimensional array of sampled radiographic densities is formed. This two-dimensional array can be displayed as an image of the object at the cross-sectional slice. A three-dimensional sample of the entire object can be constructed by combining multiple slices generated successively across the entire length of the object. In this manner, the object is represented by a three-dimensional array of data indicating the characteristics of the substances that make up the volume of the object.

Although the volumetric representation of an object is useful for many applications, it cannot interface directly with many computer aided design (CAD) or CAM systems. Most modern CAD/CAM systems receive input data in the form of geometric primitives, such as points, lines, arcs, b-spline (NURB) curves, planes, conics and b-spline (NURB) surfaces. Since the volumetric representations generated by a CAT scanner and other similar apparatus do not define the scanned object in terms of geometric primitives, these apparatus cannot interface directly with many modern CAD/CAM systems.

It is desirable to develop a method and apparatus for converting a volumetric data representation of an object into a collection of geometric primitives that constitute a single solid model representation which is more useful for certain applications, including interfacing with CAD/CAM systems. Two techniques have been developed for converting a volumetric data representation of an object into a solid model of the object. First, a method known as the polygonal method has been developed which attempts to model an object defined in volumetric data by a series of polygons, such as triangles. Initially, a series of polygons is formed that encloses the object volume. Thereafter, the method determines the area where the greatest difference exists between the polygon model and the object volume, and the polygon covering that area is sub-divided into smaller polygons. In this manner, the polygon model is continually sub-divided into greater numbers of polygons and the accuracy of the polygon model increases with each sub-division. This method is often used in graphics applications and generates an accurate representation when a close examination is conducted for small portions of the object surface. However, the polygon model generated from this method consists of a series of discrete entities and does not have any topological understanding. The model generated by the polygonal method is not a single contiguous solid model and therefore, it cannot be used for many applications such as interfacing with certain CAD/CAM systems.

A second method for modeling volumetric data is known as the contour or perimeter method. This method looks at each slice of volumetric data individually and models the shape of the object as defined on each slice. Thereafter, the model for each of the slices is combined together to form a model of the entire object. Since each slice is modeled individually, this method also results in a model having a plurality of discrete components. Therefore, this model does not generate a single contiguous solid model of the object and cannot be utilized effectively for certain applications. Additionally, this method cannot model multiple contours defined on any one slice.

Accordingly it is an object of the present invention to provide a method and apparatus for generating a NURB based solid model representation of an object represented in terms of volumetric data that can be used to drive a CAD/CAM system or for various other uses.

SUMMARY OF THE INVENTION

The foregoing objects are achieved and the foregoing problems are solved in one illustrative embodiment of the invention in which a method is provided for operating a computer to generate a surface representation of an object represented in terms of volumetric data, the computer having a memory and the volumetric data being stored in the memory, the object having a surface and a volume enclosed by the surface. The volumetric data represents the object and a background substance with a plurality of slices, each slice being represented by an array of voxels, each voxel having a plurality of voxel faces that interconnect to enclose a voxel volume, each voxel volume representing a corresponding portion of the object or background substance volume. In accordance with the invention, a method is provided for operating the computer to perform the steps of generating at least one contour for each slice that includes a voxel volume representing the object volume, each contour indicating a group of surface voxels on the slice, each surface voxel having a volume that represents the object and being adjacent to a voxel on the same slice whose volume does not represent the object; storing each contour in the memory; generating a surface representation for each slice for which a contour was generated, each surface representation including a plurality of surface voxel faces, each surface voxel face being a face of a surface voxel, each surface voxel face further being adjacent to a voxel whose volume does not represent the object; storing each slice's surface representation in the memory; and combining the surface representations for each slice to generate a surface representation of the object.

In another illustrative embodiment of the invention, a method is provided for operating a computer to generate a data structure representing a NURB solid model of an object represented in terms of surface data, the computer having a memory and the surface data being stored in the memory, the object having a surface. The surface data represents the object surface in terms of a plurality of faces, each face representing a portion of the object surface and having coordinates indicating the relative three-dimensional location of the portion of the object surface that it represents. In accordance with the invention, a method is provided for operating the computer to perform the steps of generating first and second poles for the surface data representation of the object, each pole including at least one face, each pole representing a portion of the object surface; storing the first and second poles in the memory; generating a plurality of v-lines between the first and second poles, each v-line including a plurality of faces that represent a path between the respective portions of the object surface represented by the first and second poles; storing each v-line in the memory; generating a plurality of u-lines, each u-line including a plurality of faces that represent a path around the object surface, the at least one u-line intersecting with each of the v-lines; storing each u-line in the memory; generating a list of intersection faces that represent portions of the object surface where v-lines intersect with u-lines, the intersection faces being faces that are included within the plurality of faces of both a u-line and a v-line; storing the list of intersection faces in the memory; generating an array of control points, each control point corresponding to an intersection face, each control point including the coordinates indicating the portion of the object represented by its corresponding intersection faced storing the array of control points in the memory; and generating a data structure representing a NURB solid model of the object from the array of control points.

In a further illustrative embodiment of the invention, a method is provided for combining the two above-described methods and for utilizing the data structure generated by the combined methods to manufacture an article having a surface topology that is substantially identical to the NURB solid model represented by the data structure, and to the volumetric representation of the object. As a result, a replica is generated of an object represented in terms of volumetric data.

In a further illustrative embodiment of the invention, a method is provided for generating a replica of a skeletal portion of a bone that is represented in terms of volumetric data output from a CAT scan or other volumetric data generation source. The replica of the skeletal portion can be used to generate a prosthetic.

A BRIEF DESCRIPTION OF THE DRAWINGS

FIG. 2 is a flowchart illustrating the initial primary steps for implementing the method of the present invention;

FIG. 3 is a flowchart illustrating the final primary steps for implementing the method of the present invention;

FIG. 4 is a flowchart illustrating the pre-processing steps of the present invention;

Figure 26:
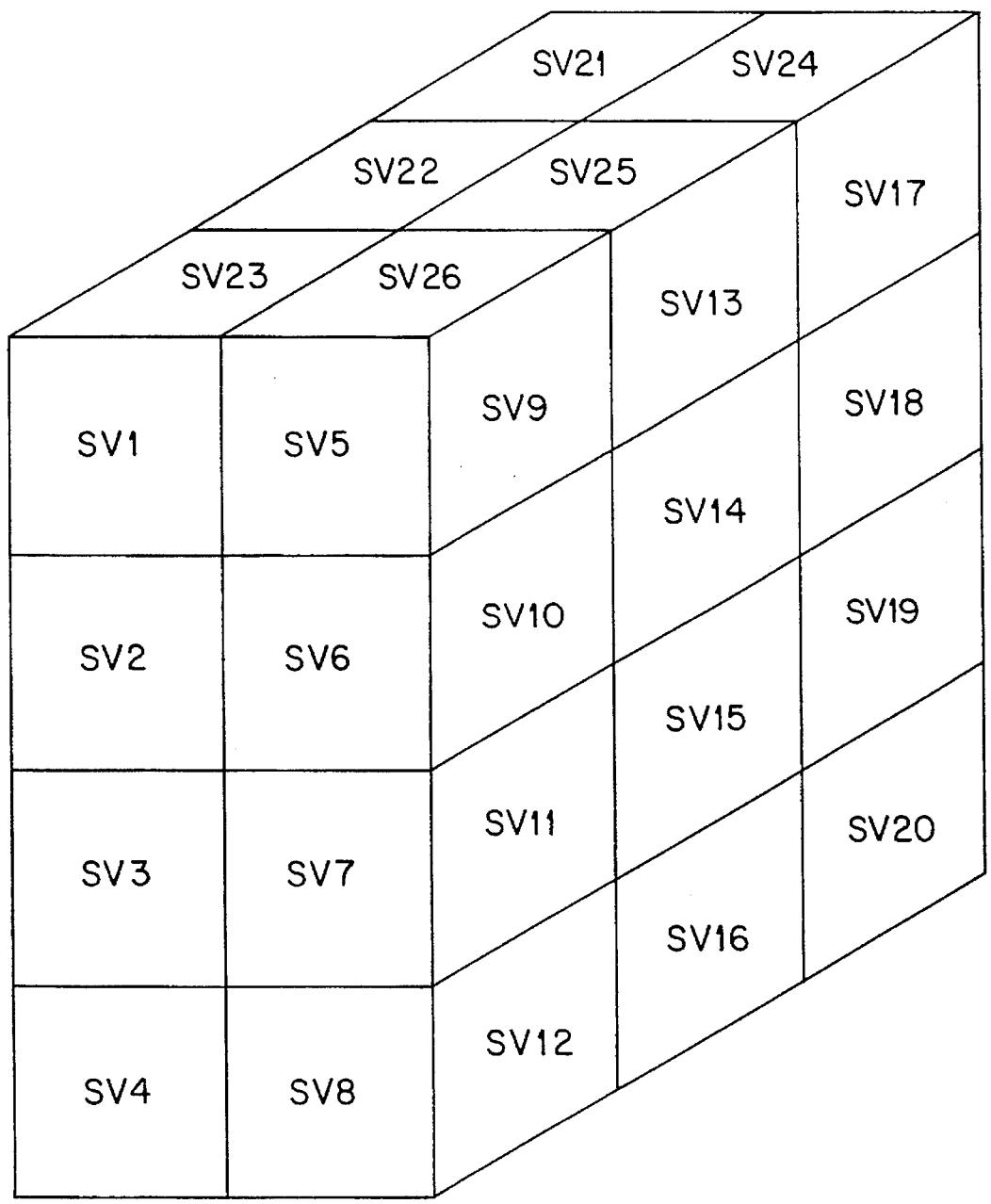
Figure 27A:
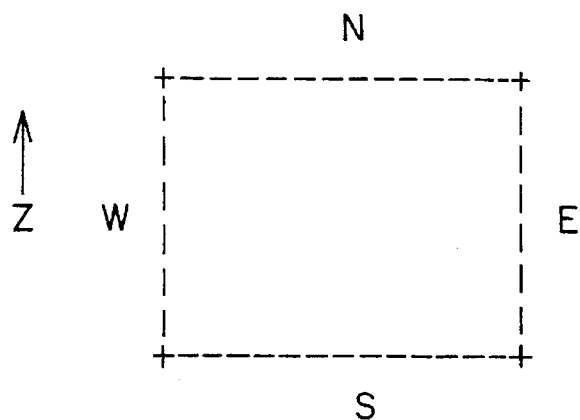
Figure 27B:
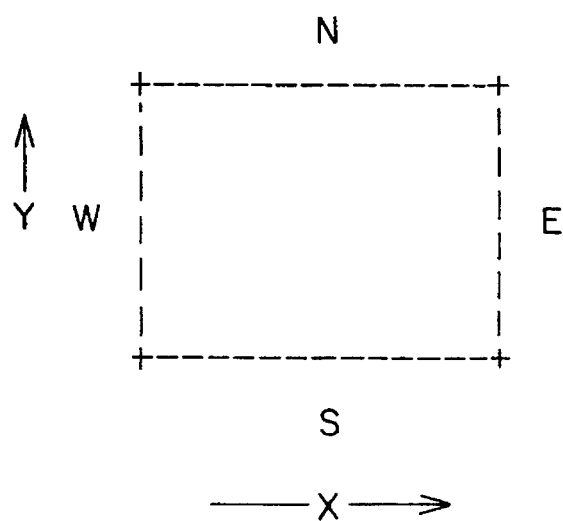
Figure 28:
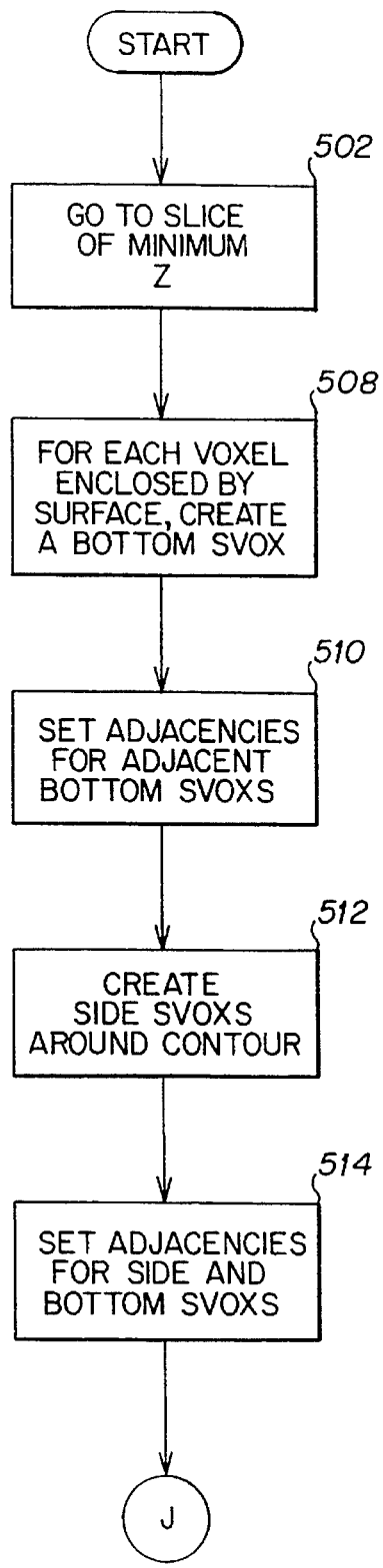
Figure 29:
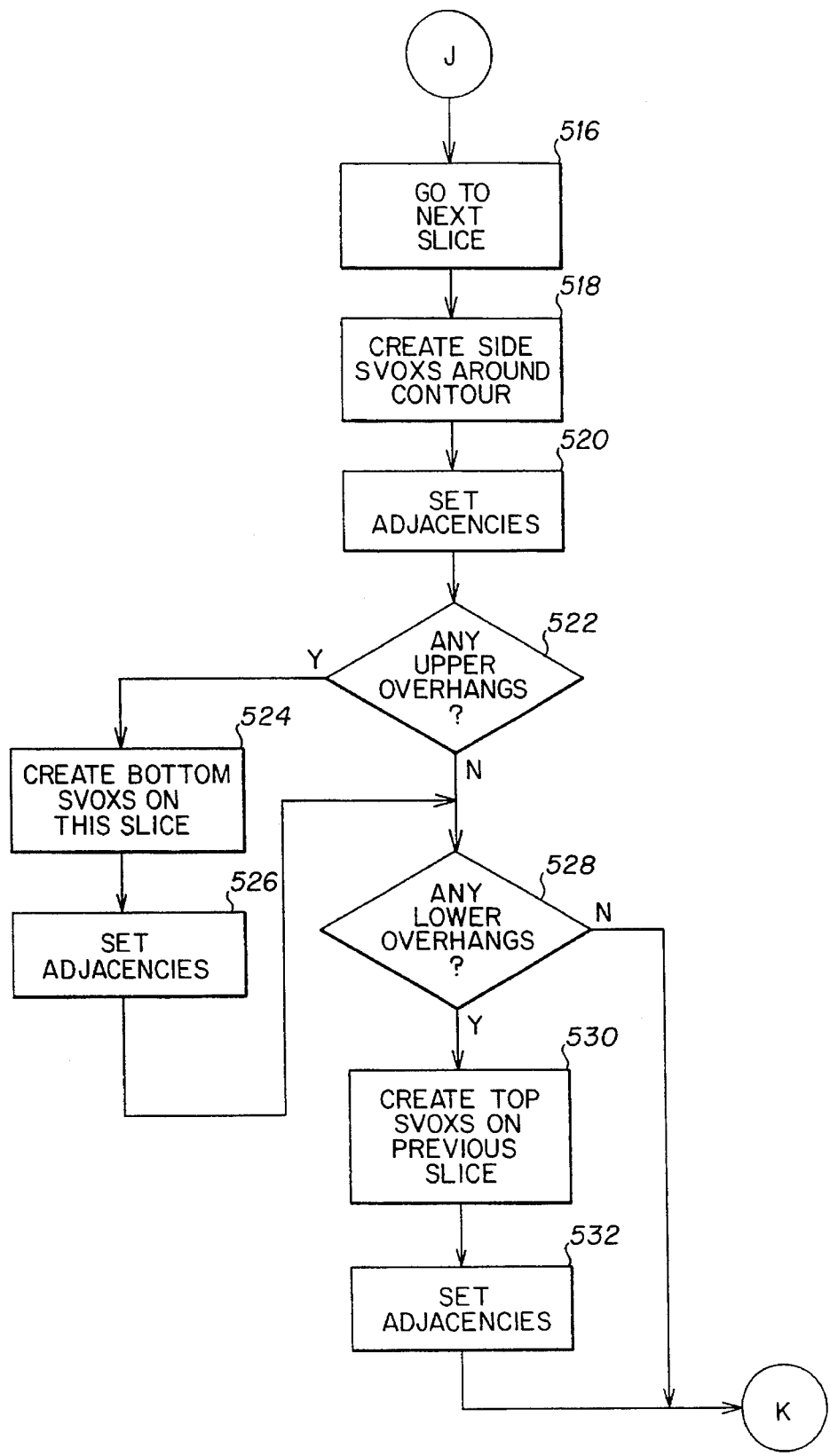
Figure 30:
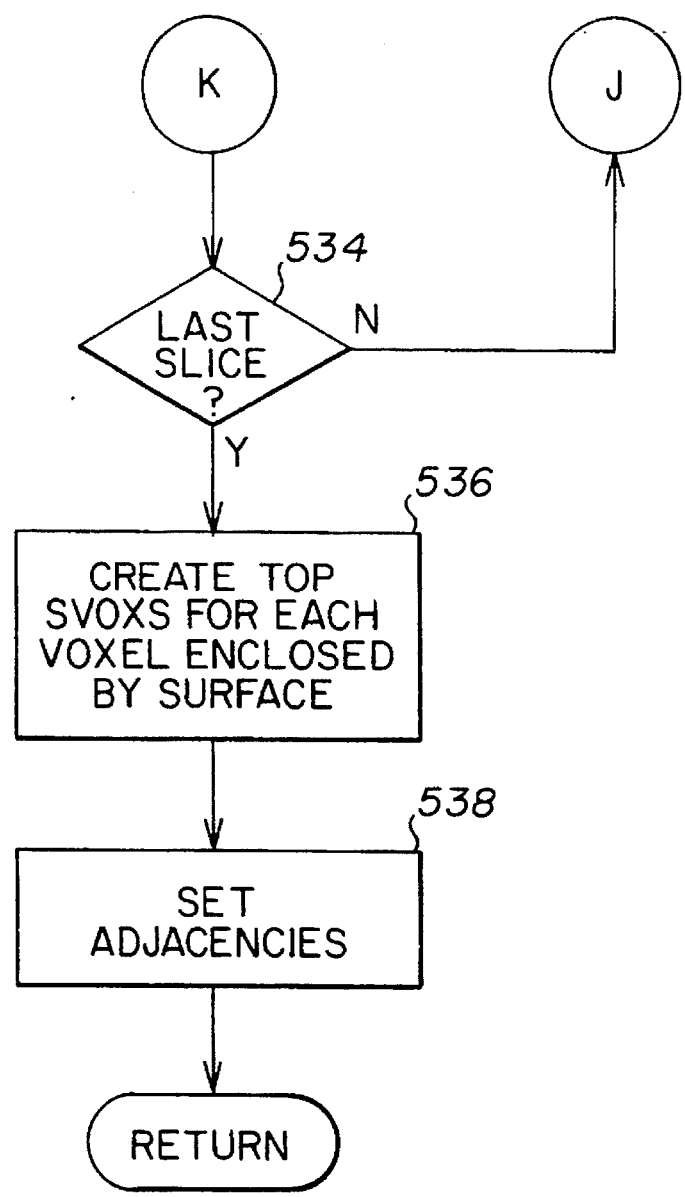
Figure 31:
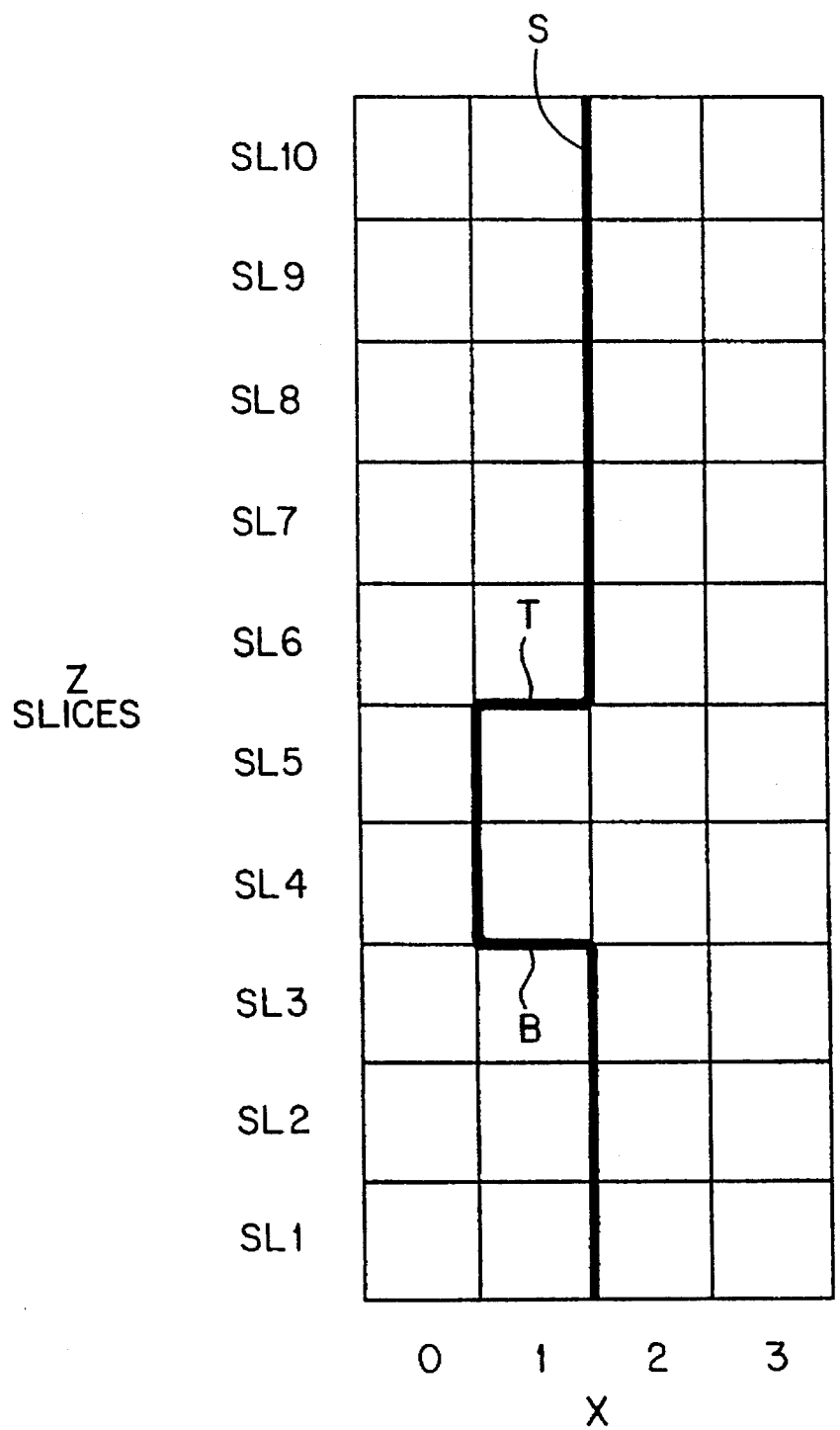
Figure 32:
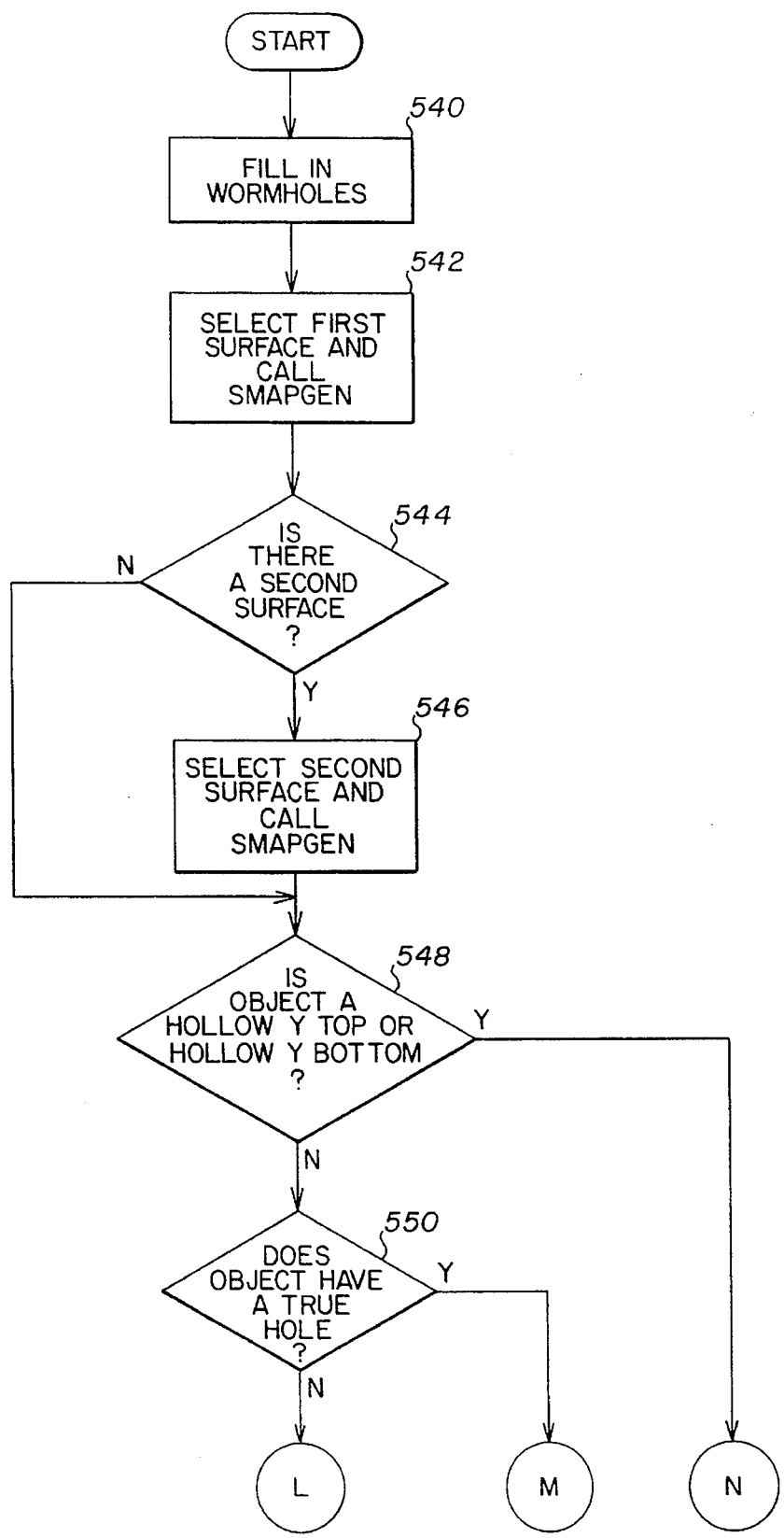
Figure 33:
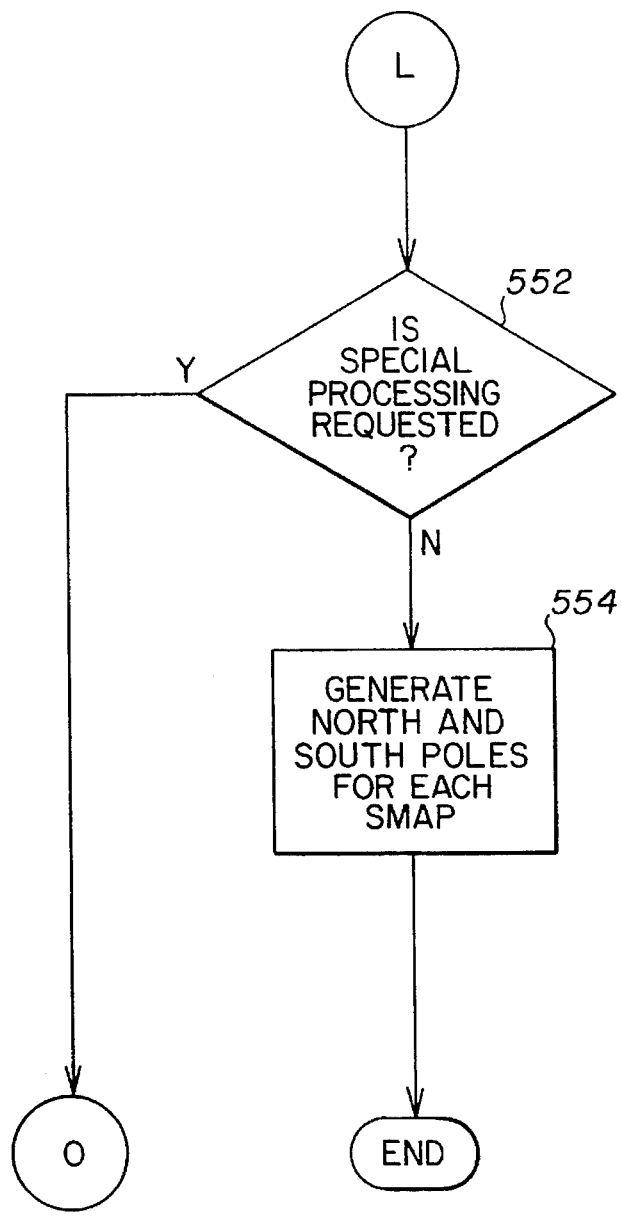
Figure 34:
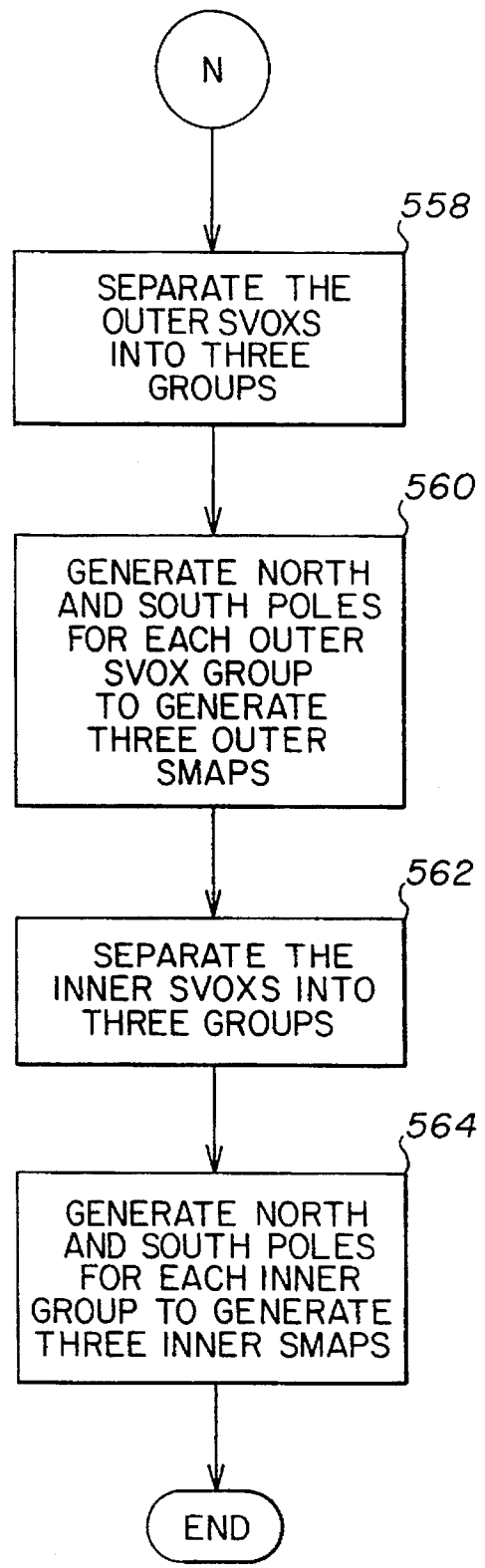
Figure 35:
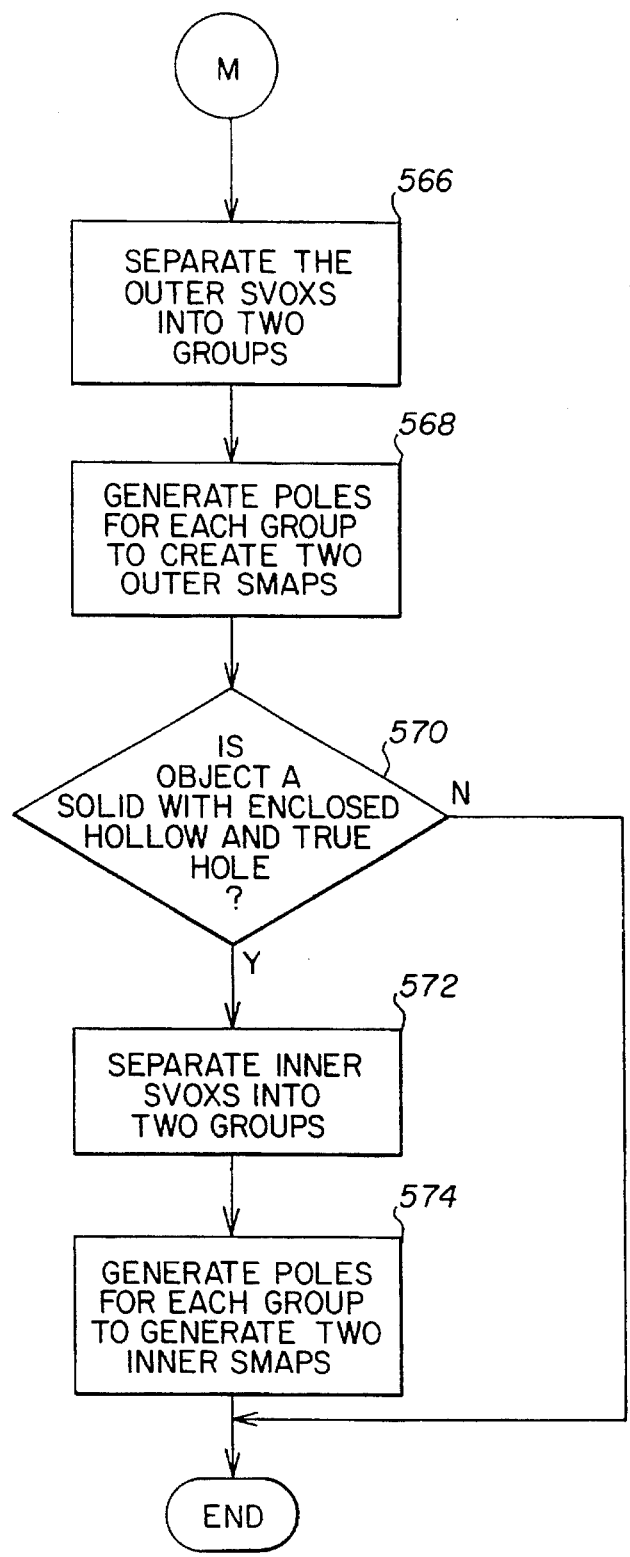
Figure 36:
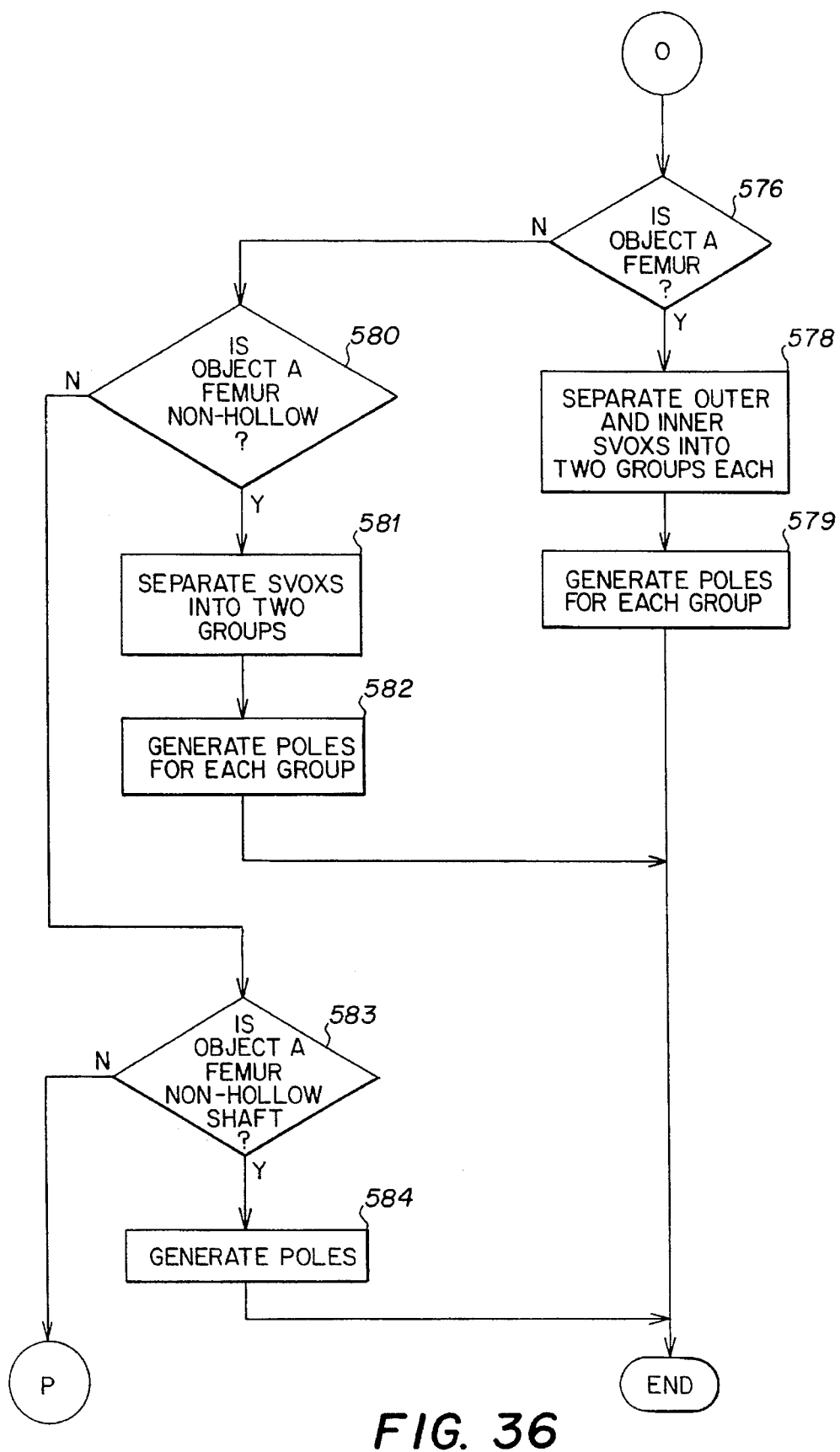
Figure 37:
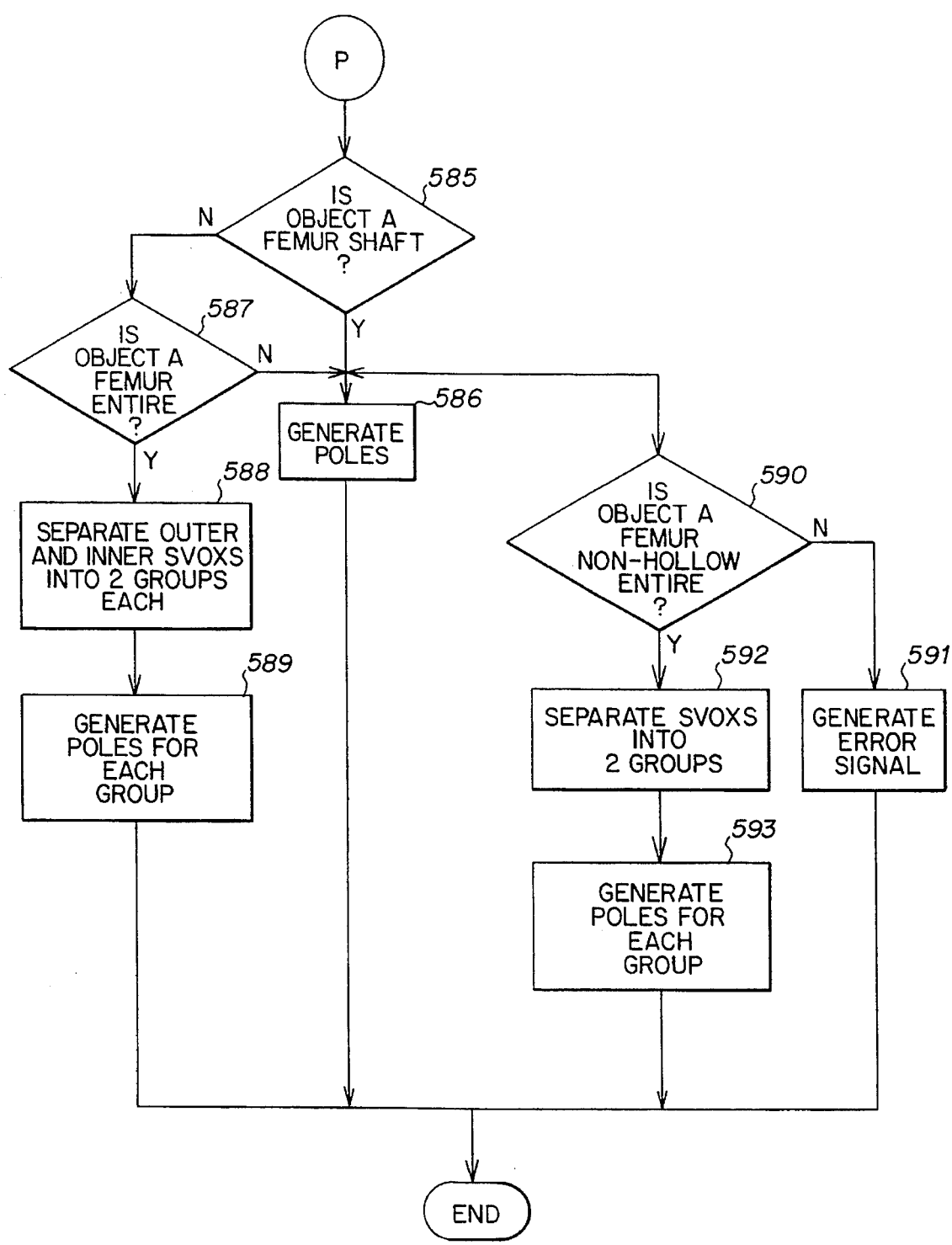
Figure 40:
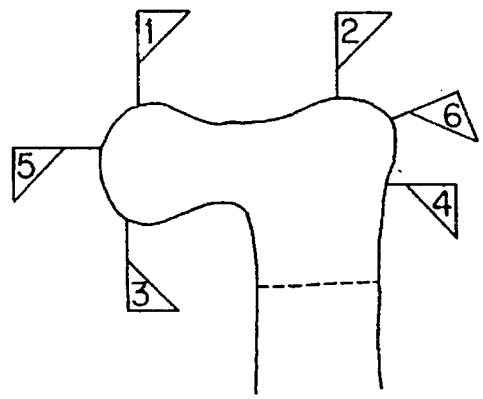
Figure 41:
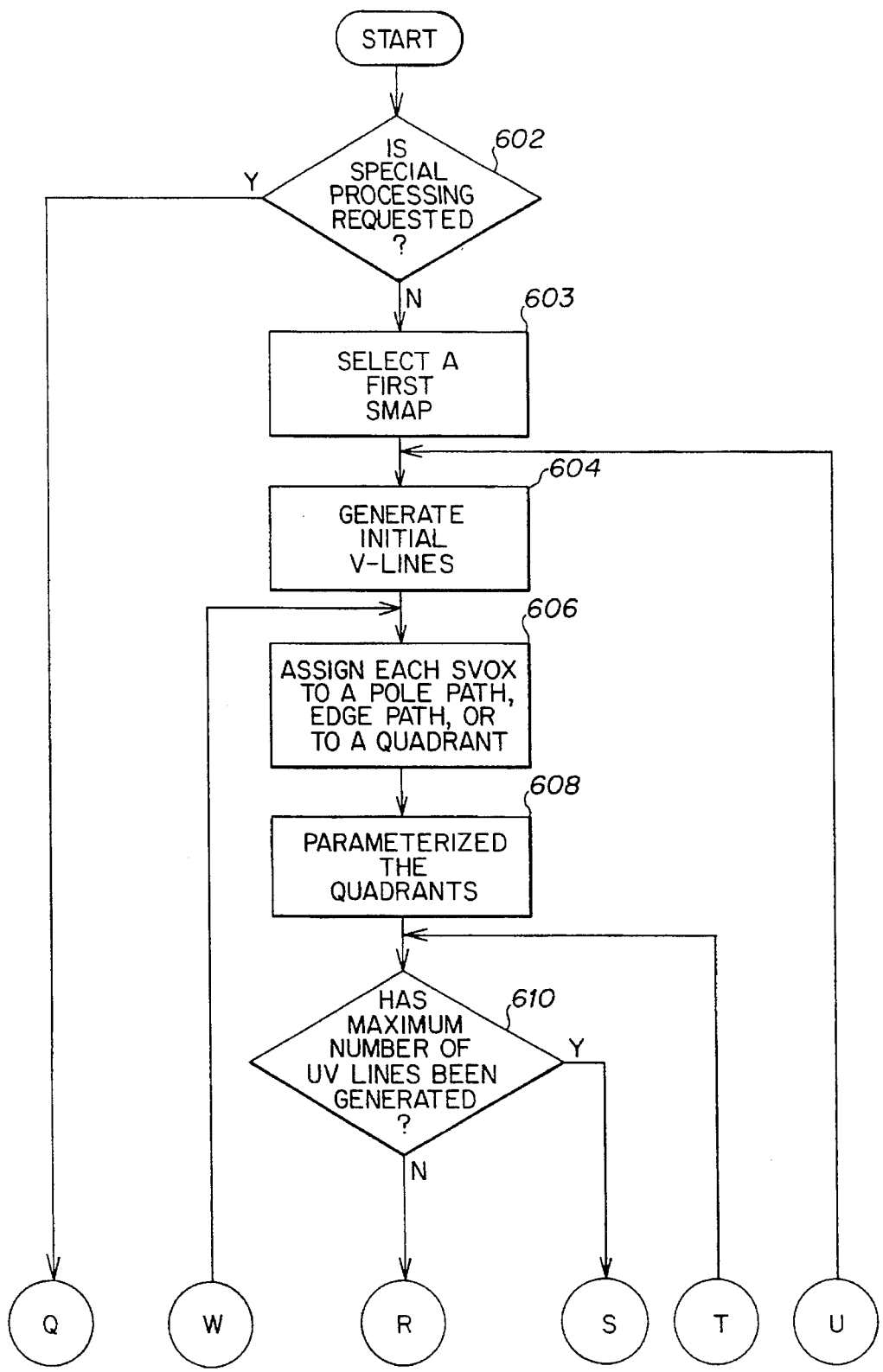
Figure 42:
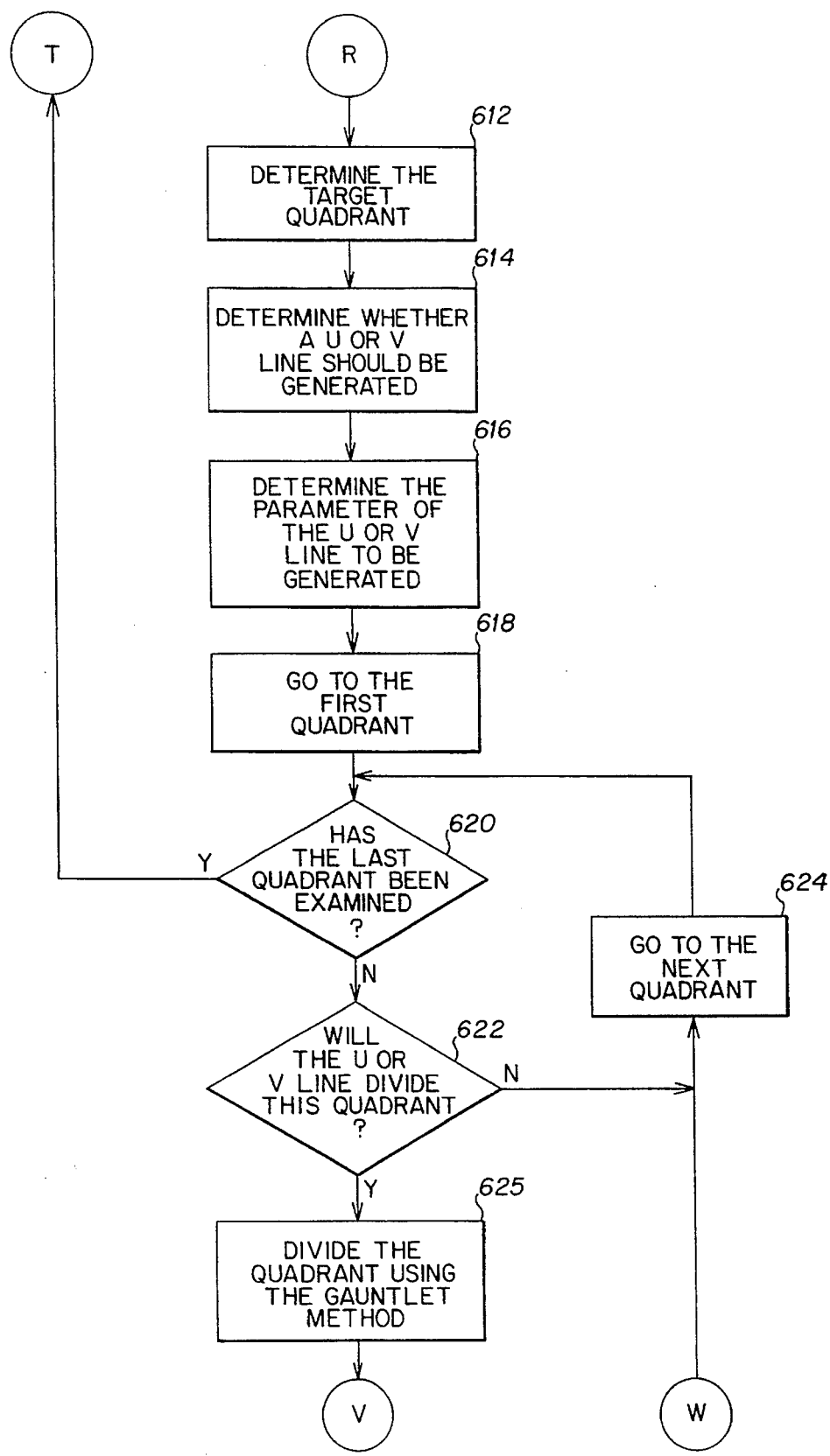
Figure 43:
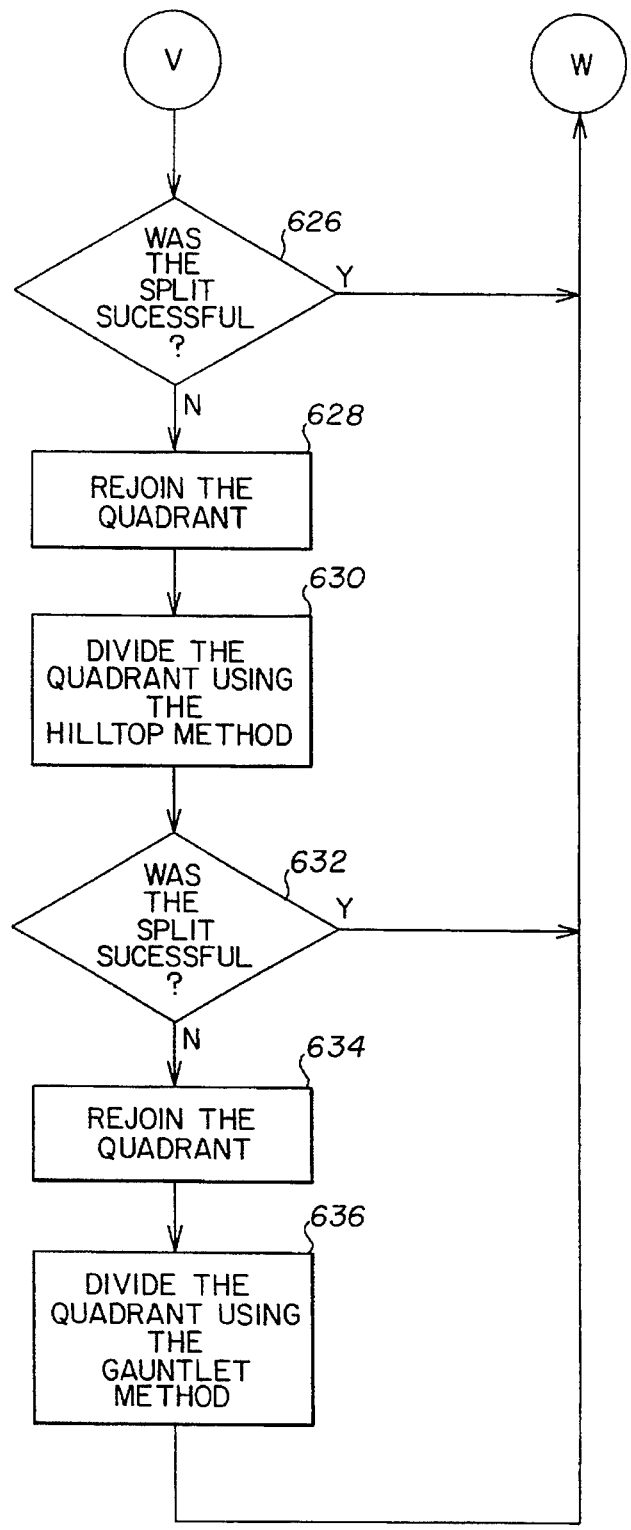
Figure 44:
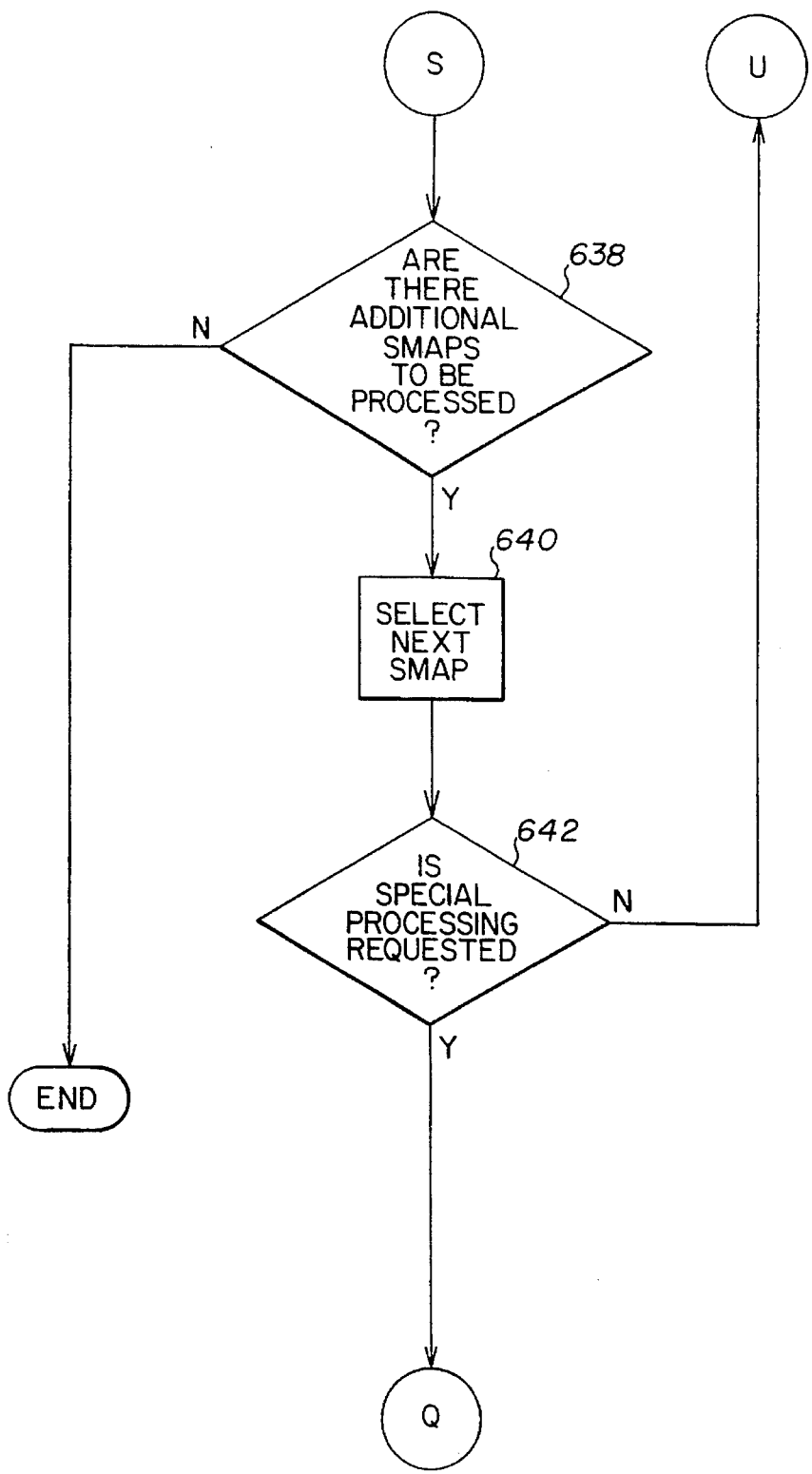
Figure 45:
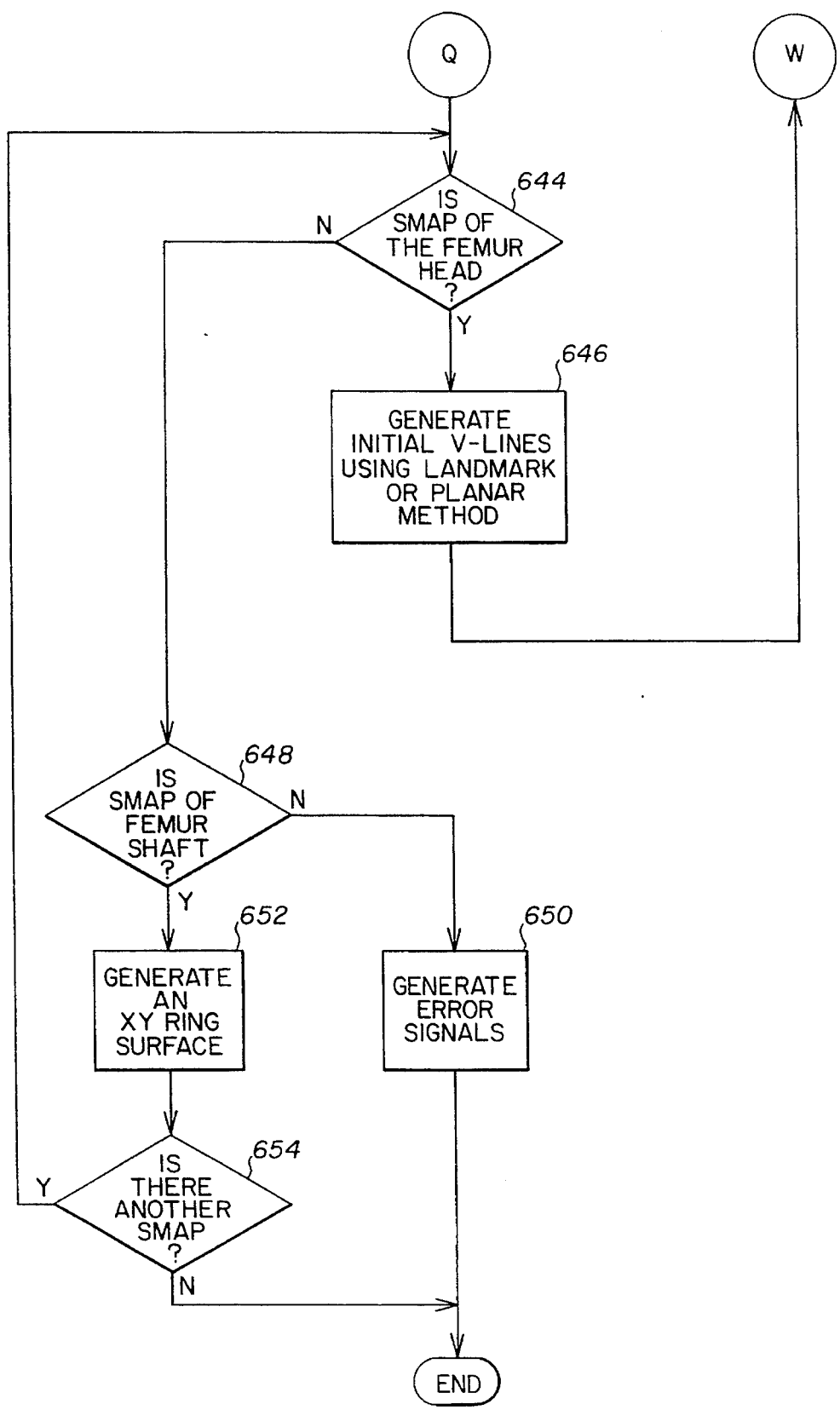
Figure 47:
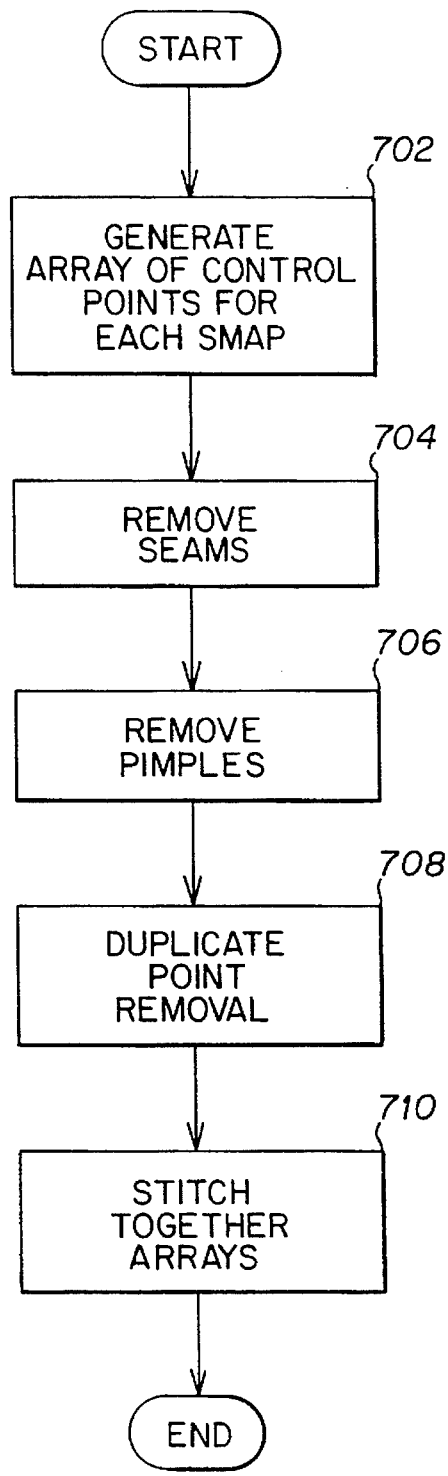
Figure 48A:
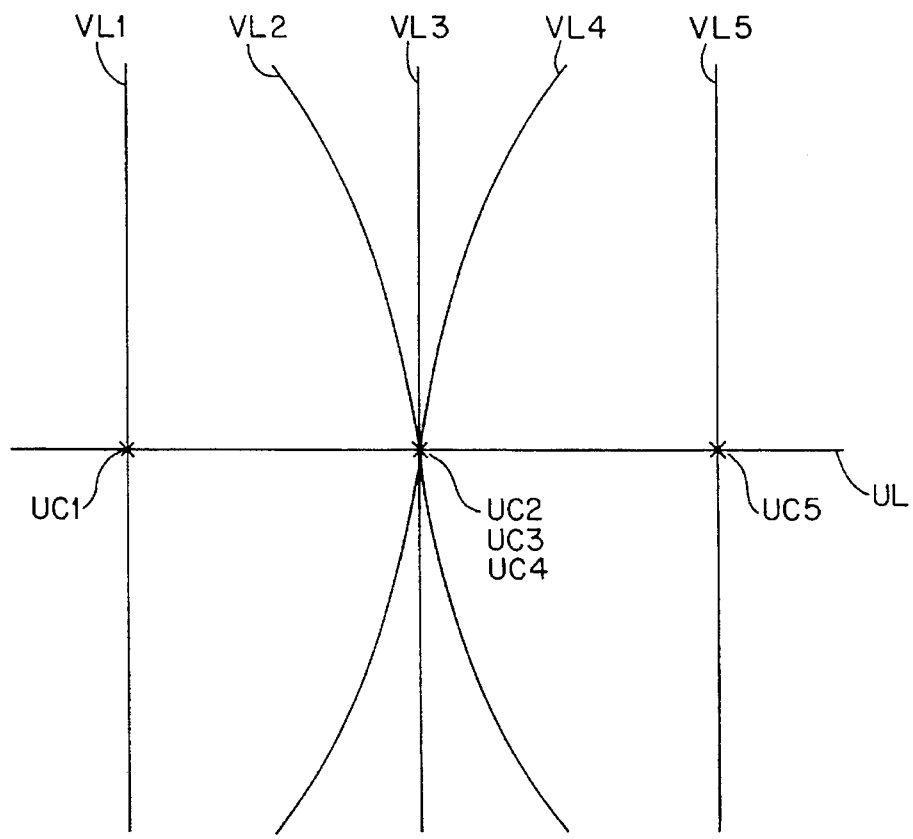
Figure 48B:
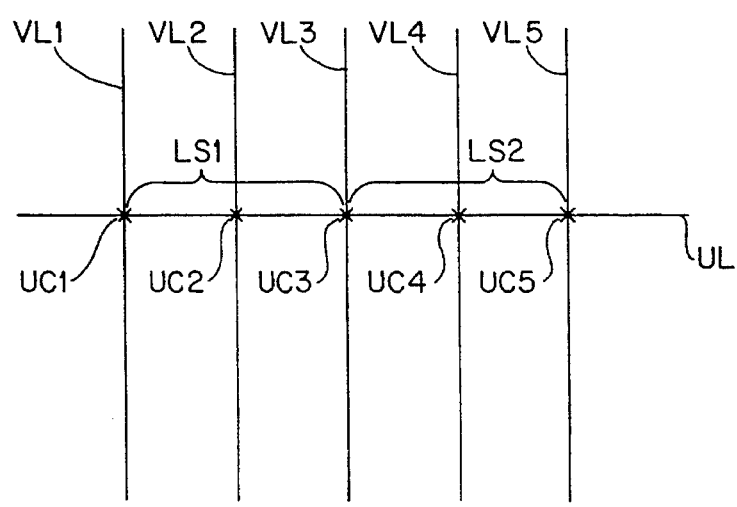
Figure 49:
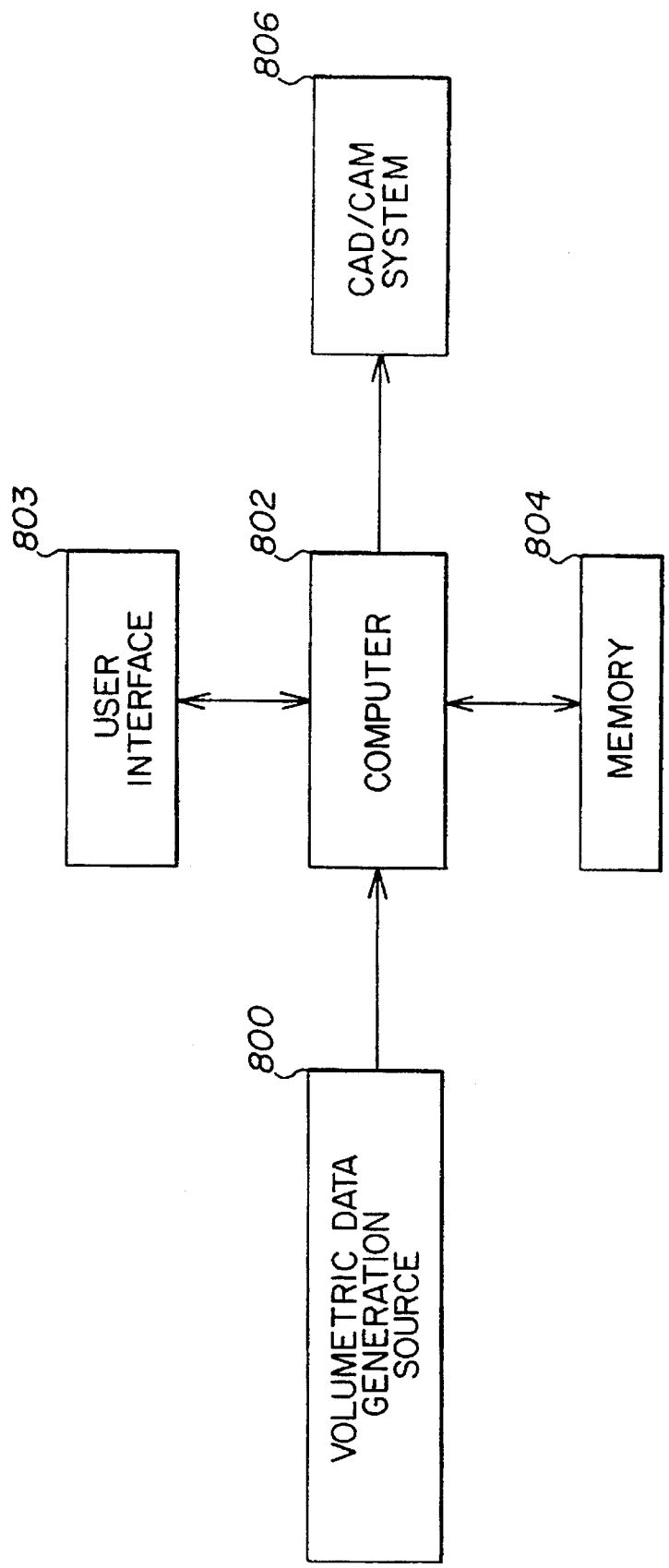
Figure 50:
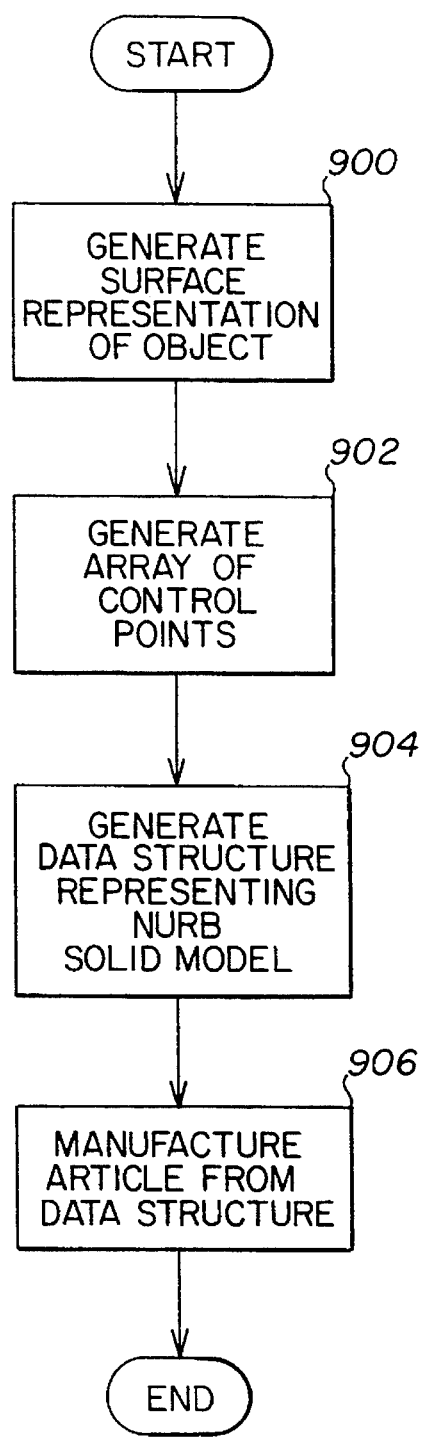
Figure 51:
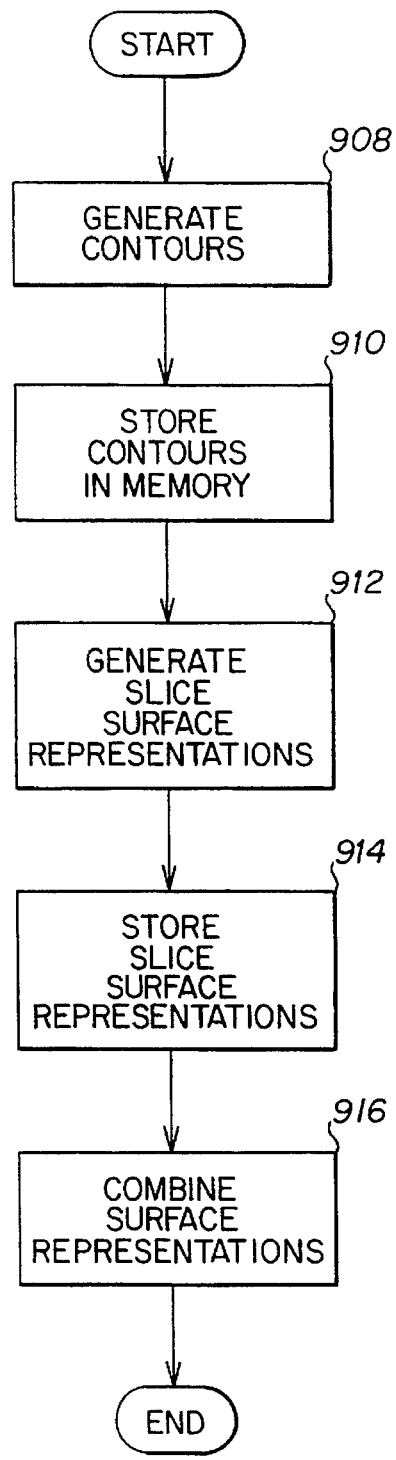
Figure 52:
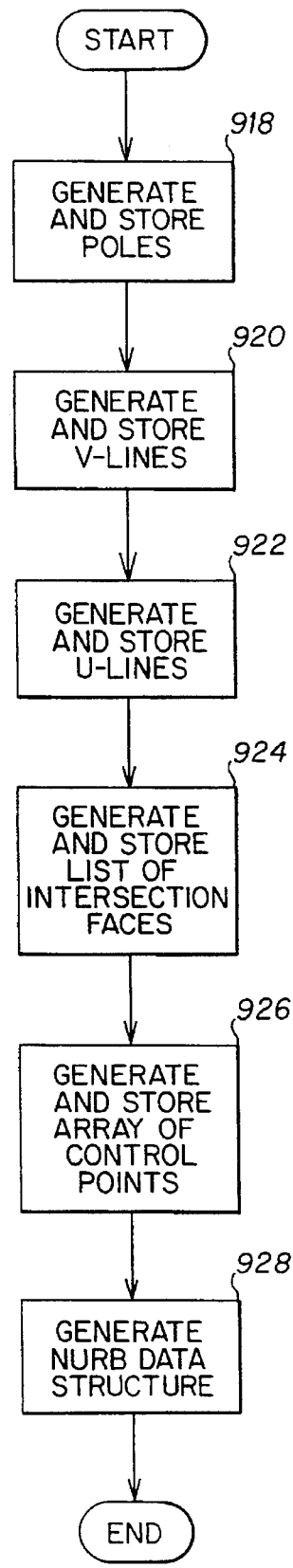
Figure 53:
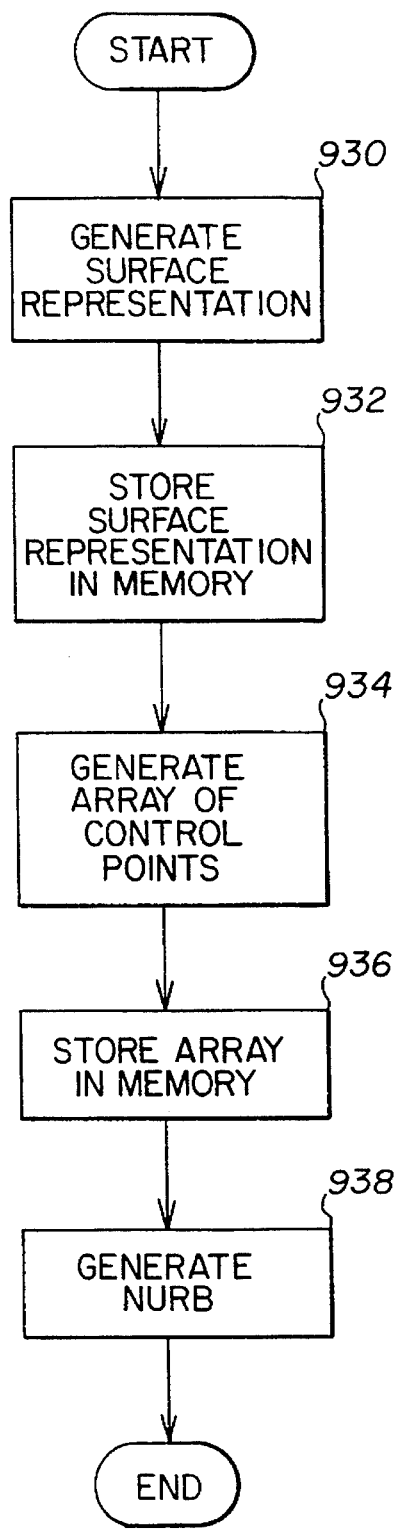

FIGS. 21(a)–(k) illustrates various object topological classifications;

FIGS. 22(a)–(f) shows several special femur topological classifications;

FIGS. 23(a)–(b) are top views of two slices of volumetric data illustrating the manner in which wormhole can be formed;

FIG. 24 is a top view of a combination of the two slices shown in FIGS. 23(a)–(b);

FIG. 25 is a data structure utilized to implement a SVOX;

FIG. 26 is a perspective view of a rectilinear cube showing the SVOXs that can be used to model it;

FIGS. 27(a)–(b) illustrate the various orientations that a SVOX can be assigned;

FIG. 28 is a flowchart illustrating the steps of the subroutine SMAPGEN;

FIG. 29 is a flowchart illustrating additional steps of the subroutine SMAPGEN;

FIG. 30 is a flowchart illustrating additional steps of the subroutine SMAPGEN;

FIG. 31 is a cross-sectional view of an object represented in terms of volumetric data which illustrates how top and bottom SMAPs can be generated on slices other than the top and bottom slices;

FIG. 32 is a flowchart illustrating the initial steps of the SMAP generation process;

FIG. 33 is a flowchart illustrating additional steps of the SMAP generation process;

FIG. 34 is a flowchart showing additional steps of the SMAP generation process;

FIG. 35 is a flowchart showing additional steps of the SMAP generation process;

FIG. 36 is a flowchart illustrating additional steps of the SMAP generation process;

FIG. 37 is a flowchart illustrating additional steps of the SMAP generation process;

FIGS. 38(*a*)–(*f*) illustrate the manner in which the special femur topologies are modeled;

FIGS. 39(*a*)–(*i*) illustrate an object undergoing the reiterative DUV process and representations of the object in UV;

FIG. 40 is a cross-section view of a femur illustrating the landmark SVOXs to be utilized with the landmark method of generating initial V-lines during the reiterative DUV process;

FIG. 41 is a flowchart illustrating the initial steps of the reiterative DUV process;

FIG. 42 is a flowchart illustrating additional steps of the reiterative DUV process;

FIG. 43 is a flowchart illustrating additional steps of the reiterative DUV process;

FIG. 44 is a flowchart illustrating additional steps of the reiterative DUV process;

FIG. 45 is a flowchart illustrating additional steps of the reiterative DUV process;

FIG. 46(*a*)–(*b*) is a chart showing the correlation between object topology and the method utilized for generating the initial v-lines during the reiterative DUV process;

FIG. 47 is a flowchart showing the DUV post-processing steps;

FIGS. 48(*a*)–(*b*) are cross-sectional view of UV line illustrating the manner in which duplicate point removal can be performed;

FIG. 49 illustrates a hardware system for implementing the method of the present invention;

FIG. 50 is a flowchart illustrating the primary steps in a method for generating a replica of an object represented in terms of volumetric data;

FIG. 51 is a flowchart illustrating the primary steps in a method for operating a computer to generate a surface representation of an object represented in terms of volumetric data;

FIG. 52 is a flowchart illustrating the primary steps in a method for operating a computer to generate a data structure representing a NURB solid model of an object represented in terms of surface data;

FIG. 53 is a flowchart illustrating the primary steps in a method for operating a computer to generate a surface representation of an object represented in terms of volumetric data; and FIGS. 54(*a*)–(*j*) illustrate several additional body types that can be supported by the method of the present invention and the manner in which they can be modeled.

DETAILED DESCRIPTION

The present invention is directed toward a method and apparatus for generating a contiguous solid model of an object defined in terms of volumetric data. A number of sources are known for generating a volumetric data representation of an object. These sources include, but are not restricted to, apparatus for performing the following processes CAT scanning, Magnetic Resonance Imaging (MRI), Radio Isotope Imaging (PET/SPECT), Digital Subtraction Angiography (DSA), ultrasound, core sampling, Pathological/manual slice/contour generation, surveying, sonar, simulations and laser scanning. In addition to these sources, the present invention could operate upon the data output from any other source for generating a volumetric data representation of an object. Therefore, when reference is made herein to a source for generating a volumetric data generation representation of an object, the source is intended to include any of the specific sources described above, as well as other sources that generate similar types of volumetric data representations.

Figure 1:
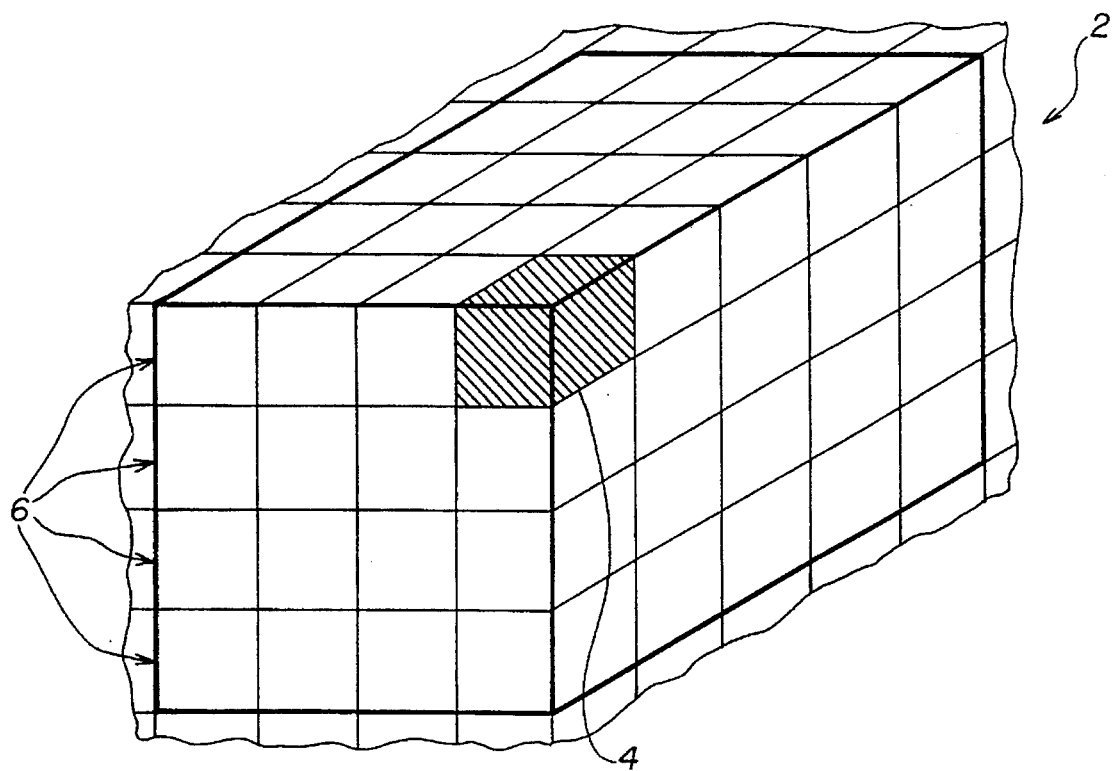
FIG. 1 is a perspective view of a portion of data output by a means for generating a volumetric representation of an object.

FIG. 1 is a graphical representation of a portion 2 of a volumetric data output that may be generated by any of the sources described above. The smallest unit of information that makes up the volumetric data representation of the object is a voxel. As illustrated by the voxel 4 shown in cross-hatching in FIG. 1, a voxel is a rectilinear cube volume. The portion of volumetric data shown in FIG. 1 includes a group of eighty voxels. The number of voxels generated to model an object varies depending upon the particular source utilized for generating the volumetric model. When a CAT scan is utilized, a 512×512 array of voxels is generally generated. In the portion of volumetric data shown in FIG. 1, each row 6 of voxels corresponds to a slice of data output by the volumetric data generation source. Typically, ten to eighty slices of data will be utilized to generate a three-dimensional representation of the object. The volumetric data generation source assigns a density value to each voxel representing the density of the object in the volume corresponding to the voxel. The range of possible density values will vary depending upon the particular data generation source utilized. When a CAT scan is utilized, the density of each voxel is typically defined by a 12-bit data field.

As can be appreciated from the foregoing, the model of the object produced by the volumetric data generation source includes a large amount of data. For example, a typical CAT scan process will generate ten to eighty slices of 512×512 arrays of voxels, each voxel having a density value defined by a 12-bit data field. This volumetric representation of the object is very detailed and includes information relating to the manner in which the density of the object varies throughout its entire volume. Additionally, this model represents the object in terms of a plurality of discrete voxels.

As stated above, the present invention is directed toward a method and apparatus for generating a solid model of an object that is represented in the volumetric data format described above. The primary steps for implementing the method of the present invention are shown in FIGS. 2–3. Each of these primary steps is implemented by a plurality of sub-steps that are described in more detail below.

In step 100, the output from the volumetric data generation source is pre-processed. The representation of the object in terms of volumetric data is data-intensive and includes a large amount of information that is unnecessary for generating a solid model of the object. The purpose of the pre-processing step 100 is to discard unnecessary information and to convert the volumetric data into a format more easily operated upon by the remaining steps of the method.

In step 200, inner and outer contours of the object represented by the pre-processed volumetric data are generated to determine the inner and outer surfaces of the object. The contours are then analyzed in step 300 to determine whether they include certain relevant features that are useful during the topological analysis process conducted in step 400.

During step 400, the results of the contour analysis are reviewed and based upon its topology, the object is classified as falling within one of a group of pre-determined object types. Experience has shown that the best technique for generating a solid model of an object varies depending upon the topology of the object. Therefore, the classification done during step 400 is used in later steps of the method to determine the technique for generating the most accurate solid model of the object.

In step 500, one or more surface maps (SMAPs) are generated for the object. A SMAP is a data structure that describes the object volume as a collection of planar faces that enclose the volume. A SMAP is formed by connecting together a plurality of surface voxel faces (hereafter SVOXs) that enclose the volume. Each SVOX is defined in terms of the voxel to which it belongs, as well as the orientation of the SVOX on that voxel. SMAPs will be more fully described below.

In step 600, the reiterative directed U-V (DUV) process is performed on each SMAP generated in step 500. The reiterative DUV process involves the generation of a series of mesh lines across the SMAP surface. The intersections of the mesh lines define a plurality of control points for establishing a NURB surface representation of the SMAP as is more fully described below.

In step 700, the data generated by the reiterative DUV process is post-processed to enhance the accuracy and reliability of the NURB surface represented by the array of control points generated at step 600.

Finally, in step 800, the post-processed data is converted into IGES format. IGES (Initial Graphics Exchange Specification) format is a format recognized by the United States National Bureau of Standards. The IGES format provides a standard that represents the object in terms of parametric (NURB) surfaces, trimmed surfaces, and/or other geometric entities. The IGES file generated at step 800 can be used as an input to any CAD/CAM system that features an IGES translator.

FIG. 49 illustrates a hardware system upon which the above-described method can be implemented. A volumetric data generation source 800 is utilized to probe the object for which the solid model representation is to be generated and to generate a volumetric data representation of the object. The volumetric data generation source 800 can be any one of a number of different apparatus as described above. The volumetric data representation generated by the volumetric data generation source 800 is sourced to a computer 802. The computer 802 is coupled to a user interface 803 to enable a user to input and receive information regarding the method. The computer 802 is also coupled to a memory 804 which the computer utilizes for storing information during the execution of the method. The steps of the method described above are implemented in the computer 802 and the memory 804 to generate a NURB solid model of the object. In the configuration shown in FIG. 49, the computer 802 is coupled to a CAD/CAM system 806. As a result, the NURB solid model of the object generated by the method executed on computer 802 can be utilized to control the operation of the CAD/CAM system where various operations such as numerical control, finite element modeling, simulating procedures, measurement and CAD design can be performed. For example, the CAD/CAM system can be used to make tool paths for automatic milling and lathing machines through numerical control. The machines having these tool paths could then be operated to generate replicas of the object, or to make parts that engage the object and must be fitted thereto. For example, an automobile body part could be probed by the volumetric data generation source 800 and a NURB solid model generated for the part could then be utilized to make tool paths for manufacturing the part on milling and lathing machines.

The NURB solid model of the object generated by the method executed on computer 802 can also be utilized to control the operation of the CAD/CAM system to directly generate replicas of the object. When a CAD/CAM system is utilized to generate a replica of the object, it will utilize the NURB solid model to manufacture an article having a surface topology that is substantially identical to the NURB surface model. As used herein, the topology of the manufactured article is considered to be identical to that of the NURB solid model if it has a substantially identical shape, even if the article is scaled from the NURB surface model so that it has a different size.

Although the computer 802 is coupled to a CAD/CAM system in FIG. 49, it should be understood that various other systems that receive NURB solid models of an object as input data could also be coupled to computer 802 so that the NURB solid model generated by the method could be used in a variety of other ways. As stated above, each of the steps shown in FIGS. 2–3 is implemented by a plurality of sub-steps. The sub-steps for each will now be described.

PRE-PROCESSING

The steps for pre-processing the volumetric data are shown in FIG. 4. In step 102, the volumetric data is interpolated to achieve greater resolution. For example, if the volumetric data is generated by a CAT scan, it might consist of 67 slices spaced 3.0 mm apart. This information may be interpolated to 2.0 mm, resulting in 100 slices and providing greater resolution. Additionally, if the slices of volumetric data do not all have the same thickness, new slices may be created to equalize the thickness of the slices. Although it is desirable to interpolate the volumetric data for the reasons stated above, interpolation of the data is not a necessary step and the present invention can be performed on data that is not interpolated. After the data is interpolated, it is segmented in step 104. Segmenting is a process whereby only the voxels that correspond to the object to be modeled are selected. The output from the volumetric data generation source will often include information relating to background substances in addition to the object to be modeled. For example, one application in which the present invention can be utilized is for generating a solid model of a patient's bone which can then be used to drive a CAM system to generate a replica of the bone which can then be used to design a customized prosthesis. For that type of application, a CAT scan (or one of the other data generation source described above) is performed on the patient to generate a volumetric representation of the bone. The CAT scan output also includes information relating to background substances surrounding the bone, such as muscle tissue and the like. Therefore, in order to determine which portions of the volume represent the bone to be modeled, the volumetric data is segmented.

The volumetric data can be segmented in any number of different ways. For example, a user can examine a graphical representation of the volumetric data on a graphic display system and can manually select the voxels that correspond to the volume of the object to be modeled. Alternatively, a simple algorithm can be utilized to separate the voxels corresponding to the object from the other voxels in the volumetric data output from the volumetric data generation source. As stated above, the volumetric data generation source assigns a density value to each voxel, the density valve representing the density of the examined area in the volume corresponding to the voxel. One algorithm that has been developed for segmenting the data selects a range of density values that define the object to be modeled, and then analyzes each voxel to determine whether its density value falls within the selected range. If the density value of a voxel falls within the selected range, the voxel represents the object and is selected by setting its density value to "1". Conversely, if the density value for a voxel does not fall within the selected range, the voxel does not represent the object and it is not selected by setting its density value to "0". Segmenting of the data can also be performed by a combination of this algorithm and manual intervention by first performing the algorithm on the data and then having a user analyze the results and optimize them manually.

A gradient based algorithm could also be used to segment the volumetric data. A gradient based algorithm could determine the volume that defines the object to be modeled by examining the rate of change of voxel density values from one voxel to another to determine the outer edges of the object. Additionally, a percentage classification algorithm could be utilized that examines the density of each voxel in relation to the other voxels in its area of the volume to determine which voxels correspond to the object to be modeled.

As can be seen from the foregoing, after the data has been segmented, each voxel is set to either "1" if it is part of the volume that defines the object to be modeled and is set to "0" if it is not part of the object volume.

CONTOUR GENERATION

The contour generation process 200 will now be described making reference to FIGS. 5–10. By way of overview, the contour generation process 200 is performed on a slice-by-slice basis. Contours are generated on each slice that define the inner and outer surfaces of the object represented on that slice. As a result of the segmenting step 104, the object is represented volumetrically by voxels that are set to "1". Therefore, the contours of the object are determined based upon the density values for each voxel on the slice.

The contour generation process is begun in step 202 by examining the first voxel on the first slice. The selection of a particular voxel as being the first voxel is totally arbitrary. All that is required is that the process be able to iteratively step through the array of voxels on each slice in an organized manner so that each voxel can be examined. Similarly, the first slice can be arbitrarily selected as either the top or bottom slice.

Once the first voxel is located, a determination is made in step 204 as to whether it is set to "1". If the voxel is not set to "1", the method proceeds to step 206 where a determination is made as to whether the voxel examined in step 204 is the last voxel on the slice. If the last voxel has not been examined, the method proceeds, in step 208, to examine the next voxel and returns to step 204 wherein a determination is made as to whether the newly examined voxel is set to "1" In this manner the contour generation process iteratively examines the voxels on the slice being processed until it locates a voxel that is set to "1".

When it is determined at step 204 that a voxel is set to "1" (i.e. that it is selected), the contour generation process proceeds to step 210 wherein a contour is generated beginning with that voxel, the voxel defining a seed for the contour. The manner in which a contour is generated will now be described, making reference to FIG. 7.

Figure 7:
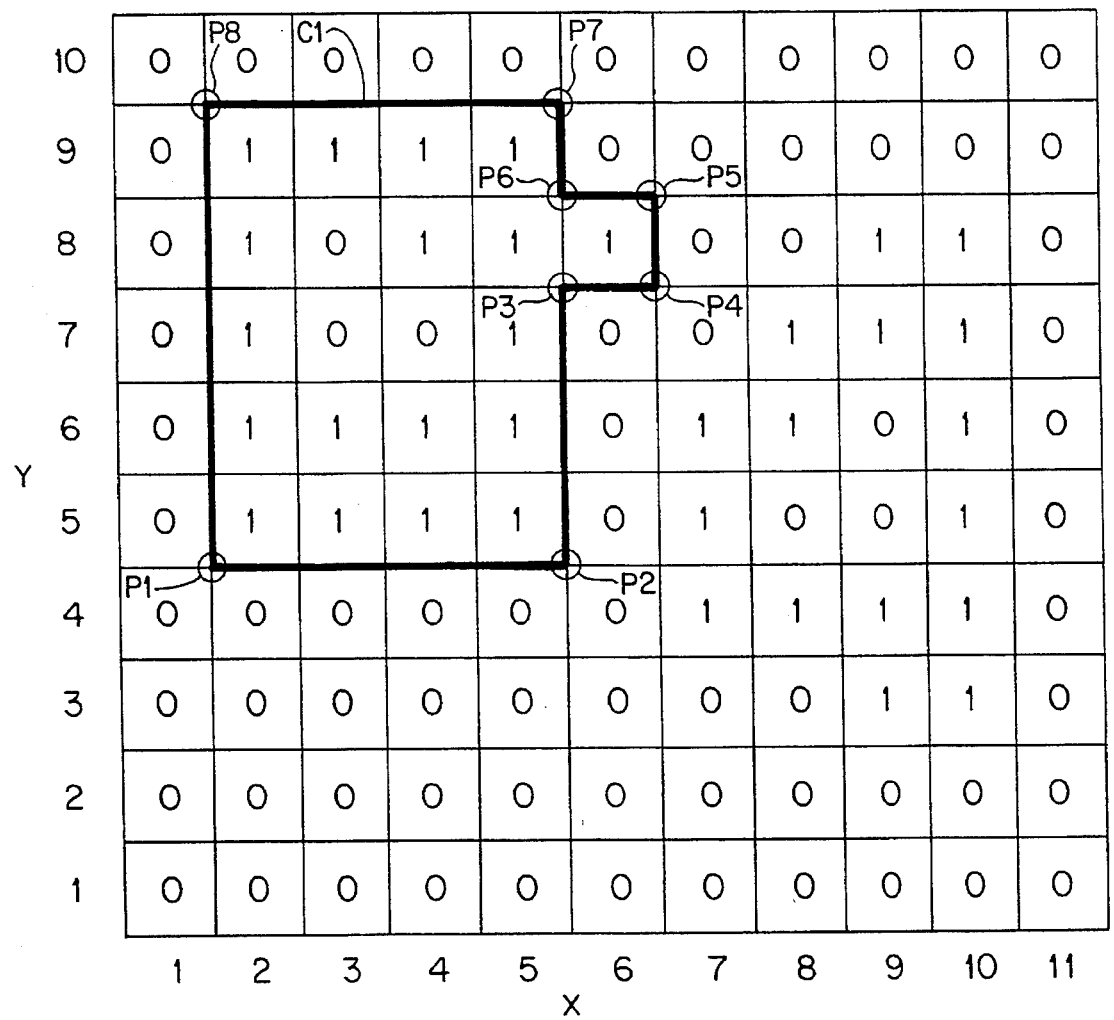
FIG. 7 is a top view of a slice of volumetric data on which a first outer contour has been generated by the contour generation process.

A contour is a series of points, defined in terms of the voxel XY coordinates, that define an outer or inner surface of the object represented by the volumetric data. FIG. 7 shows an array of 11×10 voxels. If, for example, the voxel defined at x=2, y=5 were detected as the first voxel set to "1", a contour C1 illustrated by the bold line would be formed using this voxel as a seed. The contour C1 is defined by eight XY control points P1–P8 that define the points where the contour C1 changes direction. The contour C1 is generated by examining each voxel adjacent to the seed voxel, including those that are diagonally adjacent, and determining which of those voxels are selected. Thereafter, the adjacencies for the selected voxels adjacent the seed are also examined. This process continues until all the selected voxel adjacencies have been found. The contour is then generated, beginning with the seed, so as to include all the selected voxels on the slice for which an uninterrupted path of adjacent selected voxels can be drawn to the seed voxel.

After the contour is generated, the contour generation process proceeds to step 212 wherein a list of voxels enclosed by the contour is generated in terms of their XY coordinates. In the example shown in FIG. 7, the contour C1 encloses twenty-one voxels. After the list of enclosed voxels has been generated, the contour generation process proceeds to step 214 wherein the number of voxels enclosed by the contour is compared with a predetermined minimum voxel number that is defined by the user. This minimum voxel value is established for tolerancing reasons so that the method can detect whether a segmenting error has occurred. If the area enclosed by the contour is less than the minimum value established by the user, it is below the established tolerance and the process assumes that the voxels within the contour were set to "1" as a result of a segmenting error and do not accurately represent the object. Therefore, if it is determined at step 214 that the number of enclosed voxels is less than the required minimum value, the contour generation process proceeds to step 216 wherein the contour is discarded so that it will not be used by the later steps in the process. Additionally, a warning signal is also generated to indicate to the user that some portion of the segmented volume has been discarded. Thereafter, in step 218, the contour generation process advances to the next voxel and then returns to step 204 to continue with the generation of contours on the slice.

Figure 8:
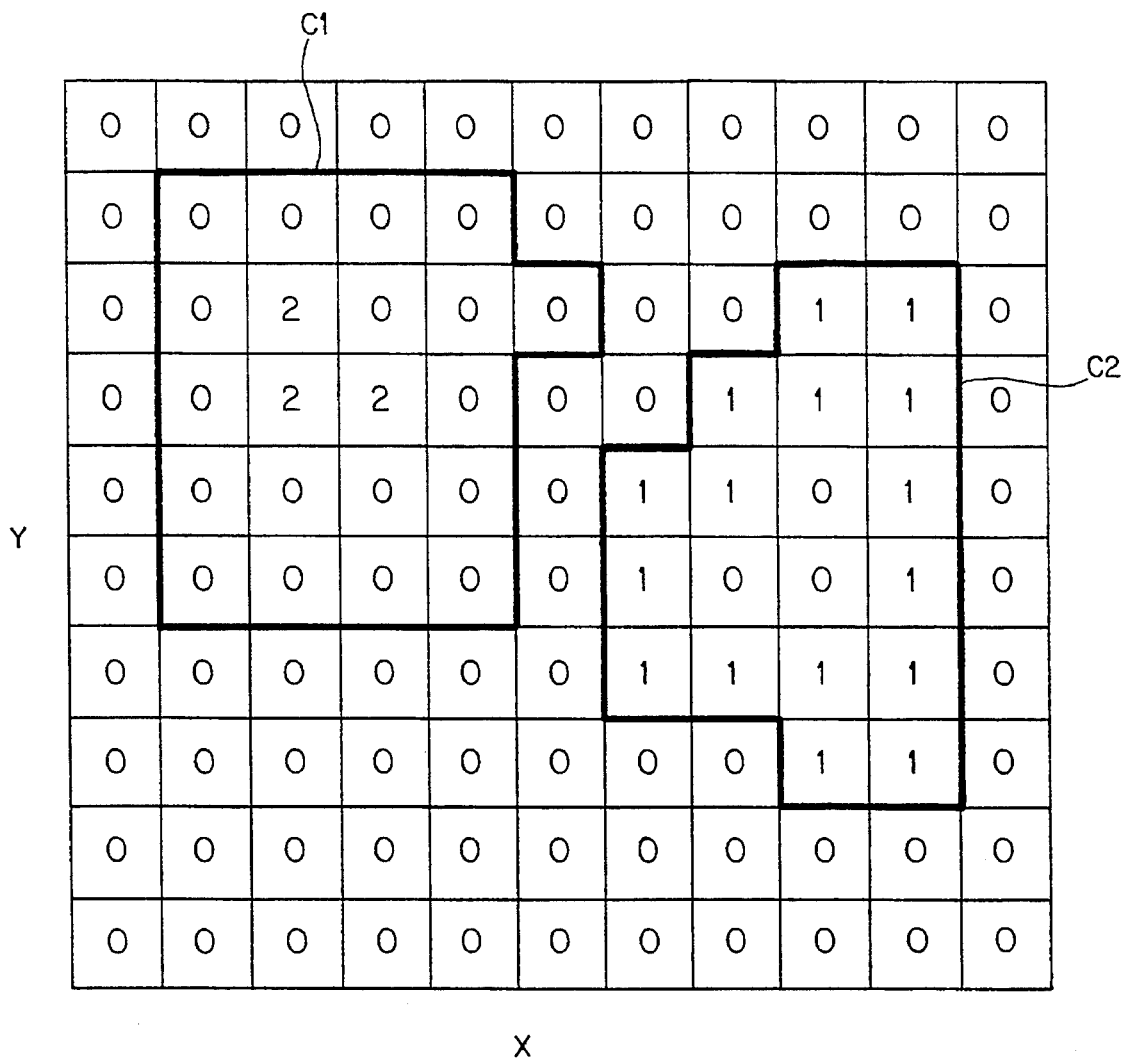
FIG. 8 is a top view of a slice of volumetric data on which first and second outer contours have been generated by the contour generation process.

When it is determined at step 214 that the number of enclosed voxels exceeds the minimum established value, the contour generation process proceeds to step 220 wherein the voxel values of the voxels enclosed by the contour are converted in the following manner: (1) the enclosed voxels that were originally set to "0" are set to "2" and (2) the voxels that were originally set to "1" are set to "0" FIG. 8 shows the results of this conversion process for contour C1. The voxel values are converted in step 220 to assist in the generation of additional contours on a single slice. If there are voxels enclosed by the contour that were originally set to "0", it indicates that the object not only includes an outer surface for which the first contour was generated, but also includes an inner surface, enclosed within the outer contour, for which an additional contour will need to be generated. These voxels are set to "2" to enable the contour generation process to locate them later in the process in the manner described below.

After the enclosed voxel values are converted in step 220, the creation of the contour is complete. The contour generation process then proceeds to the next voxel in step 218 and returns to step 204. Through the execution of steps 204–208, the contour generation process successively examines the remaining voxels on the slice to determine whether any of them are set to "1". Because the voxel values for the voxels enclosed by the contours previously generated have been converted so that their values are set to either "0" or "2", they will not be detected at step 204. As a result, the only voxels that will be detected at step 204 are those that have values set to "1" and are not enclosed within any previously generated contour. In the example shown in FIGS. 7–10, there are some voxels set to "1" that are not enclosed by contour C1 and therefore did not have their values converted to "0" at step 212 following the generation of contour C1. Therefore, as the process proceeds to examine the remaining voxels on the slice, the process will detect, at step 204, another voxel on the slice that is set to "1". At that point, the process proceeds to step 210 wherein a contour C2 (FIG. 8) is generated. Thereafter, in steps 212 and 214, a list of voxels enclosed by contour C2 is generated and a determination is made as to whether the number of enclosed voxels exceeds the minimum value in the same manner as was described above with reference to contour C1. If the number of enclosed voxels does not exceed the minimum value, the process proceeds in step 216 to discard the newly generated contour C2. If it is determined at step 214 that the number of enclosed voxels exceeds the minimum established value, the voxel values are converted in step 220 in the same manner as was described above with reference to contour C1. The method then proceeds, in step 218, to the next voxel and returns to step 204. In this manner, the contour generation process establishes outer contours for every group of voxels that are set to "1" on the slice.

The contour generation process proceeds in the manner described above until it is determined at step 206 that the last voxel on the slice has been examined. At that point, the process proceeds to re-examine the first voxel at step 222 (FIG. 6) and then proceeds to step 224. At step 224, a determination is made as to whether the voxel value for the voxel being examined is set to "2" If the voxel value is not set to "2", the contour generation process proceeds in step 226 to determine whether the voxel being examined is the last voxel on the slice. If it is determined that the voxel is not the last voxel, the process proceeds in step 228 to examine the next voxel and then returns to step 224 wherein a determination is made as to whether the voxel has its value set to "2". In this manner, the contour generation process iteratively examines each voxel on the slice until the last voxel has been examined, or until it detects, at step 224, a voxel whose value is set to "2".

Figure 9:
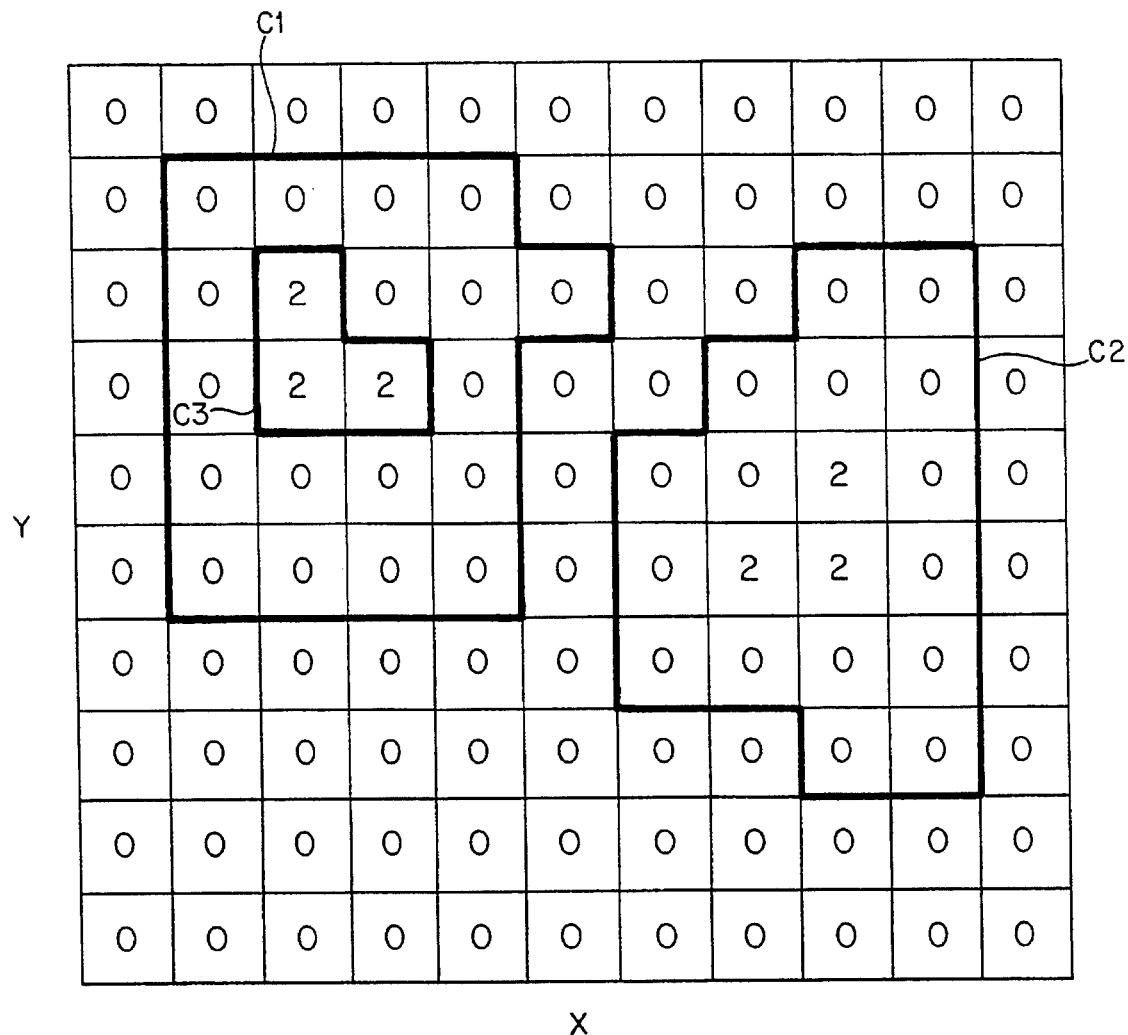
FIG. 9 is a top view of a slice of volumetric data on which two outer contours and an inner contour have been generated by the contour generation process.
Figure 10:
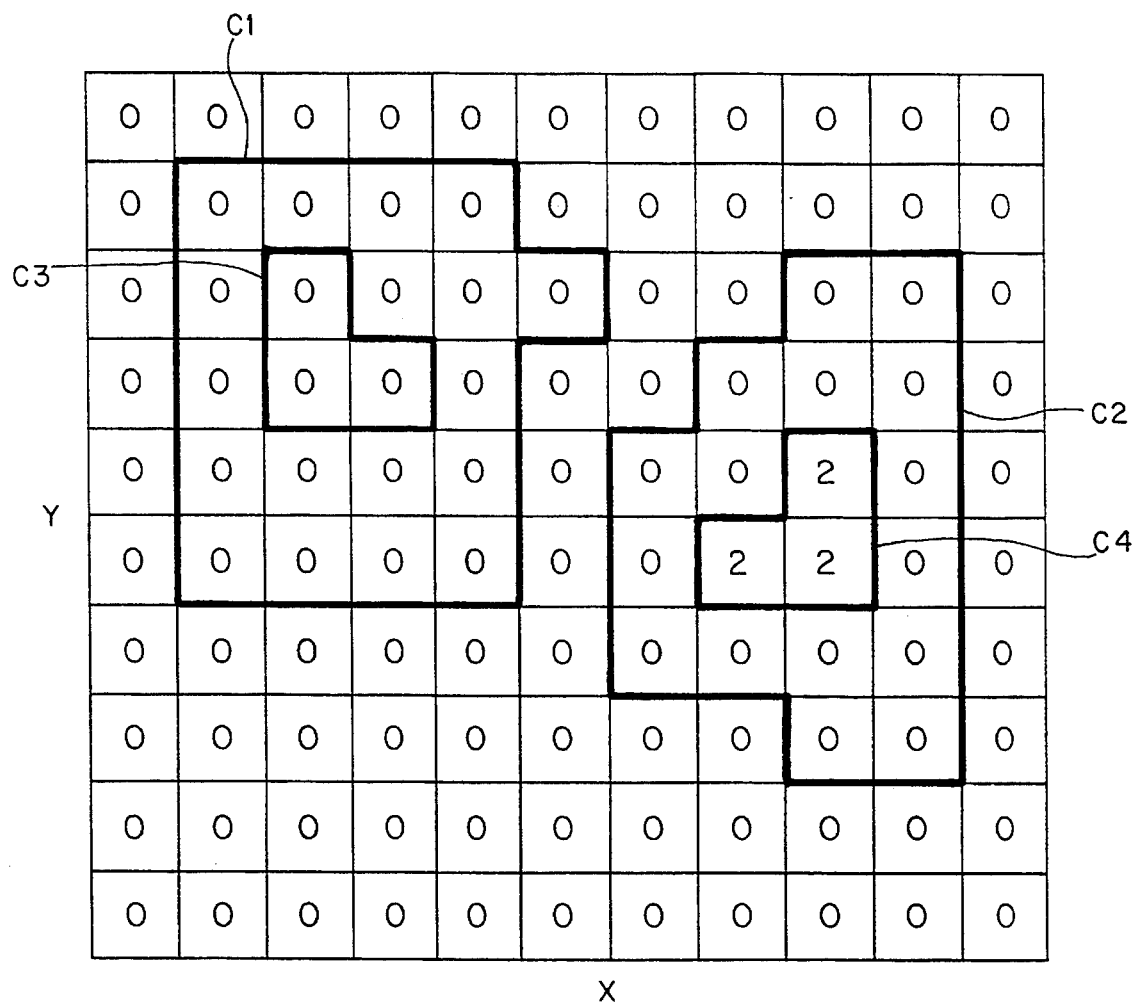
FIG. 10 is a top view of a slice of volumetric data on which two outer and two inner contours have been generated by the contour generation process.

When a voxel having its value set to "2" is detected at step 224, the contour generation process proceeds to step 230 wherein a contour is generated utilizing the detected voxel as a seed. FIG. 9 illustrates an example of a contour C3 that encloses a group of voxels set to "2". After the contour is generated in step 230, the contour generation process proceeds to step 232 wherein a list of the voxels enclosed by the contour is generated. Thereafter, in step 234, the number of voxels enclosed is examined to determine whether it exceeds the minimum value in the same manner as was described above with regard to step 214. If the number of voxels does not exceed the minimum number, the contour is discarded in step 236. The contour generation process then proceeds to the next voxel in step 238 and returns to step 224.

If it is determined at step 234 that the number of enclosed voxels exceeds the minimum value, the voxel values for the enclosed voxels are converted from "2" to "0" in step 240. Thereafter, the contour generation process proceeds to the next voxel in step 238 and then returns to step 224. At step 224, a determination is made as to whether the newly examined voxel is set to "2". Since the voxels enclosed within the previously generated inner contour C3 have been converted to "0", they will not be detected at step 224 as having their values set to "2". Therefore, only voxels set to that are distinct from the groups of voxels enclosed by the inner contours already generated will be detected when the contour generation process returns to step 224 after generating an inner contour. As shown for example in FIG. 10, a voxel enclosed by contour C2 will be detected at step 224 as having its value set to "2" and, at step 230, a contour C4 will be generated utilizing the voxel as a seed in the manner described above with regard to the generation of contour C3.

In the manner described above, the contour generation process iteratively examines the voxels on the slice and generates inner contours for each group of voxels whose value is set to "2" until it is determined at step 226 that the last voxel on the slice has been examined. At that point, the contour generation process proceeds to step 242 wherein a determination is made as to whether the slice just processed was the last slice of the volumetric data. When it is determined at step 242 that the slice examined was not the last slice, the contour generation process, in step 244, proceeds to the next slice and returns to step 202 wherein the first voxel on the slice is examined. As a result, the contour generation process proceeds to generate contours for each slice of the volumetric data in the manner described above until it is determined at step 242 that the last slice has been processed. When it is determined at slice 242 that the last slice has been processed, the contour generation process terminates.

Figure 5:
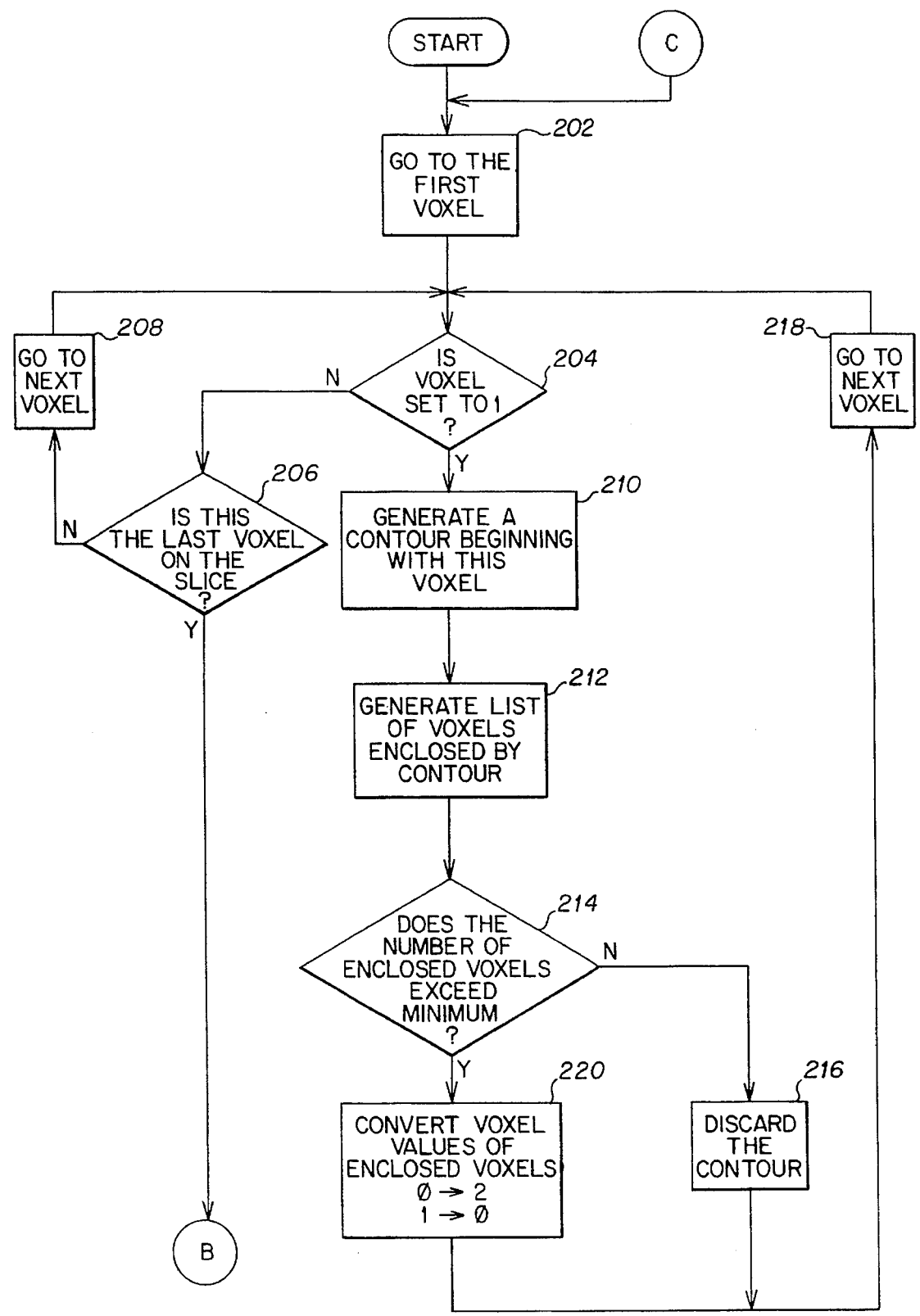
FIG. 5 is a flowchart illustrating the initial steps of the contour generation process.
Figure 6:
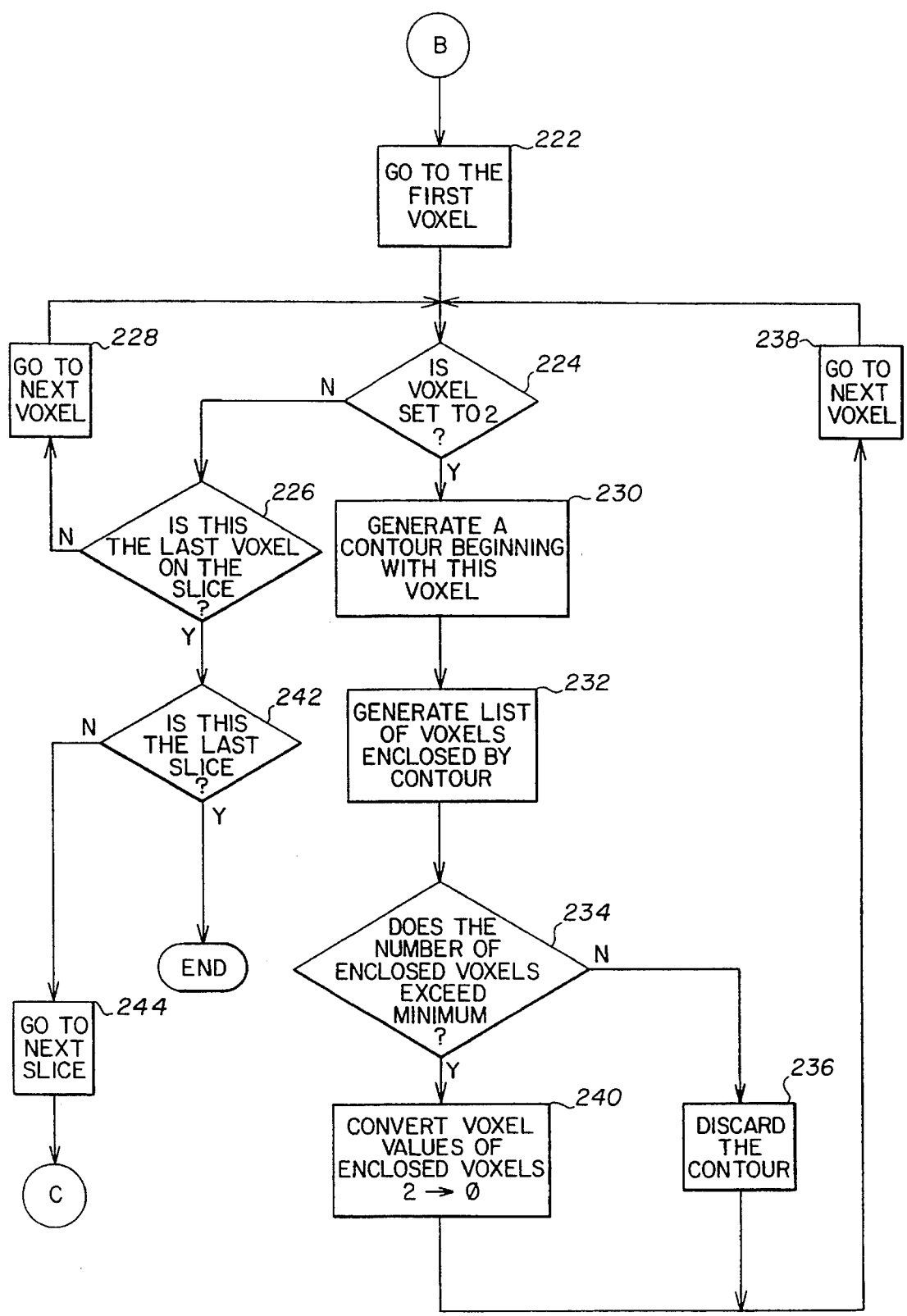
FIG. 6 is a flowchart showing the remaining steps of the contour generation process.

As described above, the specific steps of the contour generation process shown in FIGS. 5–6 enable an inner contour such as contour C3 to be generate within an outer contour such s contour C1. A key step that enables the generation of inner contours is step 220 which, after the outer contour has been generated, converts the voxels enclosed within the outer contour in the following manner: (1) the enclosed voxels that were originally set to "0" are set to "2" and (2) the enclosed voxels that were originally set to "1" are set to "0". As a result, the contour C3 can be generated later in the process around the voxels that are set to "2" In this manner, the contour generation process shown in FIGS. 5–6 can generate one contour that is enclosed within another contour, thereby enabling the process to create representations of objects having hollow areas defined within solid surfaces.

It should be appreciated that the specific steps of the contour generation process shown in FIGS. 5–6 can be modified to enable the process to generate additional layers of enclosed inner contours such that an inner contour could be enclosed within two or more larger contours. In order to generate additional enclosed contours, step 240 could be modified so that, rather than converting every enclosed voxel to "0" after the inner contour C3 is generated, enclosed voxels that were set to "0" could be converted to "0" or some another value other than "0". In this manner, step 240 would perform in much the same manner as step 220 described above in that it would enable further inner contours to be generated around the voxels that are set to "3". Additional steps could be added to detect voxels that are set to "3" and to generate contours around them. When those contours were generated, each enclosed voxel that was set to "0" could be converted to "4" and steps could be added to generate contours around the voxels set to "4". In this manner, additional steps could be added to the process shown in FIGS. 5–6 to generate enclosed inner contours that are enclosed within a large number of contours.

CONTOUR ANALYSIS

Figure 11:
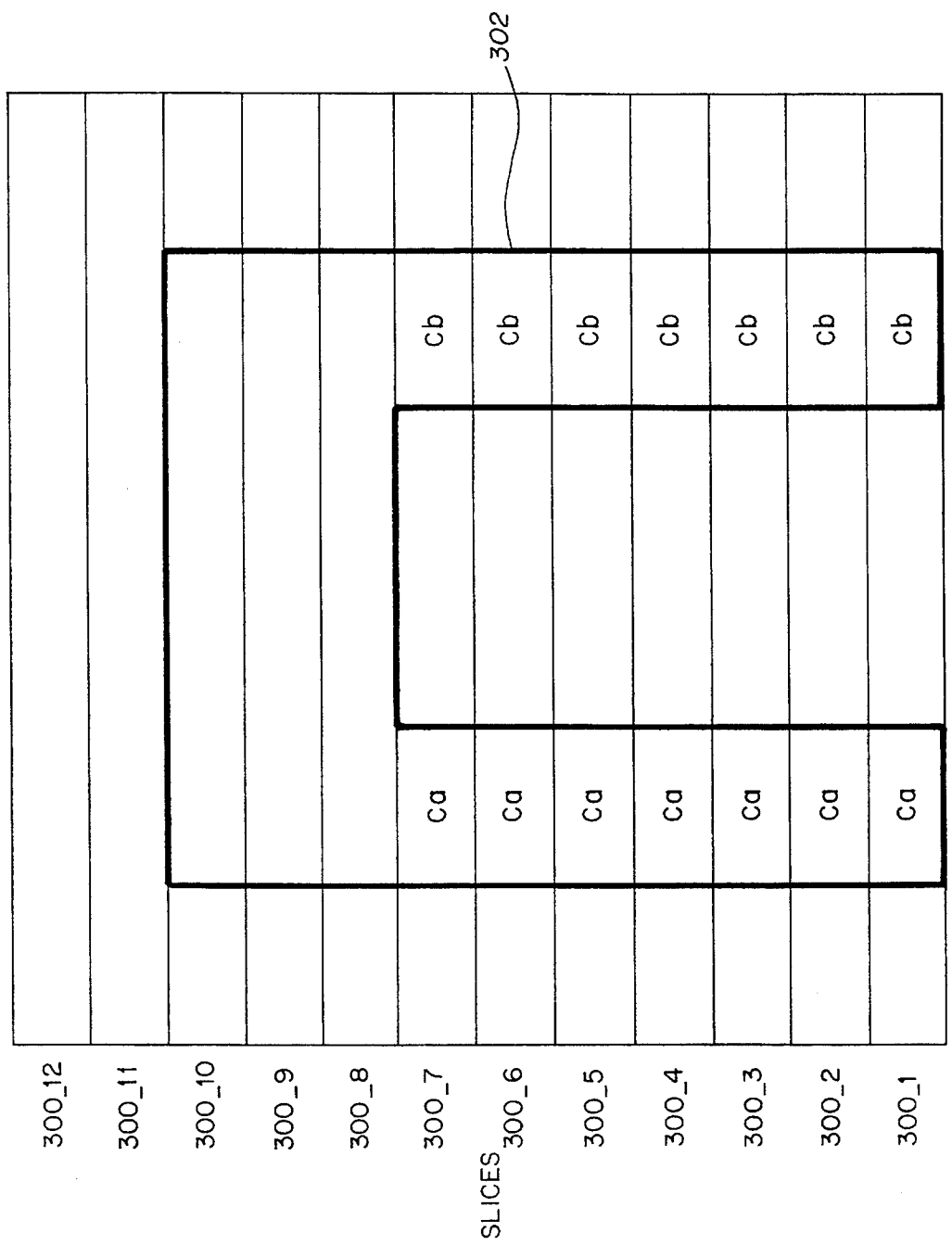
FIG. 11 is a cross-sectional view of an object represented in terms of volumetric data.
Figure 12:
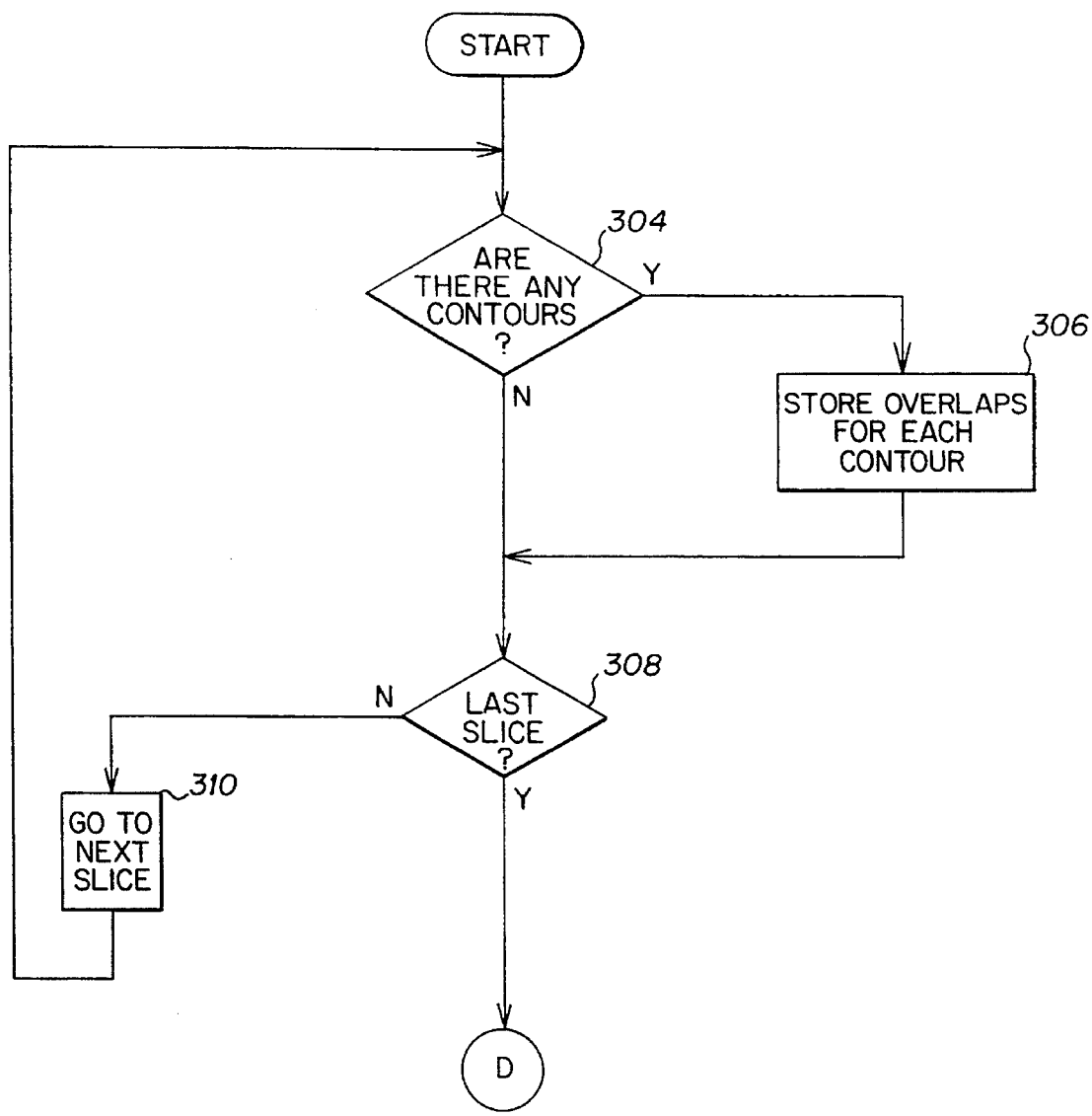
FIG. 12 is a flowchart illustrating the steps of the contour analysis process that store overlaps for each contour.

The contour analysis process 300 involves an analysis of the contours generated on each slice of the volumetric data, and a determination of how they interrelate to form the surfaces of the three-dimensional object represented thereby. FIG. 11 shows a cross-sectional view of an object 302 represented by twelve slices of volumetric data 300_1 through 300_12. The contour generation process 200 generates contours that define the inner and outer surfaces of the object on a slice-by-slice basis in the manner described above. For the object 302 shown in FIG. 11, the contour generation process generates two outer contours on each of slices 300_1 through 300_7 because on those slices, the object 302 has two distinct contours Ca and Cb. For slices 300_8 through 300_10, the contour generation process generates a single outer contour representing the object. The goal of the contour analysis process 300 is to examine the interrelationship of the contours on each slice in order to gain an understanding of how they form a three-dimensional representation of the object 302.

The first step in the contour analysis process is to determine the overlaps for each contour generated during the contour generation process 200. The contour analysis process begins by examining the first slice and, in step 304, determines whether there are any contours that were formed on that slice. If it is determined in step 304 that there are contours on the slice, the process proceeds to step 306 wherein overlap information is stored for each contour. An overlap is determined by examining the contours generated on the slices immediately above and below the slice being processed. A contour has an overlap if either of the slices above or below it has a contour that encloses at least one voxel with XY coordinates that match the XY coordinates of at least one voxel enclosed within the contour being processed.

Figure 13:
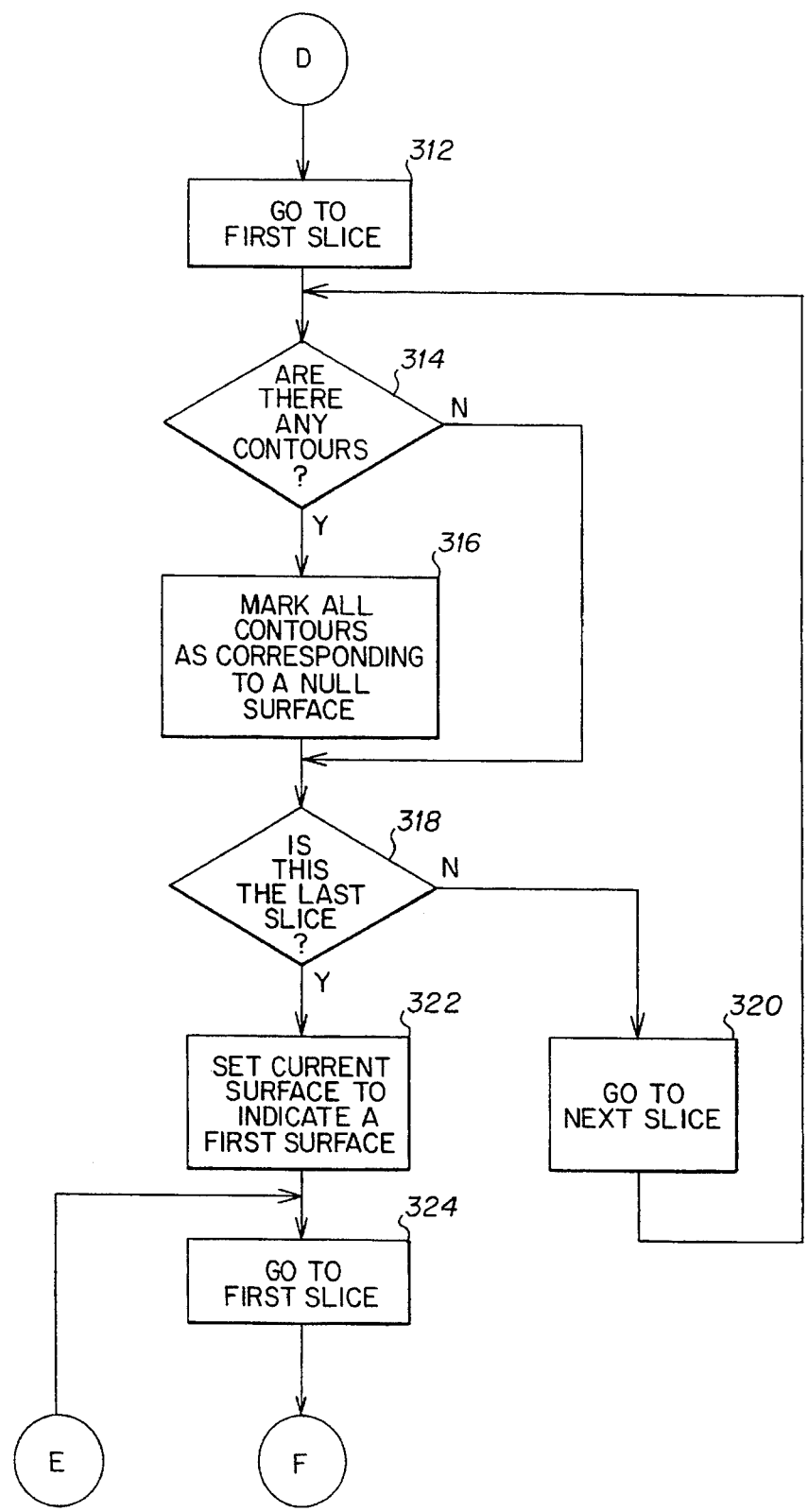
FIG. 13 is a flowchart illustrating the beginning of the discrete surface determination steps of the contour analysis process.
Figure 14:
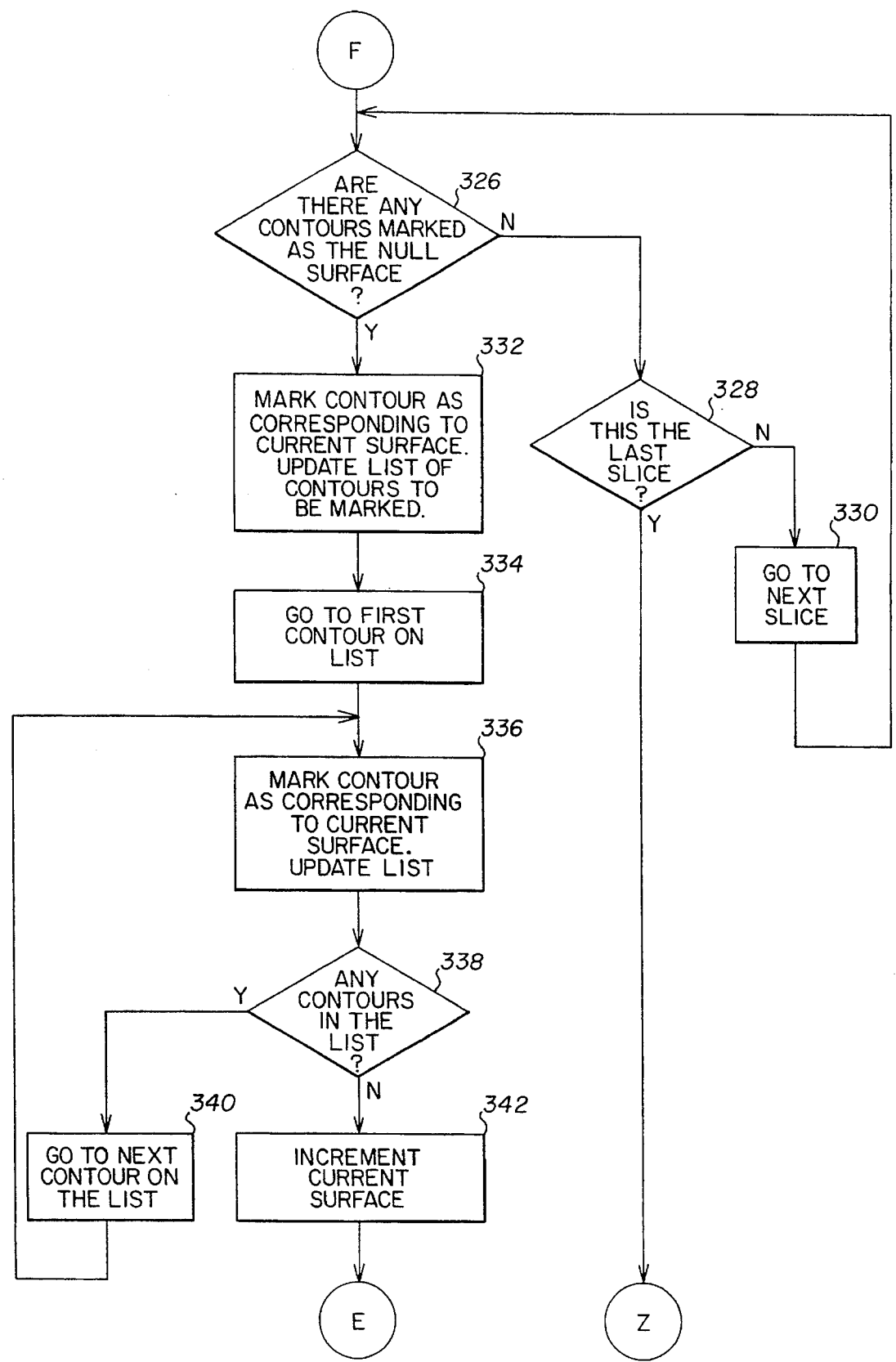
FIG. 14 is a flowchart that shows additional discrete surface determination steps for the contour analysis process.
Figure 15:
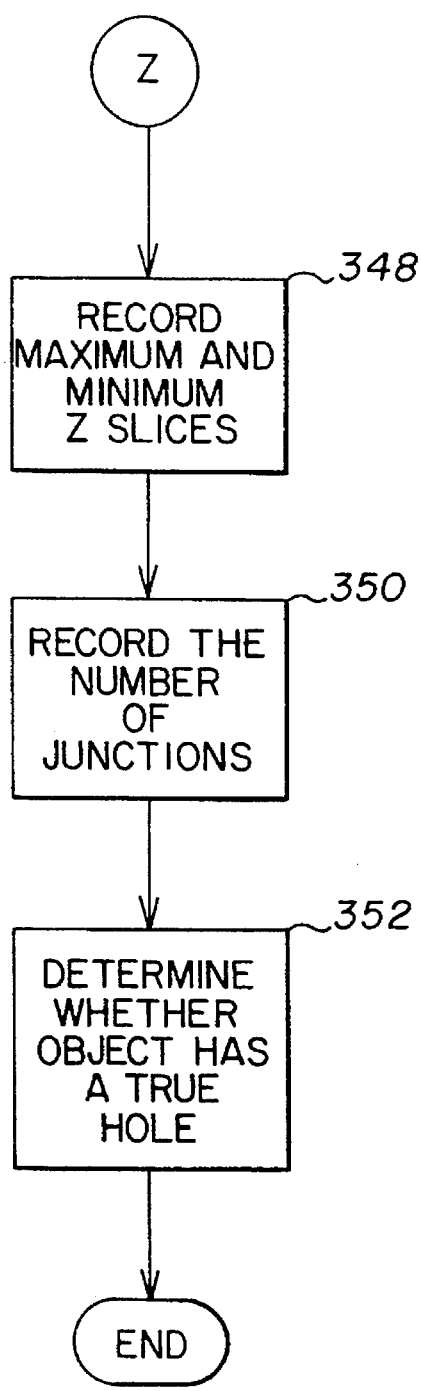
FIG. 15 is a flowchart showing the remaining steps of the contour analysis process.

After the overlaps are stored for each contour in step 306, the contour analysis process proceeds to step 308 wherein a determination is made as to whether the slice being processed is the last slice. When it is determined at step 308 that the slice being processed is not the last slice, the contour analysis process, in step 310, proceeds to the next slice and then returns to step 304. In this manner, the contour analysis process iteratively steps through each slice and stores the overlap information for every contour generated during the contour generation process 200. When it is detected at step 308 that the last slice has been processed, the contour analysis process proceeds to step 312 to begin a discrete surface determination as shown in FIGS. 13–15.

The discrete surface determination begins as step 312 wherein the process selects the first slice for processing. Thereafter, the contour analysis process proceeds to step 314 wherein a determination is made as to whether there are any contours on the slice being processed. When it is determined at step 314 that there are contours on the slice being processed, the process proceeds to step 316 wherein each of the contours on the slice is marked as corresponding to a null surface. The marking of all the contours to correspond to a null surface is an initialization step that simplifies the remaining steps in the process as will be understood from the description of the remaining steps in the process that are described below.

After all the contours on the slice being processed are marked at step 316, or when it is determined at step 314 that there are no contours on the slice being processed, the contour analysis process proceeds to step 318 wherein a determination is made as To whether the last slice is being processed. When it is determined at step 318 that the slice being processed is not the last slice, the contour analysis process proceeds to step 320 wherein it goes to the next slice for processing and then returns to step 314. In this manner, the contour analysis process iteratively processes each slice and marks each contour as corresponding to a null surface until it is determined at step 318 that the last slice has been processed.

When it is determined at step 318 that the last slice has been processed, the contour analysis process proceeds to step 322 wherein it identifies the surface to be formed as a first surface. The surface to be formed is identified because, as described above, the object may have multiple surfaces that need to be formed, thereby requiring that the surfaces be identified to distinguish them from one another. After the surface to be formed is identified at step 322, the contour analysis process proceeds to step 324 wherein it selects the first slice for processing and then proceeds to step 326 (FIG. 14).

At step 326, a determination is made as to whether there are any contours on the slice being processed that are marked as corresponding to the null surface. When it is determined at step 326 that there are no contours on the slice being processed that are marked as corresponding to the null surface, the contour analysis process proceeds to step 328 wherein a determination is made as to whether the last slice has been processed. When it is determined at step 328 that the last slice has not been processed, the contour analysis process proceeds to step 330 wherein it selects the next slice for processing and then returns to step 326. In this manner, the contour analysis process iteratively processes the slices until it locates a contour, at step 326, that is marked as corresponding to the null surface.

When it is determined at step 326 that the slice being processed includes at least one contour marked as the corresponding to the null surface, the contour analysis process proceeds to step 332 wherein the following two functions are performed: (1) one of the contours on the slice being processed that is marked as corresponding to the null surface is marked as corresponding to the surface currently being formed and (2) a list of contours to be marked is updated to include each of the contours that overlap with the marked contour.

When a contour is detected at step 326, it indicates that the object to be modeled includes at least a first surface. As described above, when the discrete surface determination process is begun, the surface currently being formed is initialized at step 322 (FIG. 13) to identify it as a first surface. Therefore, when the first contour is detected at step 326, it will be marked at step 332 as corresponding to a first surface. Thereafter, the contour analysis process will generate a first surface utilizing the first detected contour as a seed. As stated above, contours that overlap one another each define part of the same surface. Therefore, in order to generate a first surface from the seed contour, a list is created at step 332 of the contours that overlap the seed contour. The list created at step 332 indicates additional contours that are to be marked as corresponding to the same surface as the seed contour. Therefore, for the first seed contour detected, a list is formed at step 332 indicating that each of the contours that overlap the seed contour should also be marked as corresponding to the first surface. After the seed contour has been marked and the list of contours to be marked has been updated at step 332, the contour analysis process proceeds to step 334.

At step 334, the contour analysis process selects for processing the first contour on the list of contours to be marked. Thereafter, the contour analysis process proceeds to step 336 wherein the contour being processed is marked as corresponding to the surface that is currently being formed.

The list of contours to be marked is updated to include the additional contours that are marked as corresponding to the null surface and that overlap with the contour currently being processed which has just been marked as corresponding to the surface being formed.

After the contour currently being processed is marked and the list is updated at step 336, the contour analysis process proceeds to step 338 wherein a determination is made as to whether there are any contours remaining in the list of contours to be marked. When it is determined at step 338 that there are contours remaining in the list, the contour analysis process proceeds to step 340 wherein selects the next contour on the list for processing and returns to step 336. In this manner, the contour analysis process reiteratively proceeds to mark each of the contours that correspond to the surface currently being formed, and continually updates the list of contours to be marked, until it is determined at step 338 that there are no contours remaining in the list of contours to be marked. At that point, the contour analysis process proceeds to step 342 wherein the identification of the surface currently being formed is incremented.

After the identification of the surface currently being formed is incremented at step 342, the contour analysis process returns to step 324 (FIG. 13) wherein it again selects the first slice processing. Thereafter, the contour analysis process proceeds to step 326 (FIG. 14) wherein a determination is made as to whether there are any contours on the slice being processed that are marked as corresponding to the null surface. As described above, when the first surface was formed, the contours corresponding thereto were marked, at either of steps 332 or 336, as corresponding to the first surface. Therefore, when the contour analysis process returns to step 326, these contours will no longer be detected as corresponding to the null surface. Therefore, after a first surface has been formed, a contour will only be detected at step 326 as corresponding to the null surface if the object includes a second discrete surface. If an object includes a second discrete surface, a contour will be detected at step 326 that is marked as corresponding to the null surface. Thereafter, the contour analysis process will proceed, in the manner described above, to generate a second surface utilizing the detected contour as a seed.

In the manner described above, the contour analysis process iteratively steps through the slices of the object and forms the necessary number of discrete surfaces. Once all of the discrete surfaces have been formed, no additional contours will be detected at step 326 as corresponding to the null surface. Therefore, the contour analysis process will proceed, through steps 326, 328 and 330, to iteratively step through each of the slices until it is determined at step 328 that the last slice has been processed. At that point, the discrete surface determination portion of the contour analysis process is complete.

After the discrete surface determination process has been completed, the contour analysis process proceeds to step 348 (FIG. 15) wherein the maximum and minimum Z-slices of each discrete surface are recorded. Depending upon the size and topology of the object, the discrete surfaces formed therefrom may not extend over the full range of volumetric data slices. When that occurs, each discrete surface has maximum and minimum Z slice. For example, Z slice 10 is the maximum Z slice for the object shown in FIG. 11.

The next step in the contour analysis process is to record the number of junctions in step 350. A junction occurs when a single contour on one slice is overlapped by two or more distinct contours on an adjacent slice. Making reference to FIG. 11, a junction is defined between slices 7 and 8 because the single contour on slice 8 is overlapped by the two distinct contours Ca and Cb on slice 7. The number of junctions for each discrete surface is utilized during the topological analysis process as is more fully described below.

Figure 16:
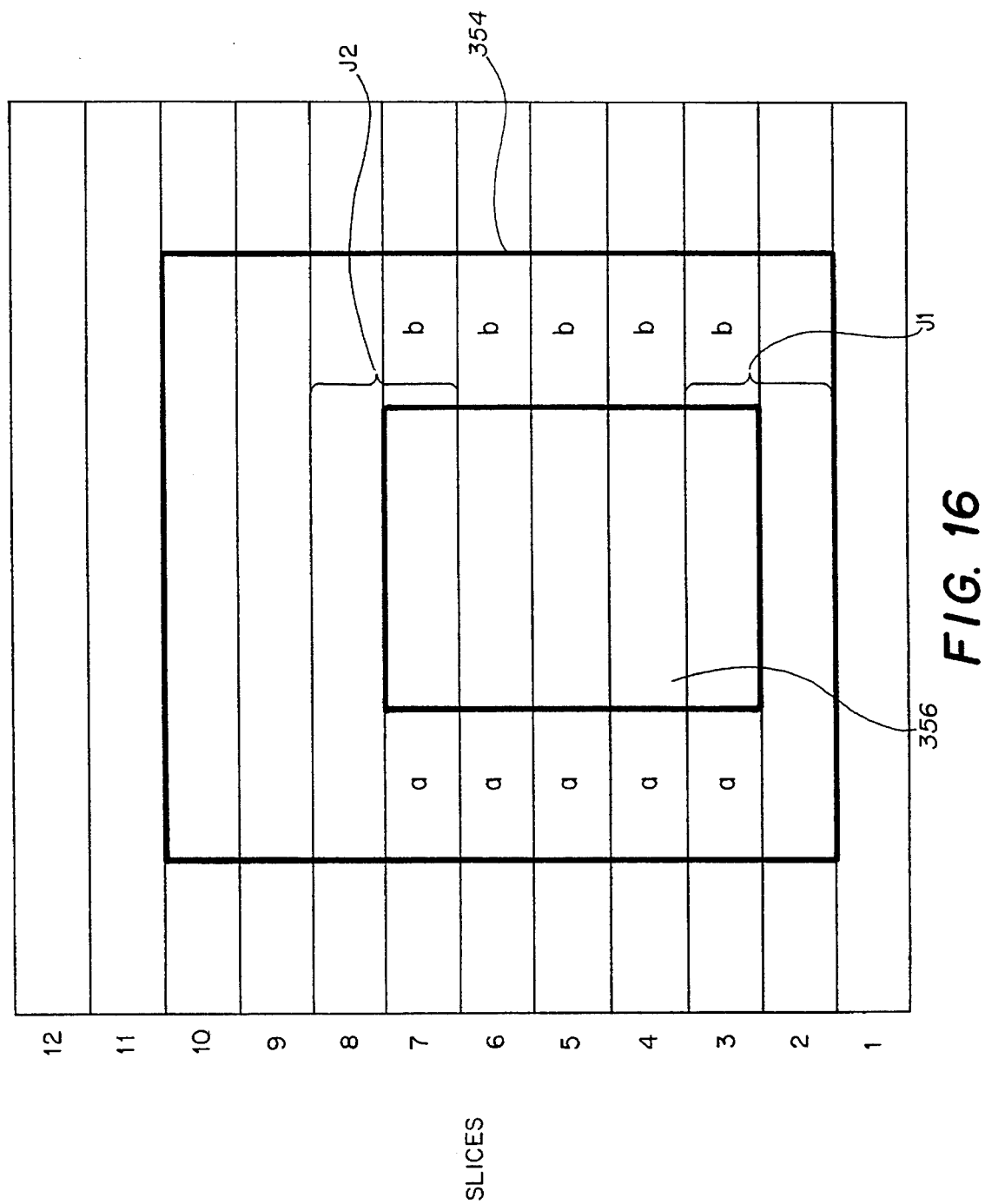
FIG. 16 is a cross-sectional view of an object represented in terms of volumetric data.
Figure 17:
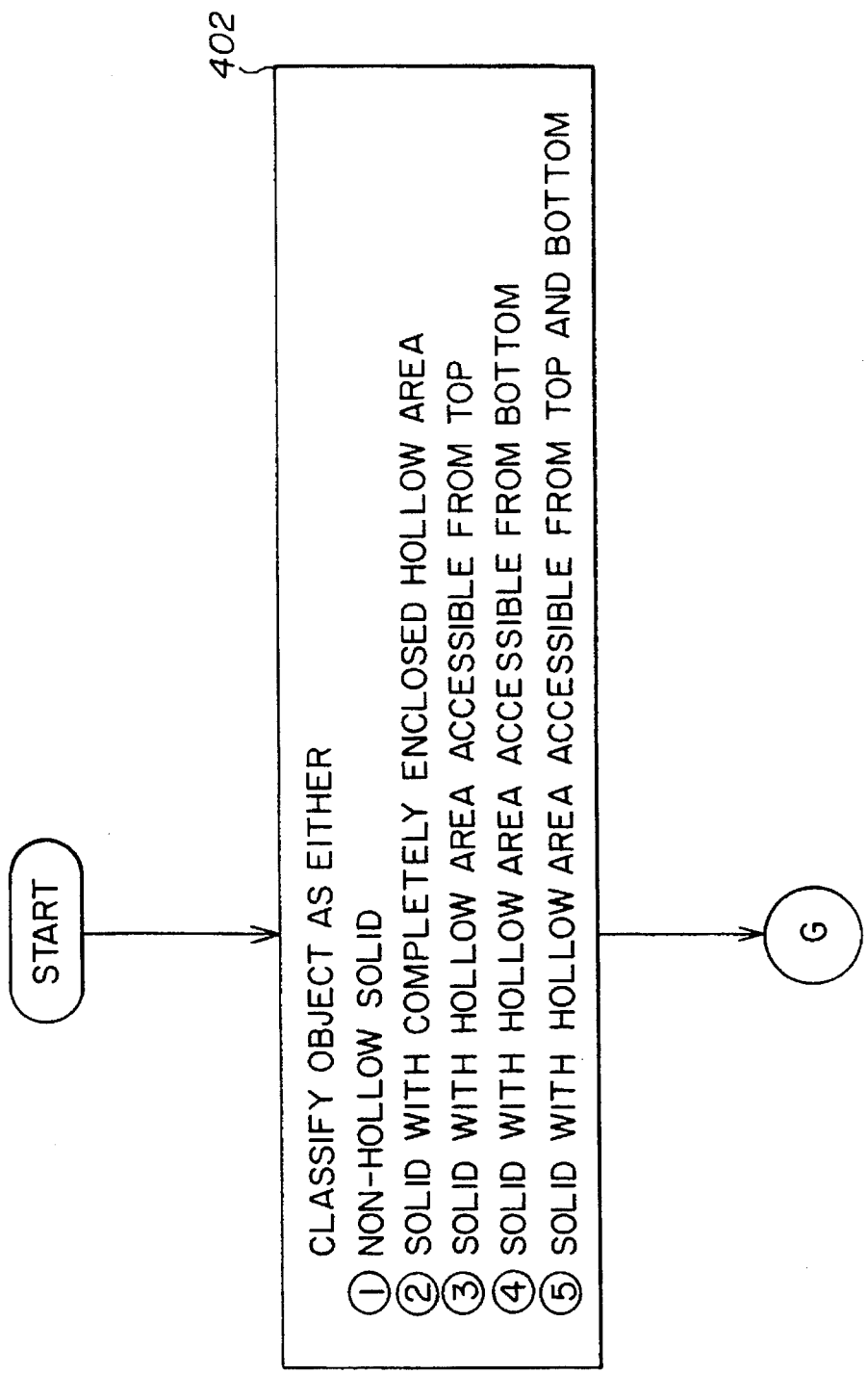
FIG. 17 is a flowchart showing the initial steps of the topological analysis process.
Figure 18:
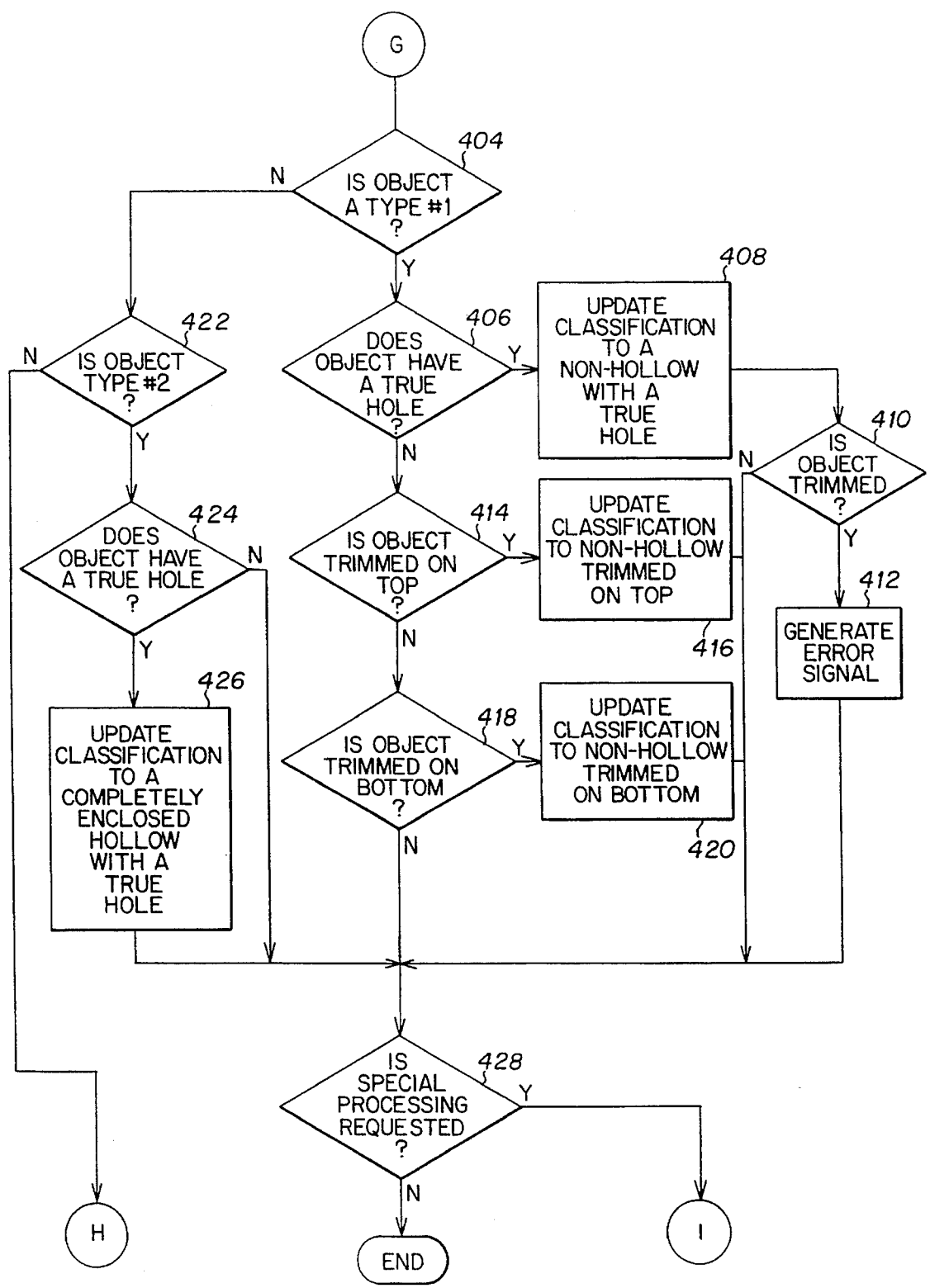
FIG. 18 is a flowchart showing additional steps of the topological analysis process.
Figure 19:
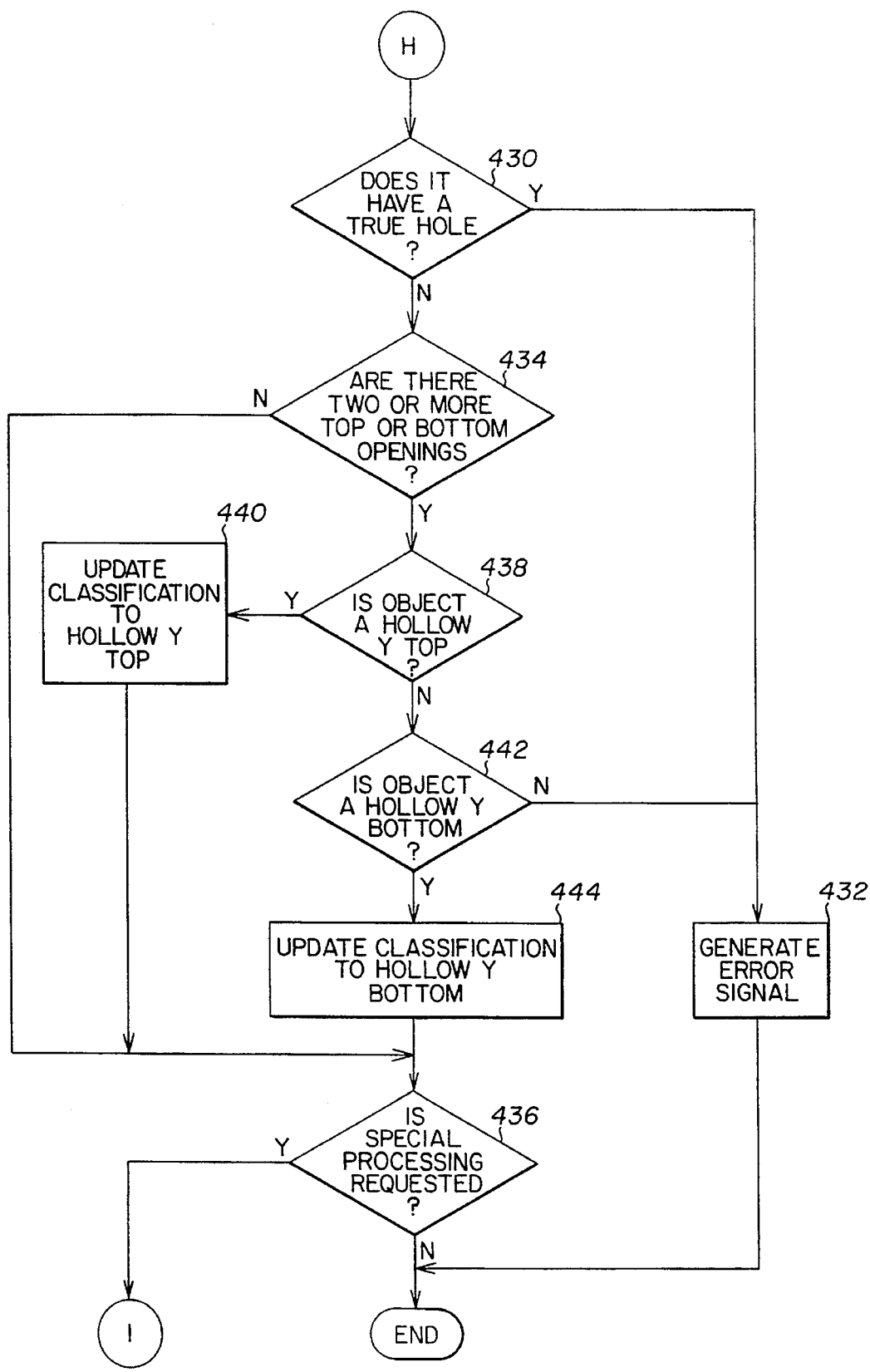
FIG. 19 is a flowchart showing additional steps of the topological analysis process.

The final step in the contour analysis process is step 352 wherein a determination is made as to whether any of the discrete surfaces has a true hole extending therethrough. A true hole is defined as one which extends through the entirety of the discrete surface and should be distinguished from wormholes which are described below. For example, FIG. 16 is a cross-sectional view of an object 354 having a true hole 356 extending therethrough. The determination in step 352 as to whether any of the discrete surfaces representing the object has a true hole is made by examining the junctions of each surface. Making reference to FIG. 16, the object 354 has an up junction J1 defined where two contours on slice 3 are overlapped by and are positioned above a single contour on slice 2. The object 354 also has a down junction J2 defined where two contours on slice 7 overlap and are positioned below a single contour on slice 8. When a true hole is formed in a discrete surface, the discrete surface has the following two characteristics: (1) a down junction positioned above an up junction and (2) paths of overlapping contours extending downward from each portion of the down junction that respectively intersect with paths of overlapping contours extending upward from the up junction. Therefore, by examining the junctions and the overlaps extending therefrom, the contour analysis process determines, at step 352, whether any of the discrete surfaces has a true hole. This determination is useful during the topological analysis process as is described below.

TOPOLOGICAL ANALYSIS

The accuracy of the NURB solid model generated by the method can be enhanced by conducting a topological analysis of the object and utilizing the information gained from this analysis in determining the particular manner in which SMAPs are generated for the object and the manner in which the reiterative DUV process is to be executed on those SMAPs. For varying object shapes, it has been found that different techniques for SMAP generation and reiterative DUV processing should be utilized in order to enhance the accuracy of the resulting NURB solid model. Therefore, before proceeding to the later steps in the process, the topological analysis process 400 is performed to examine the topology of the object.

The details of the topological analysis process will now be described making reference to FIGS. 17-22. In step 402, the object is classified as falling within one of five basic object types which are shown in FIGS. 21(*a*)–(*e*). The first of these object classifications is the non-hollow solid shown in FIG. 21(*a*). This type of object will be modeled with a single closed outer surface in the manner described below.

The second object classification is the solid with a completely enclosed hollow area that is shown in FIG. 21(*b*). This type of object is modeled with a combination of a closed outer surface and a closed inner surface. The object is defined as the Boolean subtraction of the inner surface from the outer surface.

The third object classification is the solid having a hollow area accessible from the top that is shown in FIG. 21(*c*). This type of solid is modeled as the composition of the following three surfaces: (1) an open outer surface; (2) an open inner surface; and (3) a trimmed planar surface at the top of the inner and outer surfaces. Open surfaces on the top or bottom of the object are generally created when an object extends beyond the range of the volumetric data representation generated by the CAT scan or other volumetric data generation source. As a result, the object is essentially cut-off at the edge of the volumetric data representation. Trimmed planar surfaces are similarly generated to "cap" the solid at the interface where it exits the volume. The generation of open and trimmed surfaces will be more fully described below.

Figure 21A:
Figure 21B:
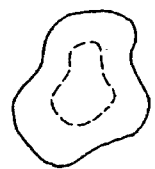
Figure 21C:
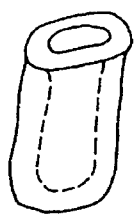
Figure 21D:

The fourth basic object classification is the solid having a hollow area accessible from the bottom as shown in FIG. 21(d). This type of object is modeled as a composition of an open outer surface, an open inner surface and a trimmed planar surface at the bottom of the inner and outer surfaces.

Figure 21E:
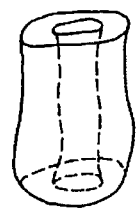

The fifth basic object classification is a solid having a hollow area accessible from both the top and bottom as shown in FIG. 21(e). This type of object is modeled as the composition of four surfaces, i.e. an open outer surface, an open inner surface, a trimmed planar surface at the top and a trimmed planar surface at the bottom.

Figure 21F:
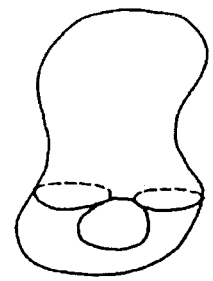

Following the initial object classification, the topological analysis process proceeds to further sub-classify the object. In step 404 (FIG. 18), a determination is made as to whether the object has been classified as a non-hollow solid during step 402. If the object has been so classified, the process proceeds to step 406 where a determination is made as to whether the object has a true hole. If it is determined that the object has a true hole, the process proceeds to step 408 where the classification of the object is updated to sub-classify the object as a non-hollow with a true hole, an example of which is shown in FIG. 21(f). Thereafter, a determination is made in step 410 as to whether the object is trimmed. If it determined that the object is trimmed, an error signal is generated in step 412 because the process currently does not recognize objects that are non-hollow, trimmed and have a true hole.

As currently implemented, the method of the present invention recognizes only the body types shown in FIGS. 21(a)–21(k). Therefore, if it is determined during the topological analysis process that the object to be modeled does not fall within one of the recognized classifications, the process generates an error signal indicating that the object cannot be modeled. However, it should be understood that the method of the present invention is not inherently limited to modeling only the particular object classifications shown in FIGS. 21(a)–(k). For example, at present, it is envisioned that the method will also support the body types shown in FIGS. 54(a)–(j), as well as others. Based upon the description of the present invention provided herein, routine modifications and/or additions could be made to the method of the present invention to enable the modeling of various additional object types. Therefore, although the description provided herein describes the current implementation of the method as being limited to the object types shown in FIGS. 21(a)–(k), the invention is not so limited.

Figure 21G:
Figure 21H:

If it is determined at step 406 that the non-hollow solid does not have a true hole, the process proceeds at step 414 to determine whether the object is trimmed on top. If it is determined that the object is trimmed on top, the classification of the object is updated in step 416 to sub-classify the object as a non-hollow solid that is trimmed on top, an example of which is shown in FIG. 21(g). If it is determined at step 414 that the object is not trimmed on top, the process proceeds to step 418 wherein a determination is made as to whether the object is trimmed on the bottom. If it is determined that the object is trimmed on the bottom, the classification of the object is updated in step 420 to sub-classify the object as a non-hollow solid trimmed on the bottom, an example of which is shown in FIG. 21(h). If it is determined at step 418 that the object is not trimmed at the bottom, then the object does not fall within any of the recognized sub-classifications and its classification will remain unchanged as indicating that the object is a non-hollow solid.

Figure 21I:
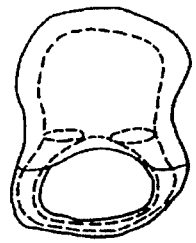

If it is determined at step 404 that the object is not a non-hollow solid, the topological analysis process proceeds to step 422 wherein a determination is made as to whether the object is a solid with an enclosed hollow area. If it is determined that the object is a solid with an enclosed hollow area, the process proceeds to step 424 wherein a further determination is made as to whether the object has a true hole. If it is determined that the object does not have a true hole, no further sub-classification of the object is done and the classification of the object remains unchanged as indicating that the object is a solid with an enclosed hollow area. However, if it is determined at step 424 that the object does have a true hole, the classification of the object is updated at step 426 to sub-classify the object as a solid having an enclosed hollow and a true hole, an example of which is shown in FIG. 21(i).

Following the sub-classification analysis of the non-hollow solids and the solids with enclosed hollow areas as described above, the topological analysis process proceeds to step 428 wherein a determination is made as to whether special processing has been requested by the user. If it is determined that special processing has been requested, the process proceeds to step 446 (FIG. 20) wherein special processing is performed in a manner that is described below. If it is determined at step 428 that special processing was not requested, the topological analysis process is terminated.

If it was determined at step 422 that the object was not a solid with an enclosed hollow area, the topological analysis process proceeds to step 430 (FIG. 19) wherein a determination is made as to whether the object has a true hole. If it is determined that the object has a true hole, the process proceeds to step 432 wherein an error signal is generated to indicate that the object does not fall within one of the recognized classifications as shown in FIGS. 21(a)–(k). The only recognized object classifications having true holes are the non-hollow solid and the solid having an enclosed hollow area. If the topological analysis process has progressed to step 430, the object does not broadly fit within either of these classifications and, therefore, the fact that the object has a true hole indicates that the object does not fall within one of the recognized classifications.

Figure 21J:
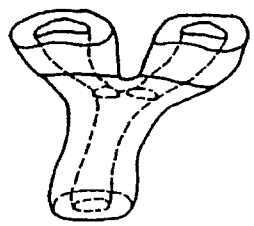
Figure 21K:
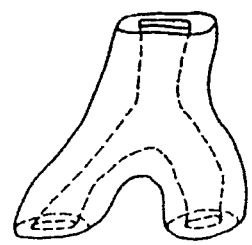

If it is determined at step 430 that the object does not have a true hole, the topological analysis process proceeds to step 434 wherein a determination is made as to whether there are two or more top or bottom openings in the object. If there are not, the generalized sub-classification of the object is complete and the process proceeds to step 436 wherein a determination is made as to whether special processing has been requested. However, if it is determined at step 434 that the object does have two or more top or bottom openings, the topological analysis process proceeds to step 438 wherein a determination is made as to whether the object is a hollow Y top, an example of which is shown in FIG. 21(j). If it is determined that the object is a hollow Y top, the classification of the object is updated at step 440 to sub-classify the object in this manner. Thereafter, the generalized sub-classification of the object is complete and the process proceeds to step 436 to determine whether special processing has been requested.

If it is determined at step 438 that the object is not a hollow Y top, a further determination is made at step 442 as to whether the object is a hollow Y bottom. If it is determined that the object is a hollow Y bottom, the process proceeds to step 444 wherein the classification of the object is updated to sub-classify the object in this manner. Thereafter, the generalized sub-classification of the object is complete and the method proceeds to step 436 to determine whether special processing is requested. If it is determined at step 442 that the object is not a hollow Y bottom, the method proceeds to step 432 wherein an error signal is generated to indicate that the object does not fall within any of the recognized object classifications. The only currently recognized object sub-classifications having two or more top or bottom openings are the hollow Y top and hollow Y bottom. Therefore, if it is determined at step 442 that the object does not fall within either of these sub-classifications, then an error signal must be generated.

As stated above, when the sub-classification of the object has been completed, the topological analysis process, at steps 428 or 436, makes a determination as to whether special processing has been requested. Special processing may be requested by the user when the object to be modeled has a particular topology known to the user. If the topology of the object is known in advance, the method of the present invention can be customized to generate a particularly accurate NURB solid model. As stated above, one application for the use of the method and apparatus of the present invention is in generating a medical prosthetic device for a skeletal portion of the body represented in terms of volumetric data. It has been found to be particularly desirable to generate accurate models for the femur which can be somewhat difficult to accurately model due to its irregular topology. As a result, the method of the present invention has been customized in several ways that are described below to enable the method to generate particularly accurate models of the femur.

The use of these customized features of the invention are selected by the user by simply indicating that the object being modeled is a femur. When the user indicates that the object is a femur, the topological process performs additional sub-classification steps to determine which one of the following representations of a femur is being modeled: (1) the femur illustrated in FIG. 22(*a*); (2) the femur non-hollow illustrated in FIG. 22(*b*); (3) the femur non-hollow shaft illustrated in FIG. 22(*c*); (4) the femur shaft shown in FIG. 22(*d*); (5) the femur non-hollow entire shown in FIG. 22(*e*); or (6) the femur entire illustrated in FIG. 22(*f*).

Figure 20:
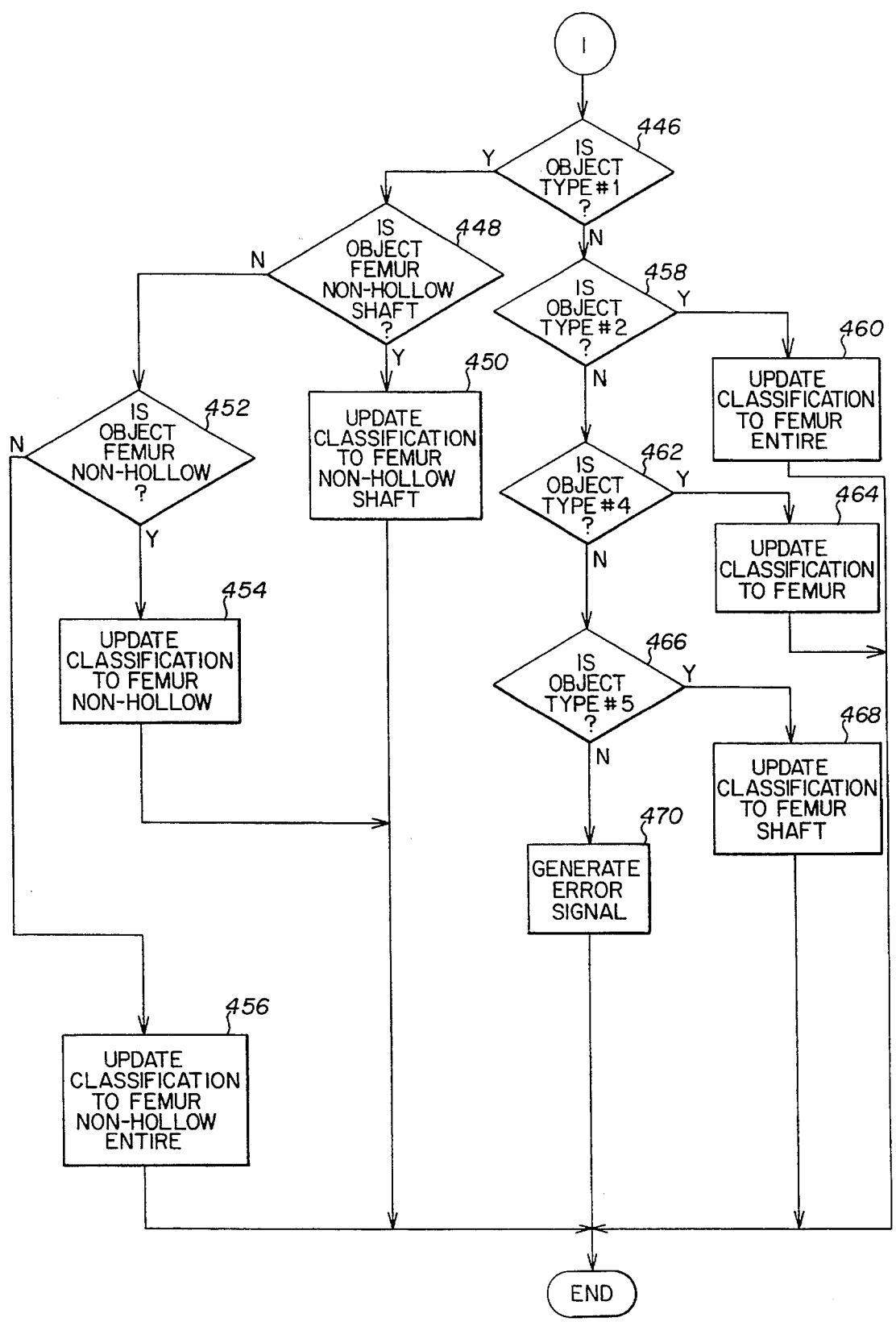
FIG. 20 is a flowchart showing additional steps of the topological analysis process.

The manner in which the topological analysis process responds when it determines that special processing has been requested will now be described making reference to FIG. 20. The process initially proceeds to step 446 wherein a determination is made as to whether the object has been classified as a non-hollow solid. The following three femur types will be categorized as a non-hollow solid during the generalized topological analysis: (1) the femur non-hollow shown in FIG. 22(*b*); (2) the femur non-hollow shaft illustrated in FIG. 22(*c*); and (3) the femur non-hollow entire shown in FIG. 22(*e*).

Therefore, when it is determined at step 446 that the object has been classified as a non-hollow solid, the process proceeds to step 448 to determine which of these three femur types is being modeled.

At step 448, a determination is made as to whether the object is a femur non-hollow shaft as illustrated in FIG. 22(*c*). The determination is made at step 448 by examining the contours on selected slices of the object. For each selected slice, the center voxel for the contour is determined and the distance between the center voxel and each of the other voxels contained within the contour is measured. The largest and smallest distances are stored and their ratio is compared to a constant cut-off ratio that is determined by the user. This ratio is established such that it defines a contour that is more oblong than circular. When a contour has a ratio that exceeds the cut-off ratio, it indicates that the contour forms a portion of a femur shaft. As a result, by examining selected contours near the top and bottom of the object, the process determines whether the object is a femur shaft along its entire length and if it is, recognizes that the object is a femur non-hollow shaft.

When it is determined at step 448 that the object is a femur non-hollow shaft, the process proceeds to step 450 wherein the object classification is updated to indicate that the object is a femur non-hollow shaft. Thereafter, the topological analysis process terminates.

When it is determined at step 448 that the object is not a femur non-hollow shaft, the process proceeds to step 452 wherein a determination is made as to whether the object is a femur non-hollow as shown in FIG. 22(*b*). When the process proceeds to step 452, the object is either a femur non-hollow or a femur non-hollow entire. Therefore, by examining the object contours on the lower slices of the object to determine whether they are more oblong than circular, the process determines whether the lower portion of the object is a femur shaft and if it is, determines that the object is a femur non-hollow. When it is determined at step 452 that the object is a femur non-hollow, the process proceeds to step 454 wherein the object classification is updated to indicate that the object is a femur non-hollow. Thereafter, the topological analysis process terminates.

When it is determined at step 452 that the object is not a femur non-hollow, the object is a femur non-hollow entire. Therefore, the process proceeds to step 456 wherein the object classification is updated to indicate that the object is a femur non-hollow entire. Thereafter, the topological analysis process terminates.

When it is determined at step 446 that the object is not a non-hollow solid, the process proceeds to step 458 wherein a determination is made as to whether the object is a solid with an enclosed non-hollow area as shown in FIG. 21(*b*). When it is determined that the object is a solid with an enclosed non-hollow area, the process proceeds to step 460 wherein the object classification is updated to indicate that the object is a femur entire as shown in FIG. 22(*f*). Thereafter, the topological analysis process terminates.

When it is determined at step 458 that the object is not a solid with an enclosed hollow area, the process proceeds to step 462 wherein a determination is made as to whether the object is a solid having a hollow area accessible from the bottom as shown in FIG. 21(*d*). When it is determined that the object is a solid having a hollow area accessible from the bottom, the process proceeds to step 464 wherein the object classification is updated to indicate that the object is a femur as shown in FIG. 22(*a*). Thereafter, the topological analysis process terminates.

When it is determined at step 462 that the object is not a solid having a hollow area accessible from the bottom, the process proceeds to step 466 wherein a determination is made as to whether the object is a solid having a hollow area accessible from the top and bottom as shown in FIG. 21(*e*). When it is determined that the object is a solid having a hollow area accessible from the top and bottom, the process proceeds to step 468 wherein the object classification is updated to indicate that the object is a femur shaft as shown in FIG. 22(*d*). Thereafter, the topological analysis process terminates.

When it is determined at step 466 that the object is not a solid having a hollow area accessible from the top and bottom, the process proceeds to step 470 wherein an error signal is generated indicating that although special processing was requested, the object being modeled does not fall within one of the recognized femur classifications. Thereafter, the topological process terminates.

The topological classification of the six femur types is described as being performed by the specific steps explained above solely for illustrative purposes. It should be recognized that the femur types could also be classified in a number of other ways. For example, the sub-classifications of the object could be utilized as a basis for determining which femur type is being modeled, rather than utilizing just the five basic classification types.

Although the special processing feature has been described above as implementing only the six particular femur topologies, it should be understood that this feature of the present invention is not limited to those special topologies. The use of the special processing feature enables a user to indicate that the object being modeled has a particular topology and enables particularly accurate models to be generated for topologies that are frequently modeled or are particularly difficult to model. Through experimentation in the number and placement of the SMAPs utilized to represent the volumetric data, as well as in the particular manner in which the reiterative DUV process is performed on those SMAPs, optimum modeling techniques can be determined for any particular topology. These special processing techniques can be pre-programmed and the user can select them when modeling an object having the relevant topology to ensure that the object is modeled in the way that has been determined, through experimentation, to provide the most accurate model for that topology. Although special processing techniques have only been developed to date for the femur, techniques could be developed for any particular topology. For example, the vertabra and hip bone are objects that are frequently modeled and for which special processing techniques may be developed in the future.

WORMHOLE REMOVAL

Before the SMAP generation process is begun, the contours created during the contour generation process 200 are examined to determine whether any wormholes exist, and to patch any wormholes that are found. A wormhole results from imprecision during the segmentation step 104 and will be described by making reference to FIGS. 23–24.

FIG. 23 shows two contours, defined on adjacent segmented slices of 4×10 voxels, that would create a wormhole. FIG. 24 shows the sum of the selected (i.e. set to "1") voxels from slices 5 and 6. As can be seen from FIG. 24, the object has two separate non-contiguous paths that connect the contours that define it on slices 5 and 6. The path w has an area of one voxel and is a wormhole. Wormholes are generated as a result of errors in the segmentation process and create problems in generating a contiguous solid model of the object represented in volumetric data. Therefore, it is desirable to patch (i.e. remove) the wormhole. The wormhole can be patched by filling it in on any one or all of the slices through which it extends. A wormhole is filled in by converting a voxel that was set to "1" during the segmentation process to "0".

The wormholes are removed in the manner described above during step 540 (FIG. 32). Although this step is shown in FIG. 32 as being part of the SMAP generation process, it is essentially a pre-processing step that is performed before the SMAP generation process is begun.

SMAP GENERATION

As stated above, SMAP is an acronym for surface MAP and refers to a data structure created to equivalently describe the object represented in segmented volumetric data. A SMAP essentially describes an object represented volumetrically by voxels as a collection of surface elements that enclose the volume. In the particular embodiment illustrated herein, the surface elements that enclose the volume are planar voxel faces. However, if a different source of volumetric data were utilized that created voxels with non-planar faces, the faces that enclose the object volume would not be planar. Additionally, it should be understood that the surface representation of the object could be generated utilizing surface elements other than voxel faces. For example, larger surface elements can be defined that correspond to multiple voxels rather than utilizing voxel faces that each correspond to a single voxel.

In the particular embodiment illustrated herein, a SMAP is formed by connecting together a plurality of surface voxel faces (hereafter SVOXs). A data structure used to uniquely describe each SVOX is shown in FIG. 25. As shown by this data structure, each voxel is uniquely defined by the x, y and z coordinates of its parent voxel, as well as the orientation of the SVOX on the parent voxel. Each SVOX can have one of the following orientations: top, bottom, front, back, right or left. The data structure for each SVOX also includes the location in memory wherein each of the SVOX's four neighbors are stored as is more fully described below.

Each voxel in the segmented volumetric data representation of the object has the potential to have any of its six planar faces be considered a SVOX in defining a SMAP. When a SMAP is generated for an outer surface of an object, a planar face will be considered as a SVOX if the voxel with which it is associated has a voxel value of "1" (i.e. the voxel is selected) and the voxel adjacent the planar face has a voxel value of "0" (i.e. the adjacent voxel is non-selected). As a result, when an outer SMAP is generated, each planar face that is considered to be a SVOX in the SMAP is located on the outside of the object being modeled. Similarly, when a SMAP is generated for an inner surface of an object, a planar face is considered as a SVOX if the voxel for which it is associated is non-selected and the voxel adjacent the planar face is selected.

An example of a SMAP will now be described making reference to FIG. 26 wherein a 2×3×4 rectilinear cube is represented by a SMAP. The cube can be represented by a SMAP containing fifty-six SVOXs. Three of the six cube surfaces are visible in FIG. 26 and the visible surfaces are represented by SVOXs SV1–SV26. The three cube surfaces that are not visible in FIG. 26 are represented by an additional twenty-six SVOXs resulting in a total of fifty-two SVOXs to create a SMAP representing the cube. As can be appreciated from FIG. 26, only certain planar faces of the selected voxels are considered as SVOXs when creating the SMAP of the cube. For example, SVOX's SV6 and SV10 define different planar faces of a single voxel. These are the only two planar faces of that voxel which are considered as SVOXs in creating the SMAP. The other four planar faces of the voxel are not considered as SVOXs because they do not define an interface between selected and non-selected voxels. As illustrated in FIG. 26, a characteristic of a SMAP is that each and every SVOX that is part of the SMAP has exactly four neighboring SVOXs that are also part of the SMAP. For example, SVOX SV13 is adjacent to SVOX's SV9, SV14, SV17 and SV25. This characteristic holds true for every SVOX that is included within a SMAP. As was described above in reference to the data structure illustrated in FIG. 25, the locations of its four adjacent SVOXs are included in the definition of each SVOX when a SMAP is generated.

In order to refer to the four adjacencies for each SVOX in a consistent manner, the terms North, South, East and West are defined to represent the four adjacencies for a given SVOX based on its orientation. The definition of these terms depends upon the orientation of the SVOX in a manner shown in FIG. 27. The definitions of the terms North, South, East and West for SVOXs on the front, back, left or right of the SMAP are illustrated in FIG. 27(a). The definitions of the terms North, South, East and West for SVOXs on the top or bottom of the SMAP are illustrated in FIG. 27(b).

A SMAP is generated for any selected surface by the subroutine SMAPGEN that is shown in FIGS. 28–30. Initially, in step 502, the minimum Z slice of the discrete surface that was stored in step 348 of the contour analysis process is examined and the subroutine proceeds to that slice to begin processing. Thereafter, the subroutine proceeds to step 508 wherein, for each voxel enclosed by the contour defining the selected surface on the slice being processed, a bottom facing SVOX is created.

At step 510, the adjacencies for the bottom SVOXs are set. As stated above, the data structure that defines each SVOX includes information relating to the four SVOXs that are adjacent to the defined SVOX. Therefore, in step 510, adjacencies are set for each bottom SVOX indicating which of the other bottom SVOXs created at step 508 are adjacent thereto. In step 512, the subroutine proceeds around the contour defining the surface on the slice being processed and establishes side SVOXs for the surface. A side SVOX can be either a front, back, right or left SVOX. As stated above, the contour on each slice is a set of XY points that defines the outer contour of the surface on that slice. Therefore, side SVOXs are generated on each slice by stepping around the contour and forming a side SVOX for each voxel face that lies along the contour. Once the side SVOXs have been created, the subroutine, at step 514, sets the adjacencies for each side SVOX created at step 512 and also updates the adjacencies for each of the bottom SVOXs that are adjacent to a side SVOX created in step 512. After the completion of step 514, each bottom SVOX is fully defined because each of its four adjacencies have been set.

After the adjacencies for the side and bottom SVOXs are set in step 514, the subroutine proceeds to the next slice in step 516. Thereafter, in step 518, side SVOXs (i.e. front, back, left or right SVOXs) are created around the contour that defines the surface on the slice being processed. After the side SVOXs are created, the subroutine proceeds to step 520 wherein adjacencies are set for each of the side SVOXs created in step 518. Additionally, the adjacencies for each side SVOX on the previous slice that is adjacent to any of the side SVOXs created at step 518 are updated in step 520. As can be appreciated from the foregoing, each time a SVOX is created, the previously created SVOXs that are adjacent thereto are updated to reflect the fact that they are adjacent to the newly created SVOX.

After the side SVOXs are created, the subroutine proceeds to step 522 wherein a determination is made as to whether any upper overhangs exist between the slice being processed and the slice immediately below it. An upper overhang is defined when, for any portion of the surface, the contour on the slice being processed includes an enclosed voxel that is not enclosed by the contour of the surface on the slice immediately below. Overhangs can best be described by making reference to FIG. 31 which is a cross-sectional view of a portion of a surface S. The contour of the surface on slice SL4 encloses some SVOXs at X=1 which are not enclosed by the contour of the surface on slice SL3. Therefore, an upper overhang is defined on slice SL4. In order to connect the side SVOXs defining the surface S on slices SL3 and SL4, a bottom SVOX B is created on slice SL4. FIG. 31 also illustrates a lower overhang formed on slice SL6. A lower overhang is defined when the contour on the slice being processed does not enclose each of the SVOXs that are enclosed by the contour on the slice immediately below it. As shown in FIG. 31, the contour of the surface S on slice SL6 does not include the SVOXs defined at X=1 which are enclosed by the contour on slice SL5. Therefore, a lower overhang is defined on slice SL6. In order to connect the side SVOXs on slices SL5 and SL6, a top SVOX T is created on slice SL5.

When it is determined at step 522 that an upper overhang exists, the subroutine proceeds to step 524 wherein bottom SVOXs are created to connect the side SVOXs on the slice being processed and the slice immediately below it. Thereafter, in step 526, the adjacencies for the bottom SVOXs created at step 524 are set and the adjacencies for all SVOXs adjacent thereto are updated. If it is determined at step 522 that no overhangs exist on the slice being processed, the subroutine proceeds to step 528 wherein a determination is made as to whether any lower overhangs exist. A lower overhang is defined when the contour defining the surface on the slice being processed does not enclose every one of the SVOXs that are enclosed by the contour on the slice immediately below it. If it is determined at step 528 that lower overhangs exist, the subroutine proceeds to step 530 wherein top SVOXs are created for the voxels enclosed by the contour on the slice immediately below the one being processed that are not enclosed by the slice being processed. In this manner, a connection is formed between the side SVOXs on the slice being processed and the slice immediately below it. Thereafter, in step 532, adjacencies are set for the newly created top SVOXs and the adjacencies for each of the SVOXs adjacent thereto are updated.

After the adjacencies for each of the top SVOXs have been set in step 532, or after if it is determined at step 528 that no lower overhangs exist, the subroutine proceeds to step 534 (FIG. 30) wherein a determination is made as to whether the last slice is currently being processed. This determination is made by comparing the slice currently being processed with the maximum Z slice of the discrete surface that was stored during step 348 (FIG. 15) of the contour analysis process. If it is determined at step 534 that the slice being processed is not the last slice, the subroutine returns to step 516 wherein it proceeds to the next slice. In this manner, the subroutine iteratively steps through each slice creating the SVOXs for the SMAP until it is determined at step 534 that the last slice has been processed. At that point, the subroutine proceeds to step 536 wherein top SVOXs are created for each voxel enclosed by the contour on the last slice. Thereafter, in step 538, the adjacencies for the top SVOXs are set and the adjacencies for each SVOX adjacent to a top SVOX created at step 536 are updated. At the completion of step 538, a plurality of SVOXs enclosing the volume of the selected surface has been formed and the subroutine SMAPGEN returns to the portion of the process that called it.

The main steps in the SMAP generation process will now be described making reference to FIGS. 32–37. The first step in the SMAP generation process is to fill in any wormholes at step 540 (FIG. 32) in the manner previously described. Thereafter, in step 542, the first surface of the object is selected and the subroutine SMAPGEN is called to generate a SMAP for the first surface. The subroutine SMAPGEN generates a list of the SVOXs that completely enclose the volume defined by the first surface. When subroutine SMAPGEN is completed, it returns to step 544 of the SMAP generation process wherein a determination is made as to whether a second surface was detected at step 338 of the contour analysis process. If a second surface had been detected, the SMAP generation process proceeds in step 546 to select this second surface and to again call the subroutine SMAPGEN to generate a list of the SVOXs that completely enclose the volume defined by the second surface.

The generation of a SMAP for a particular surface involves not only the creation of a plurality of SVOXs enclosing the volume defined by the surface, but also the generation of North and South poles for the SMAP. The North and South poles of a SMAP are end points that are respectively located at the top and bottom portions of the SMAP. The poles are the points from which the v-lines generated during the reiterative DUV process 600 begin and end as will be more fully described below. Although the poles are utilized primarily during the reiterative DUV process, they are important parameters in defining a SMAP and are generated during the SMAP generation process. The manner in which the poles are generated is dependent upon the classification given to the object during the topological analysis process 400 in a manner that is described below.

There are two basic types of poles which are respectively labeled as flag poles and ring poles. The North flag pole is defined as either (1) the center SVOX of those SVOXs on the highest slice that have a top orientation, or (2) the center SVOX of those SVOXs having a top orientation at a major junction very near the highest slice of the object. A South flag pole is similar to a North flag pole except that it is a SVOX having a bottom orientation that is located on or near the lowest Z slice of the object.

A North ring pole is a ring of all the side SVOXs on the highest Z slice of the object. Similarly, a South ring pole is a ring of all the side SVOXs on the lowest Z slice of the object. When a ring pole is formed, it causes a modification to be made to the plurality of SVOXs generated by the SMAPGEN subroutine. When a North ring pole is formed, the TOP-facing SVOXS on the top slice are not considered to be part of the SMAP and the side SVOXs that had previously pointed to these TOP-facing SVOXs as their northern adjacencies are updated to point to themselves as their northern adjacencies. Similarly, when a South ring pole is formed, the BOTTOM-facing SVOXS on the bottom slice are not considered to be part of the SMAP and the side SVOXs that had previously pointed to these BOTTOM-facing SVOXs as their southern adjacencies are updated to point to themselves as their southern adjacencies.

The determination of whether to use flag or ring poles depends upon the classification that was given to the object during the topological analysis process 400. This classification is also utilized to determine how many SMAPs are generated to represent the object and consequently, the number of pole pairs that must be defined. Table 1 provided below illustrates, for each object classification, the number of SMAPs that will be generated, as well as the type of the poles utilized to define each SMAP. A SMAP can have one of the following pairs of poles:

(1) FF—indicating that the North and South poles utilize the flag method;

(2) RF—indicating that the North pole utilizes the ring method and the South pole utilizes the flag method;

(3) FR—indicating that the North and South poles respectively utilize the flag and ring methods; and (4) RR—indicating that the North and South poles utilize the ring method.

TABLE 1

| | |
|---|---|
| Non-hollow solid FIG. 21(a) | One closed outer surface (FF) |
| Enclosed hollow area FIG. 21(b) | One closed outer surface (FF) One closed inner surface (FF) |
| Solid having an opening accessible from the top FIG. 21(c) | One open outer surface (RF) One open inner surface (RF) A trimmed planar surface is defined at the top |
| Solid having an opening accessible from the bottom FIG. 21(d) | One open outer surface (FR) One open inner surface (FR) A trimmed planar surface at the bottom |
| Solid having a hollow accessible from the top and bottom FIG. 21(e) | One open outer surface (RR) One open inner surface (RR) Trimmed planar surfaces are also formed at the top and bottom |
| A non-hollow with a true hole FIG. 21(f) | Two open outer surfaces (FR) and (RF) The solid is the composition of the two surfaces |
| A non-hollow trimmed on top FIG. 21(g) | One open outer surface (RF) A trimmed planar surface is formed at the top |
| A non-hollow trimmed on bottom FIG. 21(h) | One open outer surface (FR) A trimmed planar surface is formed on the bottom |
| A solid with an enclosed hollow and a true hole FIG. 21(i) | Two open outer surfaces (FR) and (RF) Two open inner surfaces (FR) and (RF) The solid is the boolean subtraction of the composition of the inner surfaces from the composition of the outer surfaces |
| Hollow Y top FIG. 21(j) | Three open outer surfaces joined at the outer junction (RR) Three open inner surfaces joined at the inner junction (RR) A trimmed planar surface is formed at the bottom and two trimmed planar surfaces are formed at the top. The solid is the composition of the nine surfaces. |
| Hollow Y bottom FIG. 21(k) | Three open outer surfaces joined at the outer junction (RR) Three open inner surfaces joined at the outer junction (RR) A trimmed planar surface is formed at the top and two trimmed planar surfaces are formed at the bottom. The solid is the composition of the nine surfaces |

As can be appreciated from the foregoing, multiple SMAPs are generated to represent certain of the object classifications. Although in many cases objects could be generated utilizing a fewer number of SMAPs than is shown in Table 1, it has been found that the reiterative DUV process 600 models some objects having complicated topologies most accurately when several simpler SMAPs are generated. For example, the hollow Y top shown in FIG. 21(g) could be modeled utilizing simply a single outer surface SMAP. However, it has been found that the reiterative DUV process more accurately models an object shaped in this manner as a combination of six SMAPs and three trimmed planar surfaces.

After the SMAPGEN subroutine has returned from generating a SMAP for a second surface at step 546, or if it is determined at step 544 that the object to be modeled does not include a second surface, the SMAP generation process proceeds to step 548 wherein a determination is made as to whether the object has been classified as a hollow Y top or bottom during the topological analysis process 400. If it is determined that the object has not been classified as a hollow Y top or bottom, the SMAP generation process proceeds to step 550 wherein a determination is made as to whether the object has a true hole. If it is determined that the object does not have a true hole, the process proceeds to step 552 (FIG. 33) wherein a determination is made as to whether special processing has been requested. When the SMAP generation process reaches step 552 and special processing is not requested, it indicates that the object is to be modeled utilizing only one or two SMAPs. One SMAP defines the outer surface of the object and, if necessary, a second SMAP defines the inner surface. At step 554, North and South poles are generated for each SMAP. The type of poles generated and the number of SMAPs created is determined in the manner shown in Table 1 based upon the classification of the object that was done during the topological analysis process 400.

The manner in which trimmed planar surfaces are utilized in the generation of a SMAP will now be described utilizing the object classification illustrated in FIG. 21(c) (solid with opening accessible from the top) as an example. As shown in Table 1 above, this type of object will be modeled utilizing SMAPs respectively defining its outer and inner surfaces and a trimmed planar surface at the top of each SMAP. The solid representation of the object is defined as the composition of the three surfaces. The group of interconnected SVOXs generated by the SMAPGEN subroutine for the outer surface will have top facing SVOXs extending across the top slice of the object. This will be understood by the fact that, at step 536 of subroutine SMAPGEN, top SVOXs are generated for each voxel enclosed by the contour of the surface for which the SMAP is being generated. Therefore, when the SMAPGEN subroutine is called from step 542 of the SMAP generation process, it will generate top SVOXs for all voxels enclosed by the contour of the outer surface on the top slice. Similarly, the group of interconnected SVOXs generated by the SMAPGEN subroutine for the inner surface will include top SVOXs on the top slice for the area enclosed within the inner surface. When the North and South poles for each SMAP are generated at step 554 of the SMAP generation process, the top SVOXs for both the inner and outer surfaces are disregarded and a ring pole is formed. The top surface of the object is modeled by a trimmed planar surface which, for an object having this topology, is a flat surface on the top slice consisting of top facing SVOXs extending between the inner and outer surfaces.

When the SMAP generation process proceeds to step 554, the object will be modeled with at most two SMAPs. Therefore, after the North and South poles have been generated for each SMAP at step 554, the SMAP generation process terminates.

When it is determined at step 548 that the object has been classified as a hollow Y top or bottom, the SMAP generation process proceeds to step 558 (FIG. 34) wherein the single group of interconnected SVOXs generated by the SMAPGEN subroutine for the outer surface of the object is separated into three separate groups of SVOXs. The groups of SVOXs are formed based upon the location of the junctions that were described above with regard to the contour analysis process 300. As described above, a junction is defined at a slice wherein a single surface contour is overlapped by two or more distinct contours on an adjacent slice. For a hollow Y top or bottom, a junction is formed at the slice wherein the main stem branches into two separate legs.

During step 558, the group of interconnected SVOXs formed during the SMAPGEN subroutine are split into three groups at the junction. The first group defines the outer surface of the main stem and the second and third groups respectively define the outer surfaces of the legs of the hollow Y top or bottom. The groups of SVOXs are split into two separate legs by examining the slices at the junction and creating two separate chains of overlapping contours that extend from the junction.

After the outer SVOXs have been separated into three groups, the SMAP generation process proceeds to step 560 wherein North and South poles are generated for each of the three groups of SVOXs defined in step 558. As shown in Table 1 above, the North and South poles for each of the three outer SMAPs are generated utilizing the ring pole method.

After the outer three SMAPs are generated, the SMAP generation process proceeds to step 562 wherein the group of interconnected SVOXs generated by the SMAPGEN subroutine for the inner surface of the object is separated into three separate groups. This separation is done based upon the junction of the inner surface of the main stem and the two legs in much the same manner as was described above in relation to step 558. Thereafter, in step 564, North and South ring poles are generated for each of the three groups of SVOXs defined in step 558 to form three inner SMAPs. As a result, six SMAPs are generated to represent the hollow Y top and bottom objects. Additionally, as shown in Table 1 above, the solid models for these object classifications are completed by combining these six SMAPs with three trimmed planar surfaces. For the hollow Y top, trimmed planar surfaces define the bottom of the main stem and the tops of the two legs. For the hollow Y bottom, trimmed planar surfaces define the top of the main stem and the bottoms of the two legs.

When it is determined at step 550 (FIG. 32) that the object has been classified as having a true hole, the SMAP generation process proceeds to step 566 (FIG. 35) wherein the group of interconnected SVOXs generated by the SMAP-GEN subroutine for the outer surface of the object is separated into two groups. The SVOXs are separated in step 566 at the down junction between the portion of the object surrounding the true hole on each side, and the remainder of the object. An example of a junction in a non-hollow object with a true hole is shown by a dotted line in FIG. 21(f). After the group of SVOXs are split into two groups, the SMAP generation process proceeds to step 538 wherein North and South poles are generated for each of the two groups of SVOXs. As described in Table 1 above, the poles at the junction for each group are defined utilizing the ring method, and the poles at the outer ends for each group are defined using the flag method. As a result, the non-hollow with a true hole is represented utilizing two outer SMAPs and the object is the composition of the two SMAPs.

After two outer SMAPs are generated at step 568, the SMAP generation process proceeds to step 570 wherein a determination is made as to whether the object has been classified as a solid with an enclosed hollow and a true hole. If it has, the SMAP generation process proceeds to step 572 wherein the group of interconnected SVOXs generated by the SMAPGEN subroutine for the inner surface of the object are separated into two groups along the down junction formed at the true hole in much the same manner as was described above in reference to step 566. Thereafter, the process proceeds to step 574 wherein North and South poles are generated for each group of SVOXs created at step 572 to generate two inner SMAPs. The poles are generated in much the same fashion as was described above with regard to step 568. The poles at the true hole junction are defined utilizing the ring method and the poles at the other ends are defined utilizing the flag method. As shown in Table 1 above, the solid with an enclosed hollow and a true hole is the boolean subtraction of the composition of the inner surfaces from the composition of the outer surfaces.

When it is determined at step 552 (FIG. 33) that special processing has been requested, the SMAP generation process proceeds to step 576 (FIG. 36) wherein a determination is made as to whether the selected object is a femur as shown in FIG. 22(*a*). If it is determined that the object is a femur, the SMAP generation process proceeds to step 578 wherein the groups of interconnected SVOXs generated by the SMAPGEN subroutine for both the inner and outer surfaces of the femur are separated into two groups each. As previously described, experience has shown that the various femur shapes shown in FIGS. 22(*a*)–(*f*) can most accurately be modeled by customizing the general process. The manner in which the recognized femur topologies are modeled is shown in FIGS. 38(*a*)–(*f*). As shown in FIG. 38(*a*), two SMAPs, two XY ring surfaces and a trimmed planar surface are generated to model the femur shown in FIG. 22(*a*). An outer SMAP is formed for the upper head portion of the femur utilizing a flag pole at the top and a ring pole at the bottom. An XY ring surface is formed for the shaft portion of the femur utilizing ring poles at both the top and bottom. XY ring surfaces are formed utilizing the XY ring method (rather than by generating a SMAP and performing the DUV method on the SMAP) in a manner that is fully described below. The inner surface of the femur is similarly represented by an upper SMAP for the head portion utilizing (FR) poles and an XY ring surface for the inner shaft portion utilizing (RR) poles. The bottom surface of the femur is represented by a trimmed planar surface. As shown in FIG. 38(*a*), the solid portion of the femur is the composition of the two SMAPs, the two XY ring surfaces and the trimmed planar surface.

With the exception of the femur shaft shown in FIG. 38(*d*) and the femur non-hollow shaft shown in FIG. 38(*c*), each of the femur objects is modeled by generating separate SMAPs and/or XY ring surfaces for the head of the femur and the lower portions of the femur. The femur head is isolated from the remaining portions of the femur in the following manner. The contours defined on each slice are examined beginning with the shaft and moving upward on a slice-by-slice basis. For each slice, the center voxel for the contour is determined and the distance between the center voxel and each of the other voxels contained within the contour is measured. The largest and smallest distances are stored and their ratio is compared to a constant cut-off ratio that is determined by the user. This ratio is established such that it defines a contour that is more oblong than circular. Therefore, when a contour is examined that has a ratio that exceeds the cut-off ratio, it indicates that the femur at this slice is shaped in a manner that is more oblong than circular. This slice is determined to be a separation point between the femur head and the remainder of the femur. Therefore, all contours above the slice having the ratio exceeding the predetermined ratio are determined as belonging to the femur head, and all contours below the slice are determined to belong to the lower portion of the femur.

The steps of the SMAP generation process that perform the above-described modeling of the femur are shown in FIG. 36. In step 578, the groups of SVOXs representing the inner and outer surfaces of the femur are each separated into two groups. Thereafter, in step 579, poles are generated in the manner described above to generate inner and outer SMAPs, and the trimmed planar surface is generated.

When it is determined at step 576 that the object is not a femur as shown in FIG. 22(*a*), the SMAP generation process proceeds to step 580 wherein a determination is made as to whether the object is a femur non-hollow as shown in FIG. 22(*b*). As shown in FIG. 38(*b*), the femur non-hollow is represented by a SMAP for the outer surface of the upper head portion, an XY ring surface for the outer surface of the shaft portion, and a trimmed planar surface at the bottom. When it is determined at step 580 that the object is a femur non-hollow, the SMAP generation process proceeds to step 581 wherein the group of interconnected SVOXs generated by the SMAPGEN subroutine is separated into two groups in the manner described above. Thereafter, in step 582, the SMAP is defined by generating poles for each group of SVOXs in the manner shown in FIG. 38(*b*), and the bottom trimmed planar surface is created.

When it is determined at step 580 that the object is not a femur non-hollow, the SMAP generation process proceeds to step 583 wherein a determination is made as to whether the object is a femur non-hollow shaft as shown in FIG. 22(*c*). As shown in FIG. 38(*c*), the femur non-hollow shaft is modeled as a single XY ring surface utilizing an (RR) pole method and having trimmed planar surfaces at its top and bottom. Therefore, when it is determined at step 583 that the object is a femur non-hollow shaft, the process proceeds to step 584 wherein poles are generated in the manner described above, and the two trimmed planar surfaces are created.

When it is determined at step 583 that the object is not a femur non-hollow shaft, the SMAP generation process proceeds to step 585 (FIG. 37) wherein a determination is made as to whether the object is a femur shaft as shown in FIG. 22(*d*). As shown in FIG. 38(*d*), the femur shaft is represented with inner and outer XY ring surfaces, each utilizing the (RR) pole method, and with trimmed planar surfaces at its top and bottom. The femur shaft is defined as the composition of these four surfaces. Therefore, when it is determined at step 585 that the object is a femur shaft, the SMAP generation process proceeds to step 586 wherein the poles are generated for the inner and outer groups of SVOXs created by the SMAPGEN subroutine in the manner described above, and wherein the two trimmed planar surfaces are created.

When it is determined at step 585 that the object is not a femur shaft, the SMAP generation process proceeds to step 587 wherein a determination is made as to whether the object is a femur entire as shown in FIG. 22(*f*). As shown in FIG. 38(f), the femur entire is modeled as the composition of four SMAPs. Outer and inner SMAPs are formed for the upper portion of the femur entire utilizing the (FR) pole method. Additionally, outer and inner SMAPs are formed for the bottom portion of the femur entire utilizing the (RF) pole method. Therefore, when it is determined at step 587 that the object is a femur entire, the SMAP generation process proceeds to step 588 wherein the inner and outer groups of interconnected SVOXs generated by the SMAPGEN subroutine are each separated into two groups in the manner shown in FIG. 38(f). Thereafter, in step 589, poles are generated to form four SMAPs in the manner described above.

When it is determined at step 587 that the object is not a femur entire, the SMAP generation process proceeds to step 590 wherein a determination is made as to whether the object is a femur non-hollow entire as shown in FIG. 22(e). When it is determined that the object is not a femur non-hollow entire, the SMAP generation process proceeds to step 591 wherein error signals are generated to indicate the fact that although special processing was requested, the object does not fit within any of the recognized special topologies. As shown in FIG. 38(e), the femur non-hollow entire is modeled with an outer SMAP for the top portion utilizing the (FR) pole method, and outer SMAP for the bottom portion utilizing the (RF) pole method. Therefore, when it is determined at step 590 that the object is a femur non-hollow entire, the SMAP generation process proceeds to step 592 wherein the outer group of interconnected SVOXs generated by the SMAPGEN subroutine is separated into two groups. Thereafter, in step 593, poles are generated for each of these groups in the manner described above to form two SMAPs.

After the above-described steps are performed, the SMAP generation process 500 has been completed. As a result, the object is represented utilizing one or more SMAPs, each SMAP having a North and South pole.

Reiterative DUV Process

The reiterative DUV process receives as an input the one or more SMAPs generated during the SMAP generation process 500. Each of the SMAPs is a collection of SVOXs having a North and South pole. Each pole is a path of adjacent SVOXs along the surface of the SMAP. When the pole is formed using the flag method, the pole path is only one SVOX in length.

Although the collection of SVOXs generated during the SMAP generation process 500 represents the surface of the object utilizing far less data than the volumetric representation input to the process at step 100, it still represents the object as a collection of discrete elements (i.e. SVOXs). The purpose of the reiterative DUV process is to generate a series of XYZ control points which can be utilized to generate a NURB surface model that approximates the SMAP. As is more fully described below, the XYZ control points are defined at the intersection of a series of SVOX paths that criss-cross the SMAP. The generation of these SVOX paths is performed by the reiterative DUV method.

The first step in the reiterative DUV process is to divide the SMAP into two initial areas of roughly equal size by drawing a pair of v-lines across the SMAP. The areas of the SMAP that are formed when a u or v-line divides the SMAP into two or more areas is defined as a quadrant. The term quadrant is chosen because these areas are four-sided in that they are defined by four edges. The edges of each quadrant comprise paths of adjacent voxes that make up the respective u and v-lines that are generated across the SMAP by the reiterative DUV process. Therefore, the SVOXs that are included in a u or v-line are defined as being edges of the quadrants that they form. Each quadrant includes the SVOXs that form the edge paths defining it, as well as the SVOXs enclosed within the four edge paths. The SVOXs enclosed within the edge paths of a quadrant are referred to as inner SVOXs for the quadrant. The number of inner SVOXs within any quadrant is known as the area of the quadrant.

Figure 39A:
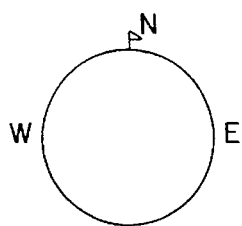
Figure 39B:
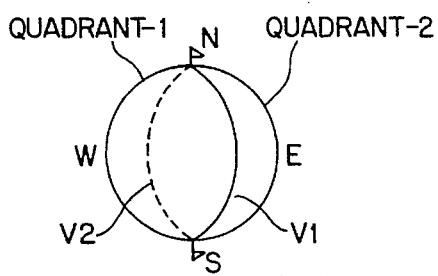

A general description of the reiterative DUV process will now be provided making reference to FIGS. 39(a)–(e). FIG. 39(a) illustrates a SMAP of a spherical body having North and South flag poles formed thereon. As shown in FIG. 39(b), the first step in the reiterative DUV process is to generate two v-lines v1 and v2 between the North and South poles. Each v-line is a path of adjacent SVOXs along the surface of the SMAP. As a result, the two v-lines form a continuous path that passes through each pole and extends around the SMAP so as to divide it into two quadrants labeled as quadrant-1 and quadrant-2. Each quadrant is made up of a group of SVOXs that are enclosed between the SVOX paths that make up the v-lines v1 and v2.

Figure 39C:
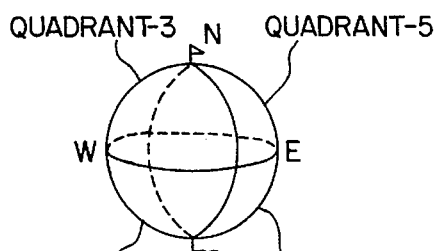
Figure 39D:
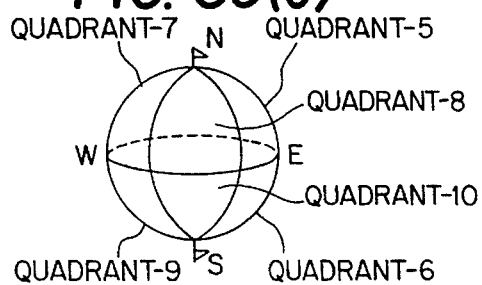
Figure 39E:
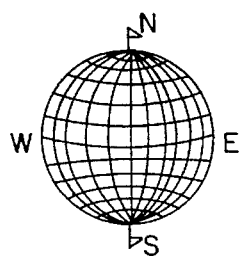
Figure 39F:
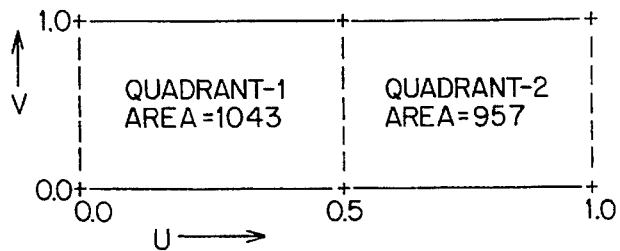
Figure 39G:
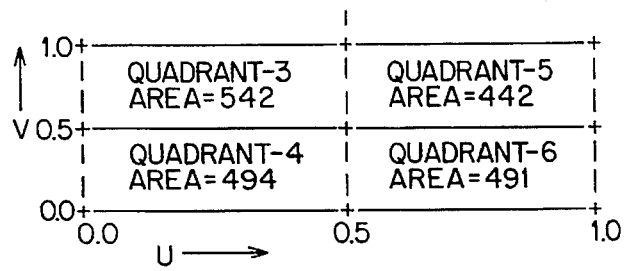

A representation of the SMAP of FIG. 39(b) in UV space is shown in FIG. 39(f). UV space is a manner of representing the SMAP in terms of a two-dimensional array having U and V coordinates. The v-lines are represented in UV space as being parameterized in the range from V=0.0 to V=1.0 and are of constant parameterization in U. By definition, each v-line generated during the reiterative DUV process begins and ends at the poles of the SMAP. When the flag pole method is used, every v-line will begin at the same point and end at the same point. Therefore, regardless of the manner in which the U coordinate values vary for various v-lines, every point on the UV array where V=0 represents the same SVOX on the SMAP, i.e. the South flag pole. Similarly, regardless of the manner in which the U coordinate values vary for various v-lines, every point on the UV array where V=1.0 represent the North pole of the SMAP when the flag pole method is used.

The u-lines extend around the width of the SMAP. Each u-line is a path of adjacent SVOXs along the surface of the SMAP. The u-lines are represented in UV space as being parameterized in the range from U=0.0 to U=1.0 and are of constant parameterization in V. In order to be represented in the two-dimensional UV array, the continuous u-lines around the SMAP must be assigned begin and end points. The beginning of a u-line is designated in UV space at U=0.0 and the end is represented at U=1.0. Since each u-line completely encircles the SMAP, the end point for each u-line is the same point as its beginning point. Therefore, as represented in UV space, the lines of points at U=0.0 and U=1.0 represent the same line of points on the SMAP.

As stated above, the reiterative DUV process is initiated by drawing two initial v-lines that divide the SMAP into two quadrants. An example of a SMAP for which two v-lines have been generated is shown in FIG. 39(b) and its representation in UV space is shown in FIG. 39(f). One of the initial v-lines is arbitrarily designated to have a U coordinate of U=0.5. The other v-line is designated as having a U coordinate of U=0.0 and is duplicated at U=1.0 as described above. The two v-lines divide the SMAP into two quadrants, each of which is arbitrarily designated as either quadrant-1 or quadrant-2. As shown in FIG. 39(b), quadrant-1 and quadrant-2 abut one another at each of the v-lines v1 and v2. As shown in FIG. 39(f), this relationship is represented in UV space wherein the quadrants each abut a v-line at U=0.5 and wherein each quadrant also respectively abuts a v-line at either U=0.0 or U=1.0 which define the same line as was described above. It should be understood that the designation of a v-line as corresponding to U=0.5 does not necessarily indicate that it is equally positioned between the v-lines U=0.0 and U=1.0 in XYZ space. This is illustrated in FIG. 39(f) wherein the areas of quadrant-1 and quadrant-2 are not equal. The U coordinate assigned to a v-line when the v-line is generated is utilized to merely indicate the relative position of the v-line in relation to other v-lines that are generated during the reiterative DUV process.

After the initial v-lines have been generated, the reiterative DUV process, as shown in FIG. 39(c), generates a u-line across the width of the SMAP. As shown by the UV representation in FIG. 39(g), the u-line is indicated as having a constant V coordinate of V=0.5. The u-line further divides quadrant-1 into quadrant-3 and quadrant-4 and further divides quadrant-2 into quadrant-5 and quadrant-6 as shown in FIGS. 39(c) and (g). As can be seen from FIG. 39(g), the total areas of quadrant-3 and quadrant-4 is not equal to the area of quadrant-1. The reason for this disparity in areas is that some SVOXs that were included in the area of quadrant-1 are used to create the u-line that divides quadrant-1. After the u-line is generated, these SVOXs are designated as edge paths for quadrant-3 and quadrant-4 and are not considered to be part of the area of either of these quadrants.

Figure 39H:
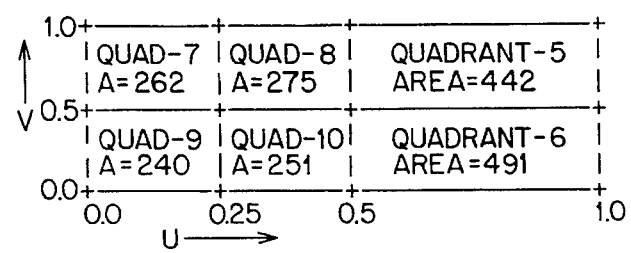
Figure 39I:
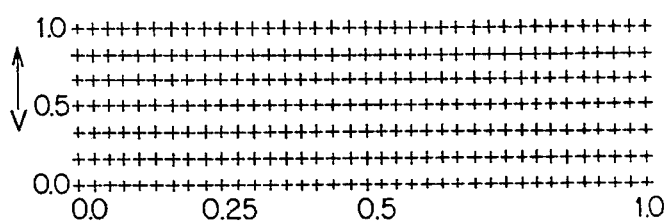

As shown in FIGS. 39(d)–(e), the reiterative DUV process continually generates u and v-lines to further divide the SMAP. As a result, a two-dimensional array such as the one shown in FIG. 39(i) is generated that includes a plurality of points where the u and v-lines intersect one another. Each of these intersection points represents a SVOX on the surface of the SMAP which is defined by its XYZ coordinates and its orientation. The XYZ coordinates and orientation for each of the SVOXs defining the intersection of the u and v-lines generated during the reiterative DUV process can be used as control points to define a NURB surface representing the SMAP as is further described below.

As stated above, the first step in executing the reiterative DUV process is to generate the initial v-lines extending between the SMAP poles. There are four basic methods that have been developed for determining the manner in which the initial v-lines should be generated. It has been found through practice that the manner in which the initial v-lines are generated can have a significant impact on the accuracy of the resulting NURB solid model created utilizing the control points generated by the reiterative DUV process.

The first method for generating the initial v-lines is termed the gauntlet method. Under the gauntlet method, the shortest possible SVOX path between the North and South poles is chosen to form the first v-line. Thereafter, the second v-line is generated by creating a path of SVOXs between the North and South poles that, along its entire length, is maintained at an equal distance in both the East and West directions from the first v-line, distance being measured as the shortest SVOX path required to reach the v-line.

The second method for generating the initial v-lines is called the hilltop method and is similar to the gauntlet method described above. Initially, the shortest possible SVOX path is traced from the first SVOX Of each pole. Thereafter, the shortest SVOX path is also traced from the median SVOX of each pole. When the flag method is used, the first and median SOVXs will be identical. When the ring method is used, the first SVOX will be arbitrarily selected and the median SVOX is the SVOX located halfway around the ring pole from the first SVOX. After SVOX paths have been generated from the first and median SVOXs, the shorter of the two paths is kept as the first v-line. The SMAP is then analyzed to determine the SVOX that is furthest away from each of the poles and the first v-line. This SVOX is designated as the hilltop. The second v-line is generated by creating the shortest SVOX between the North pole and the hilltop and then the shortest path between the hilltop and the South pole.

The third method for generating the initial v-line is called the shortest landmark method. This method is utilized only when special processing has been requested by the user. As was described above, special processing can be utilized to ensure particularly accurate modeling of an object having a specific topology. Currently, the only special processing that has been implemented is for the femur. However, as was stated above, special processing could also be developed for other objects based upon the teachings provided herein. The shortest landmark method utilizes landmark SVOXs that are determined during the topological analysis of the object. The shortest landmark method ensures that one of the initial v-lines drawn between the poles passes through each of the determined landmarks. In this way, the initial v-lines can be forced to pass over areas of tricky topology. As stated above, the placement of the initial v-lines can be important in determining the accuracy of the NURB solid model that will be created from the control points generated during by the reiterative DUV process. The shortest landmark method is currently utilized to model the outer surface of the femoral head. The femoral head is modeled utilizing the six landmarks shown in FIG. 40. These landmarks include: (1) the top of the femoral head; (2) the top of the greater trochanter; (3) the bottom of the femoral lip; (4) the opposite side of the femoral lip; (5) the "front point" of the knob; and (6) the opposite side of the "front point" of the knob. The selection of these landmark SVOXs results in the generation of initial v-lines that divide the outer surface of the femoral head into two quadrants of essentially equal size. By ensuring that the initial v-lines pass through these landmark SVOXs, it has been found that control points are generated that result in a particularly accurate NURB solid model of this tricky geometry.

The fourth method for determining the initial v-line generation is the planar intersection method. In this method, three SVOXs are selected on the SMAP to define a plane extending through the SMAP. Thereafter, the initial v-lines are generated by determining the shortest possible SOVX paths between the poles that include only SVOXs that are intersected by the defined plane. This method allows the user to constrain the generation of the initial v-lines by defining a plane through which the v-lines will be generated. The planar intersection method is currently utilized to model the inner surface of the femur. The SVOXs and XYZ point utilized to define the plane are as follows: (1) the top of the femoral head which was designated as the first landmark utilized in the shortest landmark method shown in FIG. 40; (2) the SVOX on the ring pole that is the closest to that first landmark SVOX; and (3) the center point of the femoral head ring pole which is not a SVOX but is defined in terms of its XYZ coordinates. These three points define a plane that essentially bisects the femoral head. Since the planar intersection method constrains the initial v-lines to include only SVOXs that are intersected by this plane, it ensures that the initial v-lines essentially divide the femoral head into equal parts.

Although the landmark and planar intersection methods have been described herein as being utilized in modeling the femur head, it should be appreciated that they can also be utilized to model other tricky geometries.

The steps that implement the reiterative DUV process will now be described making reference to FIGS. 41–45. The first step of the reiterative DUV process is to determine, at step 602 (FIG. 41) whether special processing has been requested. When special processing has not been requested, the reiterative DUV process proceeds to step 603 wherein a first SMAP is selected for the reiterative DUV process to operate upon. This step must be executed because multiple SMAPs may have been generated during the SMAP generation process 500 and the reiterative DUV process operates on only one SMAP at a time. After a SMAP is selected for processing, the reiterative DUV process proceeds to step 604 wherein the initial v-lines are generated. Step 604 generates the initial v-lines based upon either the gauntlet or hilltop methods since the other methods of generating the initial v-lines are only utilized when special processing is requested. A determination of whether to use the hilltop or gauntlet method could be handled in various ways. Ideally, each method could be tried and the results could be examined to determine which of the methods achieves the desired result of dividing the SMAP into quadrants having areas that are most nearly equal. However, as currently implemented, step 604 selects between the hilltop and gauntlet methods based upon the classification of the object that was conducted during the topological analysis process 400. The selection between the gauntlet and hilltop methods for the various topologies is shown in the chart provided in FIGS. 46(a)–(b).

When it is determined at step 602 (FIG. 41) that special processing has been requested, the reiterative DUV process proceeds to step 644 (FIG. 45) wherein a determination is made as to whether the first SMAP of the object represents the inner or outer surface of the femur head. When it is determined at step 644 that the SMAP represents the femur head, the reiterative DUV process proceeds to step 646 wherein initial v-lines are generated for the SMAP utilizing the landmark or planar methods. As previously described, it has been determined that the outer surface of the femur can be modeled with particular accuracy utilizing the landmark SVOXs shown in FIG. 40. Therefore, if the SMAP being subjected to the reiterative DUV process represents the outer surface of the femur head, the initial v-lines are generated utilizing the landmark method. Alternatively, if the SMAP represents the inner surface of the femur head, the initial v-lines are generated using the planar method in the manner described above.

After the initial v-lines are generated at step 646, the reiterative DUV process returns to step 606 (FIG. 41) which is also the next step performed after initial v-lines are generated at step 604 when special processing is not requested. Therefore, as seen from the foregoing description, the only difference in the manner in which the reiterative DUV process processes a SMAP when special processing is requested is that a different technique is utilized to generate the initial v-lines.

As stated above, after the initial v-lines have been generated, the reiterative DUV process proceeds to step 606 wherein each SVOX is assigned to be part of either a pole path, a quadrant edge path, or as an inner SVOX for one of the two quadrants formed by the initial v-lines. The SVOXs that implement the initial v-lines are edge paths that define the edge of each of the two quadrants formed by the v-lines. The SVOXs that are not part of the v-lines or the pole paths are assigned to be inner SVOXs for one of the quadrants.

In step 608, the quadrants are parameterized. One quadrant is deemed to be parameterized from U=0.0 to U=0.5, V=0.0 to v=1.0 and the other quadrant is deemed to be parameterized from U=0.5 to U=1.0, V=0.0 to V=1.0 in the manner described above with regard to FIG. 39. In UV space, there are now considered to be three v-lines, as shown in FIG. 39(f) at U=0.0, U=0.5 and U=1.0, and two u-lines at v=0.0 and V=1.0. However, as was described above in reference to FIG. 39, the v-lines at U=0.0 and U=1.0 are duplicates of one another.

The parameterization of the quadrants also includes the storing of information relating to several characteristics of the quadrants generated by the initial v-lines. First, the quadrant number for each quadrant is stored. As was stated above, the selection of one quadrant as being quadrant-1 and the other as being quadrant-2 is arbitrary. Second, the U and V parameters defining each quadrant are stored. Third, the SVOXs that define the edges of each quadrant are stored. Fourth, the area of the quadrant in terms of the number of SVOXs included therein is stored. Fifth, the list of SVOXs included within each quadrant is stored. As a result, the quadrants are formed and each is defined by the above-described characteristics. The parameterization of the quadrants includes an updating of each SVOX to indicate whether it is an edge or inner quadrant and, if it is an inner quadrant, the number of the quadrant to which it belongs. As shown in FIG. 25, the data structure that describes each SVOX includes information relating to whether the SVOX is an edge SVOX or is an inner SVOX of a quadrant, and if it is an inner SVOX, the number of the quadrant to which it belongs.

After the quadrants have been parameterized, the reiterative DUV process proceeds to step 610 wherein a determination is made as to whether the maximum number of u and v-lines have been generated. The number of u and v-lines is determined by the user before the reiterative DUV process is begun. This maximum number establishes when the reiterative DUV process is determined to have been completed. In general, the more u and v-lines generated, the more accurately the NURB surface generated from the output of the reiterative DUV process will model the SMAP because more control points will be generated. However, once a large number of u and v-lines have been generated, the increase in accuracy resulting from additional u or v-lines is less significant and the generation of additional UV lines requires additional processing time. The user can establish a parameter for halting the reiterative DUV process in one of three ways. First, the user can set a maximum number of u-lines to be generated. Second, the user can generate a maximum number of v-lines to be generated. Third, the user can generate a maximum number of u and v-lines to be generated. This last option is generally preferable because although it establishes the maximum number of lines to be generated, it allows the reiterative DUV process to make the determination of the best way to distribute the lines in terms of u or v-lines.

When it is determined at step 610 that the maximum number of u and v-lines has not yet been generated, the reiterative DUV process proceeds to step 612 (FIG. 42) wherein the target quadrant for the next u or v-line is determined. The target quadrant is determined by examining each of the quadrants already defined during the preceding steps in order to determine the quadrant having the largest area. This quadrant is determined to be the target quadrant. After the target quadrant has been determined, the reiterative DUV process proceeds to step 614 wherein a determination is made as to whether a u or v-line should be generated to further sub-divide the target quadrant. This determination is done by comparing the length of the North and South edges of the target quadrant with the length of the East and West edges of the quadrant. The North, South, East and West edges of the quadrants are defined in the manner shown in FIG. 39. When it is determined that the North-South edge of the target quadrant is longer than the East-West edge, it is determined at step 616 that a u-line will be utilized to sub-divide the target quadrant. Alternatively, when it is determined that the East-West edge of the target quadrant is longer, it is determined at step 616 that a v-line will be utilized to sub-divide the target quadrant. The reiterative DUV (directed UV) process derives its name from steps 612 and 614. The goal of the process is to direct a u or v-line toward the quadrant having the largest area because this area is theoretically the one in which the object is least accurately defined by the existing u and v-lines.

At step 616, the reiterative DUV process determines the parameters of the u or v-line that will be generated based upon the determination made at step 614. When it is determined at step 614 that a v-line will be generated, the v-line will be parameterized such that it is given a U value that is halfway between the U values of the two v-lines defining the edges of the target quadrant. As an example, refer to FIG. 39(c) wherein the SMAP has been divided into four quadrants. Quadrant-3 is selected as the target quadrant because it has the largest area. As shown in FIG. 39(d), a determination was made to sub-divide quadrant-3 with a v-line. As shown in FIG. 39(h), the v-line utilized to sub-divide quadrant-3 is assigned a U value of U=0.25 which is halfway between the U values of the two v-lines that define quadrant-3. In a similar manner, when it is determined at step 614 that a u-line should be generated to sub-divide the target quadrant, the u-line is parameterized such that it has a V value that is halfway between the values of the u-lines that define the edges of the target quadrant. As was described above in reference to FIG. 39, the assignment of a U or V value halfway between the existing lines that define the target quadrant is utilized to merely indicate the parametric position of the newly created u or v-line in UV space and does not indicate that the line actually divides the target quadrant precisely in half in XYZ space.

After the u or v-line to be generated has been parameterized, the reiterative DUV process, at step 618, proceeds to the first quadrant. Thereafter, at step 620, a determination is made as to whether the quadrant being examined is the last quadrant defined for the SMAP. When it is determined that the quadrant being examined is not the last quadrant, the reiterative DUV process proceeds to step 622 wherein a determination is made as to whether the u or v-line to be generated will divide the quadrant being examined. When it is determined at step 622 that the quadrant currently being examined will not be divided by the u or v-line to be generated, the process proceeds at step 624 to go to the next quadrant and then returns to step 620. In this manner, the reiterative DUV process cycles through each quadrant defined for the SMAP until it is determined at step 622 that a quadrant is being examined that will be divided by the u or v-line to be generated to divide the target quadrant as determined at step 616. Referring once again to the example shown in FIGS. 39(c)–(d), it can be seen that although the generation of the v-line was determined so that it would sub-divide the target quadrant-3, this v-line also sub-divides quadrant-4. In that regard, once the initial v-lines are generated and a u-line has been generated, the generation of additional u or v-lines will always sub-divide more than one quadrant. Therefore, in steps 620–624, the reiterative DUV process cycles through each of the quadrants until it determines at step 622 that it has found a quadrant that will be divided by the u or v-line selected at steps 612–616 for the purpose of sub-dividing the target quadrant.

When it is determined at step 622 that the quadrant currently being examined should be divided by the u or v-line to be generated, the reiterative DUV process proceeds to step 625 wherein the quadrant is divided utilizing the gauntlet method. When it was determined at steps 614–616 that a u-line is to be generated, the gauntlet method is performed by generating a SVOX path between the midpoints of the East and West edges of the quadrant, the SVOX path remaining equidistant from the North and South edges of the quadrant. Similarly, when it was determined at steps 614–616 that a v-line is to be generated, a SVOX path is created between the midpoints of the North and South edges of the quadrant that remains equidistant from the East and West edges of the quadrant. After the u or v-line has been generated, each SVOX that was part of the area of the sub-divided quadrant is reassigned. Each SVOX is reassigned to be either part of the area of one of the two newly created quadrants formed by the generation of the u or v-line, or to be part of the edge path between the two newly created quadrants.

After the quadrant has been sub-divided utilizing the gauntlet method in step 625, the reiterative DUV process proceeds to step 626 (FIG. 43) wherein a determination is made as to whether the split was successful. To determine whether the split was successful, the area of the larger of the two newly created quadrants is compared with the area of the quadrant that was sub-divided at step 625. The ratio of these areas is then compared with a minimum acceptable ratio that is established by the user. A typical minimum acceptable ratio is that, for the split to be considered successful, the larger of the two newly created quadrants should have an area that is no greater than 75% of the area of the quadrant that was split to form the two new quadrants. However, this value can be set to any value the user desires. When it is determined at step 626 that the split was successful, the reiterative DUV process returns to step 625 (FIG. 42) wherein it proceeds to examine the next quadrant.

When it is determined at step 626 that the split was not successful, the reiterative DUV process proceeds to step 628 wherein the quadrant split at step 625 is rejoined. Thereafter, the reiterative DUV process proceeds to step 630 wherein the re-joined quadrant is sub-divided using the hilltop method. A hilltop SVOX is determined that is as far away from the four edges of the quadrant as possible. When it is determined at steps 614–616 that a u-line is to be generated, paths are drawn from the midpoints of the East and West edges of the quadrant to the hilltop SVOX. Each of these paths is generated to be as short as possible. Similarly, when a v-line is to be generated, the shortest possible SVOX paths are generated from the midpoints of the North and South edges of the quadrant to the hilltop SVOX. After the new u or v-line is generated, each SVOX within the quadrant divided at step 630 is reassigned. Each SVOX is reassigned to be either part of the area of one of the two newly created quadrants formed by the generation of the u or v-line, or to be part of the edge path between the two newly created quadrants.

After the quadrant is sub-divided using the hilltop method in step 630, the reiterative DUV process proceeds to step 632 wherein a determination is made as to whether the split was successful. This determination is made by first determining the ratio of the area of the larger of the two quadrants created at step 630 with the area of the quadrant that was subdivided. Thereafter, this ratio is compared with the ratio of the larger of the two quadrants created by the gauntlet method at step 625. When the ratio of the quadrants created using the hilltop method is smaller than that generated using the gauntlet method, the split is determined at step 632 to have been successful and the reiterative DUV process returns to step 624 (FIG. 42) wherein it proceeds to the next quadrant. When it is determined at step 632 that the split was unsuccessful because the ratio generated by the hilltop method is larger than the ratio generated using the gauntlet method, the reiterative DUV process proceeds to step 634 wherein the quadrant that was sub-divided at step 630 is rejoined together. Thereafter, at step 636 the quadrant is sub-divided again utilizing the gauntlet method in the same manner as was described above for step 625. At that point, the sub-division of the quadrant is complete and the reiterative DUV process returns to step 624 wherein it proceeds to the next quadrant.

In the manner described above, the reiterative DUV process proceeds through each of the existing quadrants on a quadrant-by-quadrant basis generating the u or v-line that was determined at steps 614–616 as being the most desirable way to sub-divide the target quadrant. Since the gauntlet and hilltop methods both generate u and v-line across each quadrant that extend between the midpoints of the quadrant edges, the u and v-line segments generated independently across each quadrant interconnect at the midpoints of the quadrant edges to create complete u and v-lines that extend fully across the SMAP.

The reiterative DUV process continues to cycle through each quadrant until it has been determined at step 620 (FIG. 42) that the last quadrant has been examined. At that point, the SMAP has been fully sub-divided by the u or v-line determined at steps 614–616 as being the best line to sub-divide the target quadrant. The reiterative DUV process then returns to step 610 (FIG. 41) wherein a determination is made as to whether the maximum number of UV lines have been generated. When it is determined that maximum number of UV lines has not yet been generated, the reiterative DUV process returns to step 612 (FIG. 42) and generates another u or v-line to subdivide the SMAP in the manner described above. This reiterative process continues until it is determined at step 610 that the maximum number of UV lines has been generated. At that point, the reiterative DUV process proceeds to step 638 (FIG. 44) wherein a determination is made as to whether any additional SMAPs remain to be processed. As was described above, some object types are modeled in terms of more than one SMAP. Each SMAP utilized to model the object is subjected to the reiterative DUV process. Therefore, when it is determined at step 638 that there are additional SMAPs to be processed, the reiterative DUV process proceeds to step 640 wherein the next SMAP is selected for processing. Thereafter, a determination is made at step 642 as to whether special processing has been requested. If special processing has not been requested, the reiterative DUV process returns to step 604 (FIG. 41) wherein u and v-lines are generated for the newly selected SMAP in the manner described above. In this manner, the reiterative DUV process generates u and v-lines for each SMAP utilized to model the object until it is determined at step 638 that there are no additional SMAPs to be processed. At that point, the reiterative DUV process terminates.

As stated above, when it is determined at step 602 (FIG. 41) that special processing has been requested, the reiterative DUV process proceeds to step 644 (FIG. 45) wherein a determination is made as to whether the first SMAP of the object represents the inner or outer surface of the femur head. When it is determined at step 644 that the SMAP is not of the femur head, the reiterative DUV process proceeds to step 648 wherein a determination is made as to whether the SMAP represents a femur shaft. When it is determined at step 648 that the SMAP does not represent a femur shaft, the reiterative DUV process proceeds to step 650 wherein an error signal is generated. As stated above, the only special processing currently recognized is for the six femur types shown in FIGS. 22 and 38. As shown in FIG. 38, each of the femur types is modeled utilizing at least one SMAP representing the femur head or the femur shaft. Therefore, if special processing was requested but there is no SMAP representing a femur shaft or femur head, an error condition exists.

When it is determined at step 648 that the SMAP being processed represents a femur shaft, the reiterative DUV process proceeds to step 652 wherein an XY ring surface is generated for the SMAP. Although the generation of an XY ring surface is described as being part of the reiterative DUV process 600, it actually does not utilize the directed U-V method of modeling the SMAP and in fact, operates directly upon the contours generated during the contour generation process 200 because no SMAP is generated for portions of the object that are modeled utilizing the XY ring surface method. Due to the fact that the femur shaft has a known topology approximating a cylinder, it has been found that it can be modeled more accurately and quickly utilizing the XY ring surface generation method rather than the reiterative DUV method. An XY ring surface is generated by examining the contours of the object on a slice-by-slice basis. For each contour, a fixed number of SVOXs are selected that are evenly distributed around the contour of the object. These SVOXs are utilized as control points in defining the NURB solid model of the object in much the same manner as the quadrant corner SVOXs are utilized to define control points when the reiterative DUV process is executed. However, no u or v-lines are generated during XY ring surface generation and the control points are determined more directly.

After the XY ring surface is generated at step 652, the reiterative DUV process proceeds to step 654 wherein a determination is made as to whether there is another SMAP to be processed. When it is determined that there is another SMAP, the reiterative DUV process returns to step 644. In this manner, the reiterative DUV process processes each of the SMAPs that make up the femur until it is determined at step 654 that each of the SMAPs have been processed. At that point, the reiterative DUV process is terminated.

When special processing has been requested and the first SMAP represents the femur head, the SMAP is processed by the reiterative DUV process in the manner described above. When it is determined at step 610 (FIG. 41) that the maximum number of UV lines have been generated for the SMAP, the reiterative DUV process proceeds to step 638 (FIG. 44) wherein a determination is made as to whether there are any additional SMAPs to be processed. When it is determined that there are additional SMAPs to be processed, the reiterative DUV process proceeds to step 640 wherein the next SMAP is selected for processing. Thereafter, a determination is again made at step 642 as to whether special processing has been requested. When it is determined at step 642 that special processing has been requested, the reiterative DUV process returns to step 644 (FIG. 45) wherein a determination is made as to whether the selected SMAP represents a femur head in the manner described above. In this manner, when special processing has been requested, the reiterative DUV process models each of the SMAPs representing the femur in the manner described above.

DUV Post-Processing

After the reiterative DUV process has been completed, the surface generation for the solid is essentially complete. However, some additional post-processing steps are performed to improve the appearance of the surface, and to ensure error-free display and stitching together of surfaces during solid model conversion on the target CAD/CAM system.

The input to the post-processing step 702 is the SMAP representation in UV space that is generated during the reiterative DUV process 600. At step 702, an array of control points is generated for each SMAP represented in UV space. Each array of control points is a two-dimensional array having the coordinates U and V and is formatted in a manner similar to the above-described representations of the SMAPs in UV space, examples of which are shown in FIGS. 39(*f*)–(*i*). The array of control points is formed by placing the XYZ coordinates of the center point of the corner SVOXs for each quadrant generated during the reiterative DUV process 600 into the array at the points where the u and v-lines intersect. As a result, a two-dimensional array of control points is generated that defines each SMAP in three dimensions. As is described below, these control points can be utilized to define a NURB surface model of the SMAP. Therefore, the intersection points of the u and v-lines generated during the reiterative DUV process are selected as control points to define a NURB surface model of each SMAP. When special processing has been requested and a SMAP representing a femur shaft has been modeled utilizing the XY ring method described in step 652 (FIG. 45), the array of control points for that SMAP has already been established during step 652.

After an array of control points is generated for each SMAP, the post-processing continues at step 704 wherein seams for the UV representations of each SMAP are removed. As was described above in reference to the representation of a SMAP in UV space as shown in FIGS. 39(*f*)–(*i*), the v-lines defined at U=0.0 and U=1.0 are duplicates of one another. When a NURB surface is generated utilizing the array of control points, the ends of the NURB surface will meet each other at these v-lines. The NURB surface has a generally smooth appearance because the first derivative is constrained to evaluate to zero at any point interior to the NURB surface. However, this constraint is not applicable at the boundary interface. As a result, a somewhat sharp transition is formed on the NURB surface which looks like a seam when the NURB surface is displayed. It is desirable to remove the seam so that the NURB surface more accurately models the object. The seam is removed by causing the two ends of the NURB surface defined at U=0.0 and U=1.0 to be tangent to one another at their point of intersection, thereby causing the first derivative of the NURB surface to evaluate to zero at the boundary. This is accomplished by adding two additional v-lines to the array of control points generated for each SMAP at step 702. One v-line is defined close to the v-line at U=0.0 and second v-line is defined close to the v-line at U=1.0. Each of these newly added v-lines is generated to have XYZ control points that cause each end of the NURB surface to be tangent to the other end at the point where the ends intersect.

After the seams are removed, the post-processing continues at step 706 wherein pimple removal is performed. A pimple is conceptually similar to a seam and is a sharp point formed at the pole of the SMAP when the flag pole method is utilized. As was described above in reference to FIG. 39, when the flag pole method is utilized, the u-line at the pole indicates the same point for any value of U so that every v-line meets at the pole. A pimple is removed by ensuring that each of the v-lines are tangent to the other v-lines at their point of intersection at the pole. This is accomplished by adding extra u-lines to the array of control points near any pole generated using the flag pole method. The XYZ control points for the additional u-lines are selected to ensure that each of the v-lines is tangent to the other v-lines at their point of intersection at the flag pole.

After the pimples have been removed, the post-processing continues at step 708 wherein each array of control points generated from each SMAP undergoes duplicate point removal. Duplicate points occur when a single SVOX, other than a flag pole, defines a corner for more than one quadrant and therefore defines multiple control points in the array. Duplicate points are generated when two v-lines or two u-lines touch one another. Duplicate points are often generated near the flag poles of the SMAP because at that portion of the SMAP, a large number of v-lines converge into a small area. It is undesirable to have duplicate control points because the SMAP is modeled most accurately and reliably when each control point is distinct from the other control points.

FIG. 48 illustrates a typical example of the duplicate point removal process 708. In FIG. 48(*a*), a portion of a u-line U1 is shown intersecting with five v-lines V1–V5. The intersection with the v-lines creates five control points UC1–UC5 along the u-line. Because v-lines V2–V4 intersect the u-line at the same point, control points UC2–UC4 are identical. This duplicate control point can be removed in the manner shown in FIG. 48(*b*). A line segment LS1 is drawn from the first control point UC1 to the common control point. A second line segment LS2 is drawn between the common control point and the last control point UC5. The second control point UC2 is then set to be the midpoint of the line segment LS1 and the fourth control point UC4 is set to be the midpoint of the second line segment LS2. The third control UC3 remains unchanged. In this manner, the duplicate point is removed in the manner shown in FIG. 48(*b*) and the NURB surface generated from the control array will theoretically provide a more accurate representation of the object.

After the duplicate points have been removed, the post-processing continues at step 710 wherein if multiple SMAPs were generated for modeling the object, the arrays of control points generated for each SMAP in step 702 are processed so that the surfaces can be cleanly stitched together on the target CAD/CAM system to generate a solid. This stitching also takes place whenever a trimmed planar surface was utilized in modeling the object. When an object is modeled utilizing multiple SMAPs, the control points defined at the intersection of the various surfaces should be identical. This identity of control points can be accomplished in a number of ways. First, the number and location of the v-lines utilized during the reiterative DUV process for each SMAP can be chosen to be identical. The number of v-lines for each SMAP can be made identical by setting the maximum number of v-lines to be generated during the reiterative DUV process to the same number for each SMAP that will stitch to each other. For each of the objects described above as being modeled with multiple SMAPs, the intersection of the SMAPs is always defined at a u-line. Therefore, identity of the v-lines generated for each SMAP will ensure that the control points at the intersection of the two surfaces will be identical. It should be understood that if an object is modeled utilizing two surfaces that are intersected at a v-line, the control points can be chosen to be identical by ensuring that the u-lines generated to model each SMAP are identical.

A second way in which the control points can be made identical is to ensure that the number of v-lines generated for each SMAP be identical without requiring that they have identical locations. Under this technique, the exact location of the v-lines need not be made identical. When the arrays of control points for each SMAP are stitched together in step 710, they can be manipulated in order to make the control points line up. This manipulation can involve a rotation of one of the surfaces. Additionally, XYZ averaging techniques can be utilized to determine an average location for establishing the control points along the surface shared in common by the two SMAPs.

Seam removal can be performed at the point of intersection between the two surfaces in order to generate a smoother surface.

IGES File Generation

After the output of the reiterative DUV process has been post-processed at step 700, the result is a single array of control points. As stated above, this array of control points can be utilized to generate a NURB surface representation of the object that is defined by these control points. If a NURB surface is generated in this manner, the surface will not pass through some of the control points, possibly causing inaccuracies in the resulting solid representation. Alternatively, the original array of control points could be used as seed points to generate a new array of control points constrained such that the NURB surface passes through every original control point. This new array of control points could then be used to drive a CAD/CAM system or for various other uses as described above.

As described above, one use for the array of control points generated by the present invention is to drive a CAD/CAM system. When the method is used for this purpose, the final step in the method is to generate an IGES file at step 800. As stated above, IGES (Initial Graphics Exchange Specification) format is a format recognized by the United States National Bureau of Standards. The IGES format provides a standard that represents the object in terms of parametric (NURB) surfaces, trimmed planar surfaces, and/or other associated geometric entities. The IGES file generated at step 800 can be used as an input to any CAD/CAM system that features an IGES translator. As a result, a CAD/CAM system can utilize the output from the method of the present invention to generate physical models of the object.

Conclusion

As described above, the present invention provides a method and apparatus for generating a replica of an object represented in terms of volumetric data. The primary steps of the method are illustrated in FIG. 50. In step 900, a surface representation of the object is generated for the object represented in terms of volumetric data. The surface representation includes a plurality of surface elements that define a surface enclosing the voxels whose volumes represent the object volume. In step 902, an array of control points is generated with each control point corresponding to a surface element and including the coordinates of at least one voxel corresponding to the surface element. In step 904, a data structure representing a NURB surface model of the object is generated from the array of control points. Finally, in step 906, the data structure is utilized to manufacture an article having a surface topology that is substantially identical to the NURB surface model represented by said data structure. In this manner, a replica is generated of the object represented in terms of volumetric data.

As described above, the present invention further provides a method for operating a computer to generate a surface representation of an object represented in terms of volumetric data. The primary steps of this method are illustrated in FIG. 51. In step 908, at least one contour is generated for each slice that includes a voxel volume representing the object volume. Each contour indicates a group of surface voxels on the slice that have volumes that represent the object and are adjacent to at least one voxel on the same slice whose volume does not represent the object. In step 910, the contours are stored in the computer memory. In step 912, a surface representation is generated for each slice for which a contour was generated. Each surface representation includes a plurality of surface voxel faces. In step 914, each slice's surface representation is stored in the memory. Finally, in step 916, the surface representations for each slice are combined to generate a surface representation of the object.

As described above, the present invention further provides a method for operating a computer to generate a data structure representing a NURB solid model of an object represented in terms of surface data, the surface data representing the object surface in terms of a plurality of faces. The primary steps of this method are illustrated in FIG. 52. In step 918, first and second poles are generated for the surface data representation of the object and the poles are stored in the computer memory. In step 920, a plurality of v-lines is generated between the first and second poles, and each of the v-lines is stored in the memory. In step 922, a plurality of u-lines is generated and stored in memory. In step 924, a list of intersection faces that represent portions of the object surface where v-lines intersect with u-lines is generated and stored in the computer memory. In step 926, an array of control points is generated and stored in memory. Finally, at step 928, a data structure representing a NURB solid model of the object is generated from the array of control points.

As described above, the present invention further provides a method for operating a computer to generate a data structure representing a NURB solid model of an object represented in terms of volumetric data. The primary steps of the method are illustrated in FIG. 53. In step 930, a surface representation of the object is generated for the object represented in terms of volumetric data. The surface representation includes a plurality of surface elements that define a surface enclosing the voxels whose volumes represent the object volume. In step 932, the surface representation of the object is stored in the computer memory. In step 934, an array of control points is generated with each control point corresponding to a surface element and including the coordinates of at least one voxel corresponding to the surface element. In step 936, the array of control points is stored in the computer memory. Finally, in step 938, a data structure representing a NURB surface model of the object is generated from the array of control points.

As described above, the present invention provides a method and apparatus for receiving data representing an object in terms of its volumetric characteristics, and for generating a solid model representation of the object in terms of a plurality of surface elements that enclose the volume. The present invention further provides a method and apparatus for utilizing the solid model representation to generate a NURB solid model of the object. The NURB solid model of the object can then be used for many applications, including as a source for driving a CAD/CAM system to create a replica of the object.

It should be understood that various changes and modifications of the embodiments shown in the drawings may be made within the scope of this invention. Thus, it is intended that all matter contained in the above description and shown in the accompanying drawings shall be interpreted in an illustrative and not limiting sense.

What we claim is:

1. A method for operating a computer to generate a data structure representing a NURB based solid model of an object represented in terms of surface data, the computer having a memory and the surface data being stored in the memory, the object having a surface, the surface data representing the object surface in terms of a plurality of surface elements, each surface element representing a portion of the object surface and having coordinates indicating the relative three-dimensional location of the portion of the object surface that it represents, the method including the steps of:

generating first and second poles for the surface data representation of the object, each pole including at least one surface element, each pole representing a portion of the object surface;

storing the first and second poles in the memory;

generating a plurality of v-lines between the first and second poles, each v-line including a plurality of surface elements that represent a path between the respective portions of the object surface represented by the first and second poles;

storing each v-line in the memory;

generating a plurality of u-lines, each u-line including a plurality of surface elements that represent a path around the object surface, each u-line intersecting with each of the v-lines;

storing each u-line in the memory;

generating a list of intersection surface elements that represent portions of the object surface where v-lines intersect with u-lines, the intersection surface elements being surface elements that are included within the plurality of surface elements of both a u-line and a v-line;

storing the list of intersection surface elements in the memory;

generating an array of control points, each control point corresponding to an intersection surface element, each control point including the coordinates indicating the portion of the object represented by its corresponding intersection surface element;

storing the array of control points in the memory; and generating a data structure representing a NURB based solid model of the object from the array of control points.

2. An apparatus for generating a data structure representing a NURB based solid model of an object, the object having a surface and a volume enclosed by the surface, the apparatus comprising:

a source for generating a volumetric data representation of the object, the volumetric data including a plurality of voxels, each voxel having a plurality of voxel faces that interconnect to enclose a voxel volume, each voxel volume representing a corresponding portion of the object volume or a portion of a volume of a background substance, each voxel having coordinates indicating the relative three-dimensional position of the portion of the object volume or background substance volume that it represents;

means for generating a surface model of the object from the volumetric data, the surface model including a plurality of surface elements that define a surface enclosing the voxels whose volumes represent the object volume, each surface element corresponding to at least one voxel;

means for generating first and second poles for the surface model, each pole including at least one surface element and representing a portion of the object surface;

means for generating a plurality of v-lines between the first and second poles, each v-line including a plurality of surface elements that represent a path between the respective portions of the object surface represented by the first and second poles;

means for generating a plurality of u-lines, each u-line including a plurality of surface elements that represent a path around the object surface, each u-line intersecting with each of the v-lines;

means for generating a list of intersection elements that represent portions of the object surface where v-lines intersect with u-lines, the intersection elements being surface elements that are included within the plurality of surface elements of both a u-line and a v-line;

means for generating an array of control points, each control point corresponding to an intersection element and including the coordinates of the at least one voxel corresponding to the intersection element; and means for generating a data structure representing a NURB based solid model of the object based upon the array of control points.

3. An apparatus for generating a replica of an object represented in terms of volumetric data as claimed in claim 2 wherein each voxel face has coordinates indicating its orientation on its corresponding voxel and the relative three-dimensional position of the portion of the object volume or background substance volume that its corresponding voxel represents, and wherein the means for generating a surface model of the object from the volumetric data generates the surface model from a plurality of surface voxel faces such that each surface element is a surface voxel face.

4. A method for operating a computer to generate a NURB based solid representation of an object represented in terms of volumetric data, the computer having a memory and the volumetric data being stored in the memory, the object having a surface and a volume enclosed by the surface, the volumetric data representing the object and a background substance with a plurality of slices, each slice being represented by an array of voxels, each voxel having a plurality of voxel faces that interconnect to enclose a voxel volume, each voxel volume representing a corresponding portion of the object or background substance volume, each voxel face having coordinates indicating its orientation on its corresponding voxel and the relative three-dimensional position of the portion of the object volume or background substance volume that its corresponding voxel represents, the method including the steps of:

generating at least one contour for each slice that includes a voxel volume representing the object volume, each contour indicating a group of surface voxels on the slice, each surface voxel having a volume that represents the object and being adjacent to a voxel on the same slice whose volume does not represent the object;

storing each contour in the memory;

generating a surface representation for each slice for which a contour was generated, each surface representation including a plurality of surface voxel faces, each surface voxel face being a face of a surface voxel, each surface voxel face further being adjacent to a voxel whose volume does not represent the object;

storing each slice's surface representation in the memory;

combining the surface representations for each slice to generate a surface representation of the object;

storing the surface representation of the object in the memory;

generating first and second poles for the surface representation of the object, each pole including at least one surface voxel face, each pole representing a portion of the object surface;

storing the first and second poles in the memory;

generating a plurality of v-lines between the first and second poles, each v-line including a plurality of surface voxel faces that represent a path between the respective portions of the object surface represented by the first and second poles;

storing each v-line in the memory;

generating a plurality of u-lines, each u-line including a plurality of surface voxel faces that represent a path around the object surface, each u-line intersecting with each of the v-lines;

storing each u-line in the memory;

generating a list of intersection faces that represent portions of the object surface where v-lines intersect with u-lines, the intersection faces being surface voxel faces that are included within the plurality of surface voxel faces of both a u-line and a v-line;

storing the list of intersection faces in the memory;

generating an array of control points, each control point corresponding to an intersection face, each control point including the coordinates indicating the portion of the object represented by its corresponding intersection face;

storing the array of control points in the memory; and generating a data structure representing a NURB based solid model of the object from the array of control points.

* * * * *